(12) United States Patent
Choi et al.

(10) Patent No.: US 9,696,958 B2
(45) Date of Patent: Jul. 4, 2017

(54) METHOD AND SYSTEM FOR PRESENTING CONTENT

(71) Applicant: Samsung Electronics Co., Ltd., Suwon-si, Gyeonggi-do (KR)

(72) Inventors: Keunha Choi, Seoul (KR); Jimin Kim, Seoul (KR); Jin Heo, Busan (KR); Hyunsoo Kim, Yongin-si (KR); Soonhyun Cha, Anyang-si (KR); Hyunmun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 14/471,411

(22) Filed: Aug. 28, 2014

(65) Prior Publication Data
US 2015/0061971 A1    Mar. 5, 2015

(30) Foreign Application Priority Data
Aug. 30, 2013 (KR) ........................ 10-2013-0104259

(51) Int. Cl.
*G09F 3/14* (2006.01)
*G06F 3/14* (2006.01)
*G09G 5/12* (2006.01)

(52) U.S. Cl.
CPC .......... *G06F 3/1446* (2013.01); *G06F 3/1454* (2013.01); *G09G 5/12* (2013.01); *G09G 2320/08* (2013.01); *G09G 2356/00* (2013.01); *G09G 2370/025* (2013.01); *G09G 2370/16* (2013.01)

(58) Field of Classification Search
CPC . G06F 3/1446; G06F 3/1454; G09G 2356/00; G09G 2320/08
See application file for complete search history.

(56) References Cited

U.S. PATENT DOCUMENTS

| | | | |
|---|---|---|---|
| 7,242,369 B2 | 7/2007 | Huang | |
| 2007/0239844 A1* | 10/2007 | Yokoyama | ................ G06F 3/14 709/217 |
| 2010/0293502 A1 | 11/2010 | Kang et al. | |
| 2011/0109526 A1 | 5/2011 | Bauza et al. | |
| 2011/0216064 A1 | 9/2011 | Dahl et al. | |
| 2011/0239142 A1 | 9/2011 | Steeves et al. | |

(Continued)

FOREIGN PATENT DOCUMENTS

| | | |
|---|---|---|
| WO | 2011/057271 A1 | 5/2011 |
| WO | 2011/117460 A1 | 9/2011 |

*Primary Examiner* — Abbas Abdulselam
(74) *Attorney, Agent, or Firm* — Jefferson IP Law, LLP

(57) ABSTRACT

A system and method for presenting content through a plurality of electronic devices are provided. The method includes presenting content through a plurality of electronic devices comprising at least a first electronic device and a second electronic device, wherein the presenting of the content comprises displaying a first portion of the content through the first electronic device and displaying a second portion of the content through the second electronic device, identifying an input for at least one of the plurality of electronic devices while the content is being displayed, setting the plurality of electronic devices as a first group comprising the first electronic device and a second group comprising the second electronic device, based on at least the input, and independently presenting the content through the first group and the second group, based on the setting.

62 Claims, 29 Drawing Sheets

(56) References Cited

U.S. PATENT DOCUMENTS

| | | |
|---|---|---|
| 2012/0206319 A1 | 8/2012 | Lucero et al. |
| 2012/0280898 A1 | 11/2012 | Lucero et al. |
| 2013/0176255 A1 | 7/2013 | Kim et al. |
| 2013/0222266 A1 | 8/2013 | Gardenfors et al. |
| 2013/0246919 A1* | 9/2013 | Oh .......................... G09G 5/003 715/719 |
| 2014/0002327 A1* | 1/2014 | Toren .................... G06F 3/1423 345/1.1 |

* cited by examiner

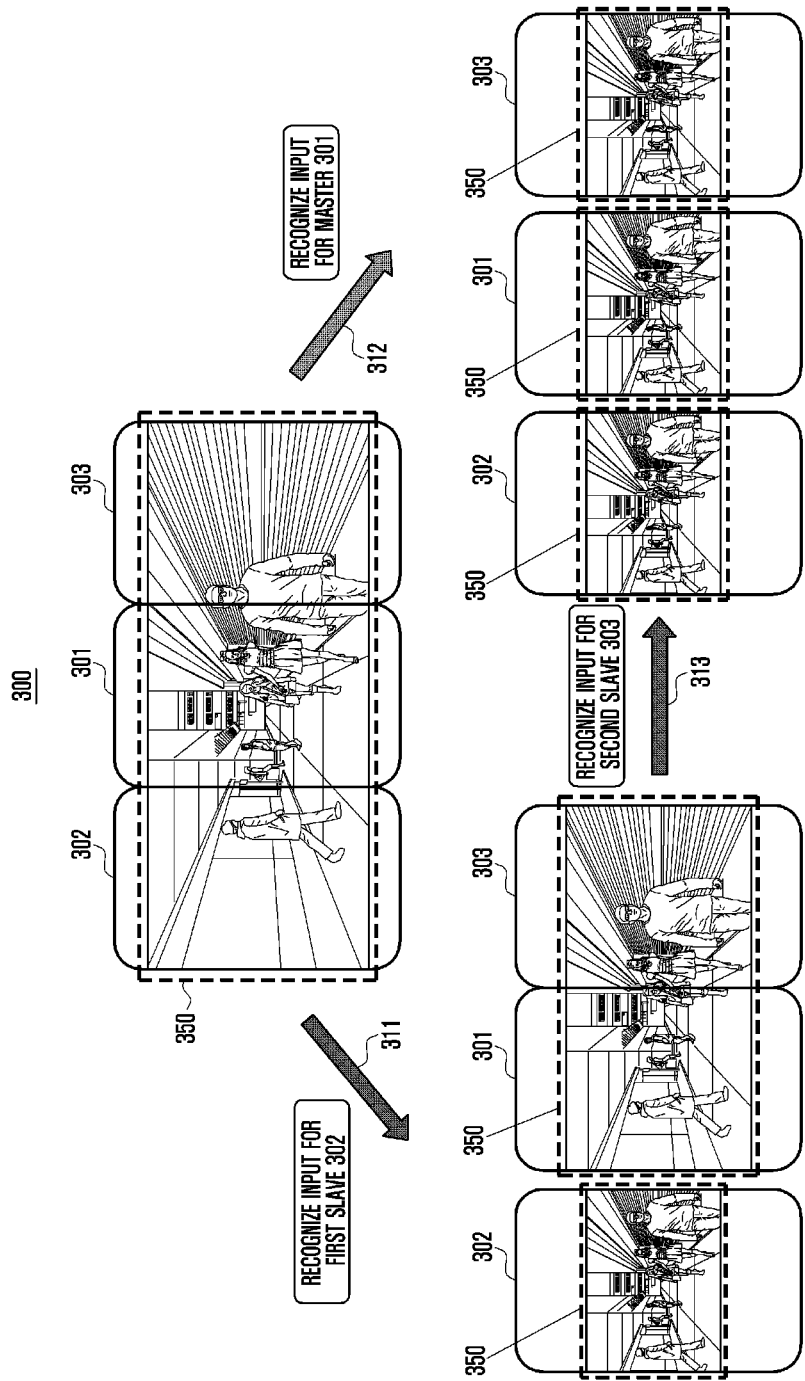

METHOD AND SYSTEM FOR PRESENTING CONTENT

CROSS-REFERENCE TO RELATED APPLICATION(S)

This application claims the benefit under 35 U.S.C. §119(a) of a Korean patent application filed on Aug. 30, 2013 in the Korean Intellectual Property Office and assigned Serial number 10-2013-0104259, the entire disclosure of which is hereby incorporated by reference.

TECHNICAL FIELD

The present disclosure relates to a system and method for presenting content through a plurality of electronic devices.

BACKGROUND

Multi-vision implies a method of displaying one piece of content using several independent electronic devices. There is a technical limit in the size of the display which one electronic device may have. Therefore, when a large-sized image or video with a high resolution is required to be displayed, content is frequently displayed using a plurality of electronic devices according to the multi-vision method.

In the case of displaying content in an electronic device having a relatively limited display size for portability (e.g., a mobile device), such as a mobile phone or a tablet Personal Computer (PC), displaying the content through the multi-vision method may be useful.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for in order to construct a multi-vision system, electronic devices are arranged, and appropriate content sources have to be provided to the corresponding electronic device according to a position of the arranged electronic devices. To this end, after the electronic devices are arranged, a link between the device for providing the content sources and the remaining devices has to be properly configured.

For example, in implementation of the multi-vision system using mobile devices such as a mobile phone or a tablet, if an event, such as an incoming telephone call occurs while content is being displayed through the multi-vision method, a user of a device according to the related art has difficulty interacting the event. In addition, according to a characteristic of the mobile devices which can be freely moved, though some devices are moved to a different space, the corresponding devices have to be able to continuously receive content at the same time as the remaining devices. However, the multi-vision system according to the related art have difficulty supporting such reception or integration across devices.

In accordance with an aspect of the present disclosure, a method and a system which can freely change a content display method such that at least one device or group of a plurality of electronic devices presenting content in a multi-vision mode presents the corresponding content independently of the remaining electronic devices is provided.

In accordance with another aspect of the present disclosure, a method of presenting content is provided. The method includes presenting content through a plurality of electronic devices comprising at least a first electronic device and a second electronic device, wherein the presenting of the content comprises displaying a first portion of the content through the first electronic device and displaying a second portion of the content through the second electronic device, identifying an input for at least one of the plurality of electronic devices while the content is being displayed, setting the plurality of electronic devices as a first group comprising the first electronic device and a second group comprising the second electronic device, based on at least the input, and independently presenting the content through the first group and the second group, based on the setting.

In accordance with another aspect of the present disclosure, a method of presenting content with an electronic device that is in communication with a second electronic device is provided. The method includes presenting, by the electronic device, a first portion of the content, at least one of receiving, by the electronic device, information regarding an input while the first portion of the content is being presented, and detecting, by the electronic device, the input while the first portion of the content is being presented, and in response to at least one of receiving information regarding the input and detecting the input, configuring, by the electronic device, a first group of one or more electronic devices.

In accordance with another aspect of the present disclosure, an electronic device is provided. The electronic device includes a memory configured to store information on a plurality of electronic devices including the electronic device and the second electronic device, and one or more processors configured to present a first portion of the content, at least one of receive information regarding an input while the first portion of the content is being presented, and detect the input while the first portion of the content is being presented, and configure a first group of one or more electronic devices in response to at least one of receiving information regarding the input and detecting the input.

In accordance with another aspect of the present disclosure, a method of presenting content with an electronic device is provided. The method includes establishing, by the electronic device, a connection with a second electronic device, detecting, by the electronic device, an input for configuring a presentation of content across one or more of the electronic device and the second electronic device, transmitting, by the electronic device, information regarding the input to the second electronic device, and receiving, by the electronic device, information regarding at least one of an operating mode for the electronic device and control information for content presentation by the electronic device, from the second electronic device.

In accordance with another aspect of the present disclosure, an electronic device is provided. The electronic device includes a memory configured to store information on a plurality of electronic devices including the electronic device and the second electronic device, and one or more processors configured to establish a connection with a second electronic device, detect an input for configuring a presentation of content across one or more of the electronic device and the second electronic device, transmit information regarding the input to the second electronic device, and receive information regarding at least one of an operating mode for the electronic device and control information for content presentation by the electronic device, from the second electronic device.

As described above, the present disclosure provides a method and a device for presenting content which can freely change a content display method such that at least one device or group of a plurality of electronic devices presenting content in a multi-vision mode presents the corresponding content independently of the remaining electronic devices. Though a specific electronic device among the plurality of electronic devices is separated from the remaining electronic devices, the separated specific electronic device can display the corresponding content independently of or at the same time as the remaining electronic devices.

Furthermore, according to various embodiments of the present disclosure, in a case according to which content is displayed through electronic devices having a different-sized display or the number of electronic devices is larger than the reasonable number of electronic devices corresponding to a resolution of content so that there is an unused display area, another function related to presenting the content may be performed through the corresponding display area.

Moreover, according to various embodiments of the present disclosure, in a case according to which an event such as telephone call incoming occurs in some of a plurality of electronic devices configuring multi-vision while content is being displayed through the multi-vision, an application corresponding to the event can be easily executed through another electronic device rather than the electronic device in which the event has occurs.

In addition, according to various embodiments of the present disclosure, content portions of electronic devices presenting content in the multi-vision mode can be adjusted in response to a user input for the selected device among the electronic devices, thereby increasing user convenience.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other objects, features, and advantages of certain embodiments of the present disclosure will be more apparent from the following description taken in conjunction with the accompanying drawings, in which:

FIG. 3 illustrates examples in which an operating mode of at least some electronic devices of a content presenting system is changed from a multi-vision mode to a single-vision mode according to various embodiments of the present disclosure;

Throughout the drawings, it should be noted that like reference numbers are used to depict the same or similar elements, features, and structures.

DETAILED DESCRIPTION

Figure 1:
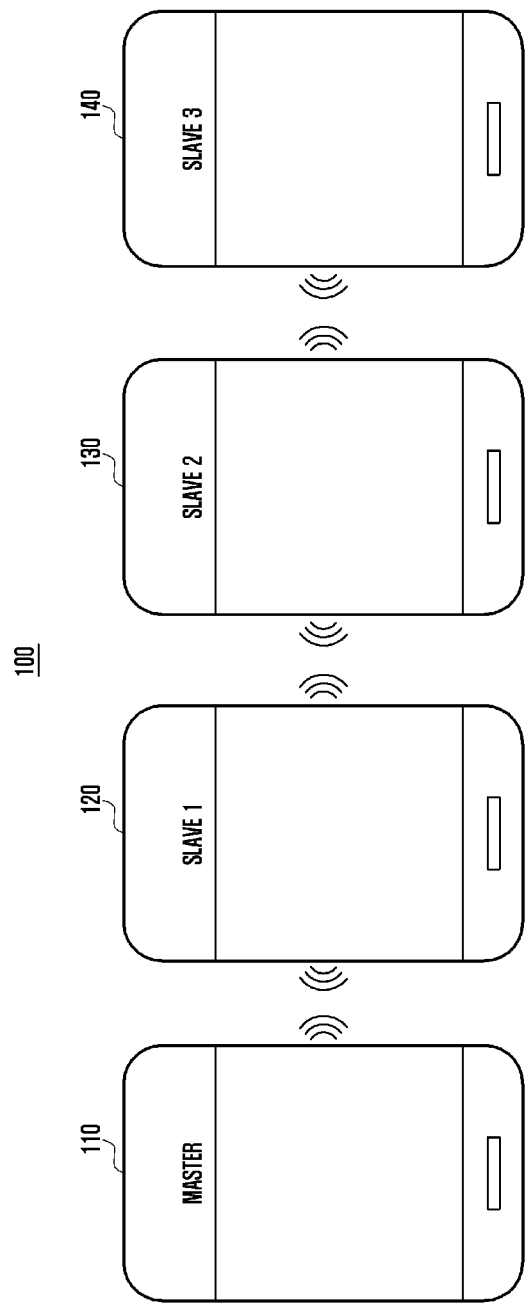
FIG. 1 is a schematic view of a content presenting system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the expressions such as "first" and "second" in the present disclosure can modify various constituent elements of the present disclosure, they do not limit the constituent elements. For example, the above expressions do not limit the sequence and/or importance of the elements. The above expressions are used merely for the purpose to distinguish an element from the other elements. For example, a first user electronic device and a second user electronic device indicate different user electronic devices although both of them are user electronic devices. For example, a first element could be termed a second element, and similarly, a second element could be also termed a first element without departing from the scope of the present disclosure.

In the case according to which a component is referred to as being "connected" or "accessed" to other component, it should be understood that not only the component is directly connected or accessed to the other component, but also there may exist another component between them. Meanwhile, in the case according to which a component is referred to as being "directly connected" or "directly accessed" to other component, it should be understood that there is no component therebetween.

The terms used in the present disclosure are only used to describe specific embodiments of the present disclosure, and are not intended to limit the present disclosure. As used herein, the singular forms are intended to include the plural forms as well, unless the context clearly indicates otherwise.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

According to various embodiments of the present disclosure, an electronic device may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (e.g., a Head-Mounted-Device (HMD) such as electronic glasses, electronic clothes, an electronic bracelet, an electronic necklace, an electronic appcessory, an electronic tattoo, a smart watch, and/or the like).

According to various embodiments of the present disclosure, an electronic device may be a smart home appliance with a communication function. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic picture frame, and/or the like.

According to various embodiments of the present disclosure, the electronic device may include at least one of various types of medical devices (e.g., Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (e.g., navigation equipment for a ship, a gyro compass and the like), avionics, a security device, an industrial or home robot, and/or the like.

According to various embodiments of the present disclosure, an electronic device may include at least one of a part of furniture or a building/structure having a communication function, an electronic board, an electronic signature receiving device, a projector, and various types of measuring instruments (e.g., a water meter, an electric meter, a gas meter, a radio wave meter, and the like).

According to various embodiments of the present disclosure, the electronic device may be a combination of one or more of the aforementioned various devices. Further, it is obvious to those skilled in the art that the electronic device according to the present disclosure is not limited to the aforementioned devices.

FIG. 1 is a schematic view of a content presenting system according to various embodiments of the present disclosure.

Referring to FIG. 1, according to various embodiments of the present disclosure, a content presenting system 100 may simultaneously present (e.g., display or otherwise provide) content through a plurality of electronic devices. The content presenting system 100 may include a plurality of electronic devices, for example, a master 110, a first slave 120, a second slave 130, and a third slave 140 which may be functionally connected with each other (e.g., may communicate with each other) to simultaneously present (e.g., display or otherwise provide) content (e.g., to a user thereof). Although the content presenting system 100 illustrated in FIG. 1 includes the three slaves 120, 130, and 140, the illustrated content presenting system 100 is only an embodiment of the present disclosure, and other embodiments of the present disclosure having one or more slaves can be made.

The master 110 may generate control information corresponding to the respective electronic devices of the content presenting system 100. The master 110 may transmit the control information corresponding to the other electronic devices (e.g., the slaves 120, 130, and 140) of the content presenting system 100 to all the other electronic devices. The master 110 may open communication channels for transmitting the control information to the other electronic devices (e.g., the slaves 120, 130, and 140) of the content presenting system 100. The communication channels may conform to various protocols such as Wi-Fi Direct, Wi-Fi, Bluetooth, Near Field Communication (NFC), Device-To-Device (DTD), 3G/4G/Long Term Evolution (LTE) networks, and/or the like, and are not limited to a specific communication protocol. The master 110 may coordinate communication between the master 110 and one or more of the slaves (e.g., the slaves 120, 130, and 140), and/or between one slave (e.g., slave 120, 130, or 140) and one or more of the remaining slaves (e.g., the slaves 120, 130, and/or 140).

According to various embodiments of the present disclosure, at least some pieces of the control information may include synchronization information for harmonizing times associated with presenting the content between at least some of the electronic devices (e.g., the master 110, the first slave 120, the second slave 130, and the third slave 140 belonging to the content presenting system 100). Through the synchronization information, the electronic devices 110 to 140 belonging to the content presenting system 100 may be synchronized with each other to simultaneously present (e.g., display or otherwise provide) the content. For example, the remaining electronic devices other than the master 110, namely, the first slave 120, the second slave 130, and the third slave 140 may be synchronized with the master 110. The synchronization between the remaining electronic devices and the master 110 helps the slave electronic devices 120, 130, and 140 simultaneously present the content without exchanging synchronization signals with each other.

According to various embodiments of the present disclosure, specific content which will be simultaneously presented through the master 110, the first slave 120, the second slave 130, and the third slave 140 may be content stored in the master 110. The master 110 may transmit the specific content together with or independently of the control information to the other electronic devices (e.g., the slaves 120, 130, and 140).

According to various embodiments of the present disclosure, the master 110 may provide the specific content stored in the master 110 together with or independently of the control information to the other electronic devices (e.g., the slaves 120, 130, and 140) of the content presenting system 100. The master 110 may transmit source data of the content or encoded signals thereof to the corresponding slave.

According to various embodiments of the present disclosure, the master 110 may drive a content providing module (e.g., a HyperText Transfer Protocol (HTTP) server) for providing content through a reliability-guaranteed communication connection (e.g., Transmission Control Protocol (TCP)) with the other electronic devices (e.g., the slaves 120, 130, and 140) of the content presenting system 100. The content providing module may be functionally connected to the master 110. In a case of content having a capacity higher than the reference value (e.g., multimedia content), the content providing module may be separately provided. The master 110 may access the content providing module to transmit link information (e.g., a Uniform Resource Locator (URL)), through which the content may be provided, together with or independently of the control information to the other electronic devices (e.g., the slaves 120, 130, and 140) of the content presenting system 100. Additional information on the content providing module is provided with reference to, for example, FIGS. 10 and 11.

According to various embodiments of the present disclosure, the other electronic devices (e.g., the slaves 120, 130, and 140) of the content presenting system 100 may receive (e.g., download or stream) the content stored in the master 110 based on the link information received from the master 110. According to various embodiments of the present disclosure, the given content which will be simultaneously presented (e.g., displayed or otherwise provided) through the devices 110 to 140 belonging to the content presenting system 100 may be content stored in a server external to the content presenting system 100 (e.g., a file server, a content provider, an Access Point (AP), a base station, and/or the like). The master 110 may access the external server to acquire link information (e.g., a URL) through which the content may be provided, and may transmit the acquired link information together with or independently of the control information to the other electronic devices (e.g., the slaves 120, 130, and 140) of the content presenting system 100. The master 110 and the slaves 120, 130, and 140 may access the external server using the link information, and may receive (e.g., download or stream) the content from the accessed server.

Figure 2A:
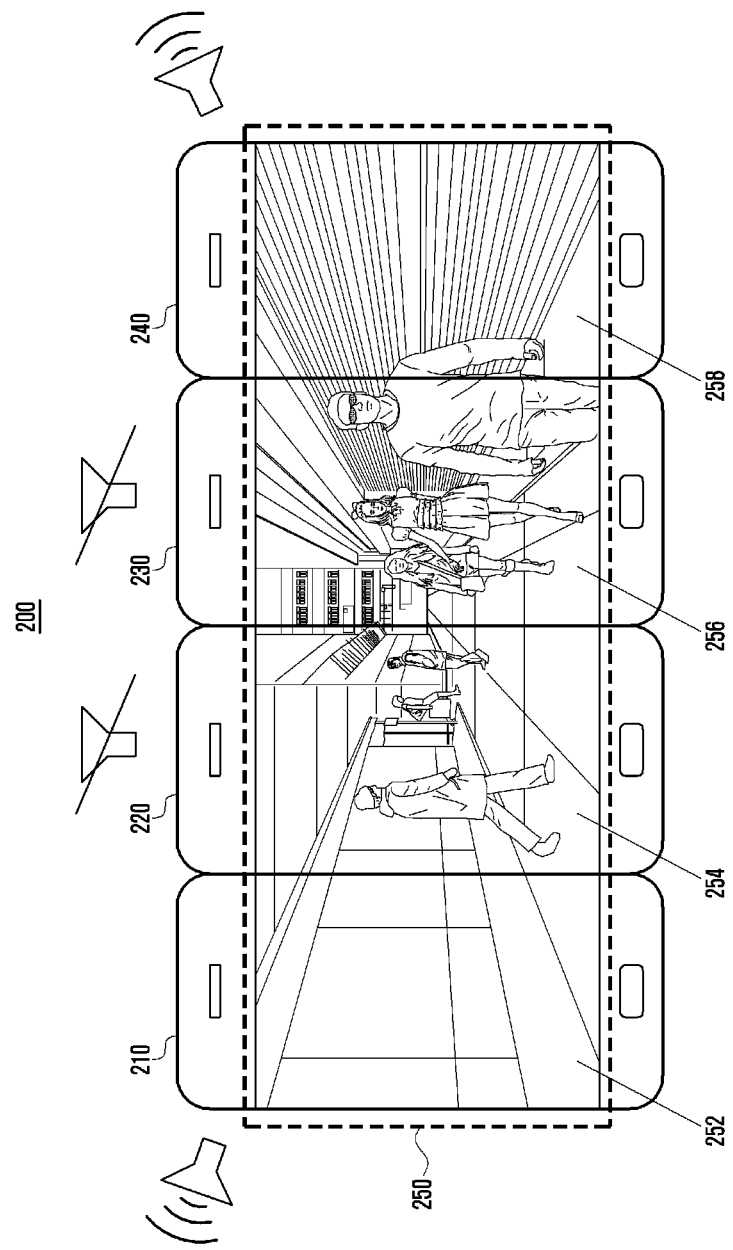
FIGS. 2A and 2B illustrate examples of displaying content by a content presenting system according to various embodiments of the present disclosure.
Figure 2B:
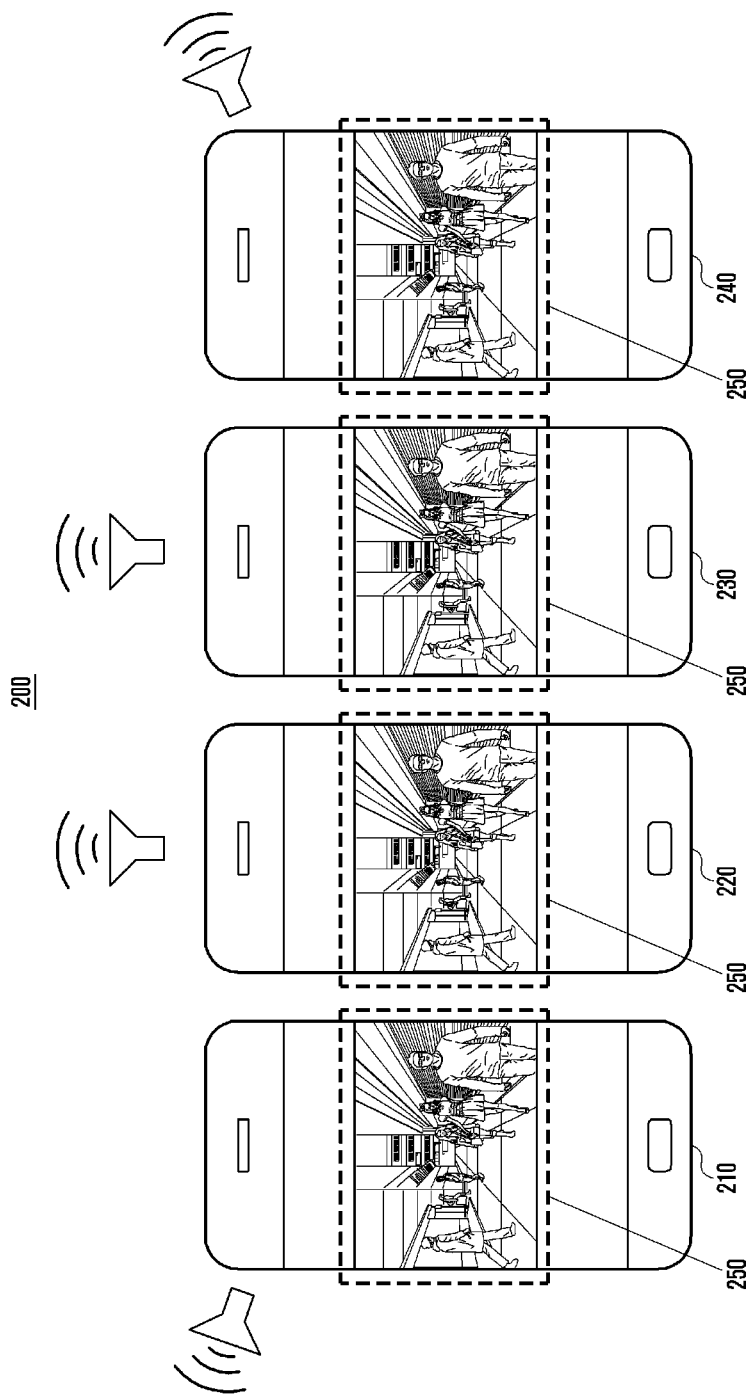

FIGS. 2A and 2B illustrate examples of displaying content by a content presenting system according to various embodiments of the present disclosure.

Referring to FIGS. 2A and 2B, according to various embodiments of the present disclosure, a content presenting system 200 may correspond to the content presenting system 100 illustrated in FIG. 1. For example, a first electronic device 210, a second electronic device 220, a third electronic device 230, and a fourth electronic device 240 of the content presenting system 200 may correspond to the master 110, the first slave 120, the second slave 130, and the third slave 140 illustrated in FIG. 1, respectively.

Referring to FIG. 2A, the electronic devices 210, 220, 230, and 240 may simultaneously display content portions corresponding thereto, respectively, among the plurality of divided content portions forming the given content. The electronic devices simultaneously display the plurality of divided content portions, respectively, whereby the content presenting system 200 may visually provide a user with the given content as the entire content into which the divided content portions are integrated. For example, content 250 may include a first display portion 252, a second display portion 254, a third display portion 256, and a fourth display portion 258. The first display portion 252, the second display portion 254, the third display portion 256, and the fourth display portion 258 of the content 250 may correspond to the first electronic device 210, the second electronic device 220, the third electronic device 230, and the fourth electronic device 240, respectively.

When the electronic devices 210, 220, 230, and 240 of the content presenting system 200 operate in a multi-vision mode, the electronic devices 210, 220, 230, and the 240 may display the given content (e.g., the content 250) in mutual cooperation, for example, as illustrated in FIG. 2A. When operating in the multi-vision mode, the electronic devices 210, 220, 230, and 240 of the content presenting system 200 may simultaneously display the display portions 252, 254, 256, and 258 divided in correspondence to the respective electronic devices. The content is presented (e.g., displayed or otherwise provided) by integrating the display portions 252, 254, 256, and 258 simultaneously displayed by the electronic devices 210, 220, 230, and 240, which makes it possible to present the same content (e.g., the content 250) through a screen larger than those provided by the individual electronic devices. According to various embodiments of the present disclosure, the electronic devices 210, 220, 230, and 240 may contemporaneously display (or otherwise present) a respective portion of a content 250. The electronic devices 210, 220, 230, and 240 may contemporaneously display a respective portion of a content 250 such that an aggregation of the respective portions of the content 250 displayed by the electronic devices 210, 220, 230, and 240 corresponds to the composite content (e.g., the content 250).

At least one (e.g., the electronic device 210) of the electronic devices 210, 220, 230, and 240 of the content presenting system 200 may store an electronic device list including information on the electronic devices. When the electronic devices 210, 220, 230, and 240 display the content in the multi-vision mode as illustrated in FIG. 2A, position information for indicating relative positions of the electronic devices 210, 220, 230, and 240 may be stored in the electronic device list as a part of the information on the electronic devices 210, 220, 230, and 240. According to various embodiments of the present disclosure, the position information of the electronic devices operating in the multi-vision mode may be configured in the form of a number implying an order in which the electronic devices are arranged from left to right. For example, the position information of the first to fourth electronic devices 210, 220, 230, and 240 may be configured to "1", "2", "3", and "4", respectively.

According to various embodiments of the present disclosure, the content 250 may include multimedia content including audio (e.g., background music, lines of a character, and/or the like) associated with at least some of the display portions 252, 254, 256, and 258. In this case, the electronic device (e.g., the first electronic device 210) corresponding to the master of the content presenting system 200 may reproduce audio of the corresponding content through at least some electronic devices (e.g., a first electronic device group including the first and fourth electronic devices 210 and 240), based on the position information of the electronic devices 210, 220, 230, and 240 operating in the multi-vision mode. In this case, according to various embodiments of the present disclosure, the remaining electronic devices (e.g., a second electronic device group including the second and third electronic devices 220 and 230) may not reproduce the audio of the corresponding content. According to various embodiments of the present disclosure, at least some electronic devices and the remaining electronic devices may reproduce the audio information at different times. According to various embodiments of the present disclosure, the respective electronic devices 210, 220, 230, and 240 may also reproduce the audio information at the same time.

Referring to FIG. 2B, the electronic devices 210, 220, 230, and 240 of the content presenting system 200 may independently display the given content (e.g., content 250). When the electronic devices 210, 220, 230, and 240 of the content presenting system 200 operate in a single-vision mode, each of the electronic devices 210, 220, 230, and the 240 may display (or otherwise present) the content (e.g., the content 250), for example, as illustrated in FIG. 2B. One or more of the electronic devices 210, 220, 230, and 240 of the content presenting system 200 may respectively reproduce (or otherwise present) audio content associated with the content independently displayed across the electronic devices 210, 220, 230, and 240 (e.g., an audio portion of the content 250). The one or more electronic devices 210, 220, 230, and 240 may respectively reproduce a portion of the audio content. For example, the leftmost electronic device or the like (e.g., of the electronic devices 210, 220, 230, and 240) may reproduce a left channel of the audio content, and the rightmost electronic device or the like (e.g., of the electronic device 210, 220, 230, and 240) may reproduce a right channel of the audio content.

According to various embodiments of the present disclosure, when the electronic devices 210, 220, 230, and 240 display the content in the single-vision mode, position information for indicating relative positions of the electronic devices 210, 220, 230, and 240 may be configured to a default value (e.g., "−1") which may be easily distinguished from the position information of the electronic devices operating in the multi-vision mode.

According to various embodiments of the present disclosure, an operating mode (e.g., an input mode or output mode) of the electronic devices 210, 220, 230, and 240 of the content presenting system 200 may be set as the multi-vision mode or the single-vision mode. For example, according to a user input (e.g., to the master electronic device, any one of the electronic devices, and/or the like), the operating mode of the electronic devices 210, 220, 230, and 240 may be freely changed to the multi-vision mode or the single vision mode, thereby implementing a flexible content presenting system. According to various embodiments of the present disclosure, the master electronic device (e.g., the master of the content presenting system 200) may control the vision mode of at least one of the electronic devices (e.g., 210, 220, 230, and 240). For example, the master electronic device may control whether each of the electronic devices 210, 220, 230, and 240 are respectively operating in the multi-vision mode or the single vision mode.

According to various embodiments of the present disclosure, regardless of the operating mode, the electronic devices 210, 220, 230, and 240 of the content presenting system 200 may display the corresponding content (e.g., the corresponding display portion of the display portions 252 to 258 (in the case of the multi-vision mode), or the content 250 (in the case of the single-vision mode)) using the same format (e.g., the same size, resolution, brightness, color, shape, and/or the like) or a different format from at least some electronic devices. For example, different subsets of electronic devices (e.g., of the electronic devices 210, 220, 230, and 240) may use a different format for reproducing (e.g., displaying or otherwise presenting) the corresponding content. Additionally or alternatively, regardless of the operating mode, the electronic devices 210, 220, 230, and 240 of the content presenting system 200 may display the corresponding content at the same time or at different times from at least some electronic devices.

FIG. 3 illustrates examples in which an operating mode of at least some electronic devices belonging of a content presenting system is changed from a multi-vision mode to a single-vision mode according to various embodiments of the present disclosure.

Referring to FIG. 3, according to various embodiments of the present disclosure, the content presenting system 300 may be the content presenting system 100 illustrated in FIG. 1 or the content presenting system 200 illustrated in FIG. 2.

The content presenting system 300 may include a master 301, a first slave 302, and a second slave 303. According to various embodiments of the present disclosure, as illustrated in FIG. 3, all of the first slave 302, the master 301, and the second slave 303 which are arranged from left to right may operate in the multi-vision mode, in which case position information of the master 301, the first slave 302, and the second slave 303 may be configured to "1", "2", and "3", respectively. According to various embodiments of the present disclosure, the electronic devices forming the content presenting system 300 may be arranged in various orders. For example, the master 301, the first slave 302, and the second slave 303 may be located from left to right, in which case the position information of the master 301, the first slave 302, and the second slave 303 may be configured to "1", "2", and "3", respectively. According to various embodiments of the present disclosure, at least one of the electronic devices (e.g., the master 301, the first slave 302, and the second slave 303) forming the content presenting system (e.g., the content presenting system 300) may be combined with the other electronic devices in an X-axis direction (T-direction) rather than a Y-axis direction (longitudinal direction). In this case, the position information of the electronic devices may be set, for example, in a sequential order from left to right or from up to down, and vice versa.

Referring to FIG. 3, at operation 311, when an input (e.g., a user input such as a shake, a touch, hovering or a voice, or an automatic command by a system according to the end of the set time) for a change to the single-vision mode is recognized (e.g., detected) for the first slave 302 located at the leftmost position among the electronic devices 301, 302, and 303 operating in the multi-vision mode, the operating mode of the first slave 302 may be changed from the multi-vision mode to the single-vision mode. The input may be detected at the master, at the specific electronic device for which the mode is being modified, at one or more of the electronic devices 301, 302, and 303, or the like. At this time, information 350 (e.g., text, a still image, a moving image, and/or the like) displayed through the electronic devices 301, 302, and 303 in the multi-vision mode may be independently displayed through the electronic device group which was changed to the single-vision mode (e.g., the first slave 302) and the electronic device group which is left in the multi-vision mode (e.g., the master 301 and the second slave 303). In this case, the position information of the remaining electronic devices (e.g., the master 301 and the second slave 303) having operated together with the first slave in the multi-vision mode, and the position information of the first slave may be changed. For example, the position information of the master 301, the first slave 302, and the second slave 303 may be changed to "1", "−1", and "2", respectively.

At operation 312, when an input for a change to the single-vision mode is recognized (e.g., detected) for the master 301 among the electronic devices 301, 302, and 303 operating in the multi-vision mode, the operating mode of all the electronic devices 301, 302, and 303 operating in the multi-vision mode may be changed from the multi-vision mode to the single-vision mode. The input may be detected at the master, at the specific electronic device for which the mode is being modified, at one or more of the electronic devices 301, 302, and 303, or the like. At this time, the information 350 (e.g., the text, the still image, the moving image, and/or the like) displayed through the electronic devices 301, 302, and 303 in the multi-vision mode may be independently displayed through the master 301, the first slave 302, and the second slave 303 which were changed to the single-vision mode. In this case, the position information of all the electronic devices (e.g., the master 301, the first slave 302, and the second slave 303) having operated in the multi-vision mode may be changed. For example, the position information of the master 301, the first slave 302, and the second slave 303 may be changed to "−1", "−1", and "−1", respectively.

At operation 313, when an input for a change to the single-vision mode is recognized (e.g., detected) for the second slave 303 located at the right side among the electronic devices 301 and 303 operating in the multi-vision mode, the operating mode of the second slave 303 may be changed from the multi-vision mode to the single-vision mode. The input may be detected at the master, at the specific electronic device for which the mode is being modified, at one or more of the electronic devices 301, 302, and 303, or the like. At this time, only the master 301 operates in the multi-vision mode, and therefore, the operating mode of the master 301 may also be automatically changed from the multi-vision mode to the single-vision mode. Accordingly, the information 350 (e.g., the text, the still image, the moving image, and/or the like) displayed through the electronic devices 301, 302, and 303 in the multi-vision mode may be independently displayed through the master 301, the first slave 302, and the second slave 303 which were changed to the single-vision mode. In this case, the position information of the electronic devices (e.g., the master 301 and the second slave 303) having operated in the multi-vision mode may be changed. For example, the position information of the master 301 and the second slave 303 may be changed to "−1".

Figure 4A:
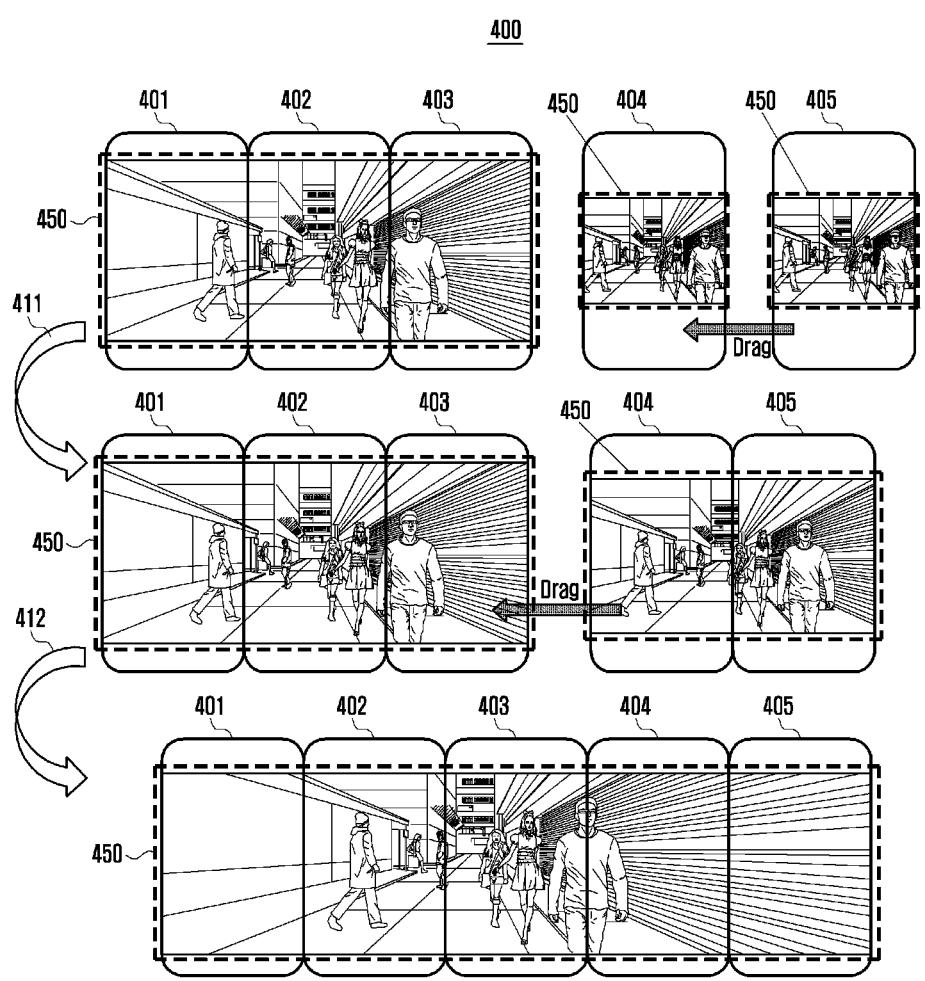
FIGS. 4A and 4B illustrate examples in which an operating mode of at least some electronic devices of a content presenting system is changed from a single-vision mode to a multi-vision mode according to various embodiments of the present disclosure.
Figure 4B:
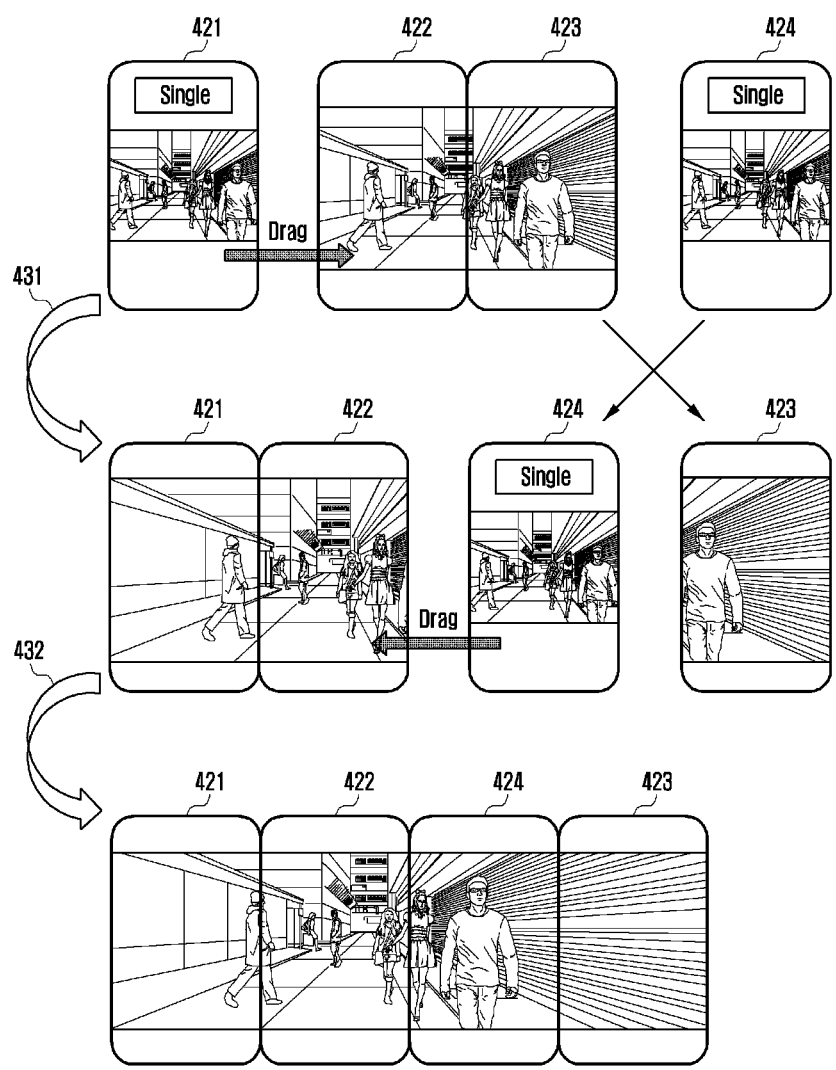

FIGS. 4A and 4B illustrate examples in which an operating mode of electronic devices belonging to a content presenting system is changed from a single-vision mode to a multi-vision mode according to various embodiments of the present disclosure.

Referring to FIGS. 4A and 4B, according to various embodiments of the present disclosure, the content presenting system 400 may be the content presenting system 100 or the content presenting system 300.

Referring to FIG. 4A, the content presenting system 400 may include a first electronic device 401, a second electronic device 402, a third electronic device 403, a fourth electronic device 404, and a fifth electronic device 405. According to various embodiments of the present disclosure, the first to third electronic devices 401 to 403 may form a first electronic device group operating in the multi-vision mode, and the fourth and fifth electronic devices 404 and 405 may respectively operate in the single-vision mode. In this case, the first electronic device group, the fourth electronic device 404, and the fifth electronic device 405 may independently present (e.g., display or otherwise provide) the given content 450 (an example illustrated on an upper end of FIG. 4A).

Position information of the first to fifth electronic devices 401 to 405 may be configured to "1", "2", "3", "−1", and "−1", respectively.

At operation 411, an input for a change to the multi-vision mode may be recognized (e.g., detected) for the electronic devices having operated in the single-vision mode (e.g., the fourth and fifth electronic devices 404 and 405). The input may include at least one of an input by a user (e.g., a drag from a part of an input panel of the fourth electronic device 404 to a part of an input panel of the fifth electronic device 405, or a continuous touch for the input panels of the two electronic devices) and an automatic input by a system (e.g., elapsing of a time interval set for an electronic device serving as a master or the electronic device 405). In response to the input, the operating mode of the corresponding electronic devices (e.g., the fourth and fifth electronic devices 404 and 405) may be changed from the single-vision mode to the multi-vision mode at the same time or one after another. At this time, the electronic devices having been changed from the single-vision mode to the multi-vision mode (e.g., the fourth and fifth electronic devices 404 and 405) may form a second electronic device group which is distinguished from the first electronic device group formed of the electronic devices having operated in the multi-vision mode (e.g., the first to third electronic devices 401 to 403). The first and second electronic device groups may independently display the content 450 while operating in the multi-vision mode (an example illustrated at the center portion of FIG. 4A). According to various embodiments of the present disclosure, as described above, the content presenting system may set the new multi-vision group (e.g., the second electronic device group) by coupling the electronic devices operating in the multi-vision mode. As a result, a plurality of multi-vision groups (e.g., the first and second electronic device groups) may be formed. According to the embodiment of the present disclosure illustrated in FIG. 4A, the first electronic device group including the first to third electronic devices 401 to 403 may form a first multi-vision group, and the second electronic device group including the fourth and fifth electronic devices 404 and 405 may form a second multi-vision group.

Because the plurality of multi-vision groups may be set as described above, an electronic device list may include multi-vision group information together with the position information of the electronic devices. For example, the multi-vision group information of the electronic devices operating in the single-vision mode may be configured to a default value (e.g., "−1") which may be easily distinguished from the position information of the electronic devices operating in the multi-vision mode. For example, at operation 411, pairs of the multi-vision group information and the position information of the fourth and fifth electronic devices 404 and 405 may be changed from (−1, −1) and (−1, −1) to (2, 1) and (2, 2).

At operation 412, when an input for a change to the multi-vision mode is recognized (e.g., detected) for at least one (e.g., the third electronic device 403) of the electronic devices included in the first multi-vision group or at least one (e.g., the fourth electronic device 404) of the electronic devices included in the second multi-vision group, the electronic devices having operated as the individual multi-vision groups may operate while being integrated into one multi-vision group. In this case, the newly formed multi-vision group (e.g., an electronic device group including the first to fifth electronic devices 401 to 405) may present (e.g., display or otherwise provide) the content 450 which has been independently presented (e.g., displayed or otherwise provided) by the first multi-vision group (e.g., the first to third electronic devices 401 to 403), and the second multi-vision group (e.g., the fourth and fifth electronic devices 404 and 405) prior to the combination (an example illustrated on a lower end of FIG. 4A). For example, at operation 412, pairs of the multi-vision group information and the position information of the fourth and fifth electronic devices 404 and 405 may be changed from (2, 1) and (2, 2) to (1, 4) and (1, 5).

Referring to FIG. 4B, a content presenting system 420 may include a first electronic device 421, a second electronic device 422, a third electronic device 423, and a fourth electronic device 424. Among the electronic devices 421 to 424 of the content presenting system 420, the second and third electronic devices 422 and 423 may operate in the multi-vision mode, and the first and fourth electronic devices 421 and 424 may operate in the single-vision mode. For example, position information of the first to fourth electronic devices 421 to 424 may be configured to "−1", "1", "2", and "−1", respectively.

At operation 431, when a user input (e.g., a drag from a part of an input panel of the first electronic device 421 to a part of an input panel of the second electronic device 422) for a change to the multi-vision mode is recognized (e.g., detected) for the electronic device (e.g., the first electronic device 421) having operated in the single-vision mode, the operating mode of the electronic device (e.g., the first electronic device 421) having operated in the single-vision mode among the electronic devices corresponding to the user input may be changed from the single-vision mode to the multi-vision mode. Information on the user input (e.g., a time point when the drag has been recognized (e.g., detected) and the direction of the drag) recognized (e.g., detected) by the electronic devices (e.g., the first and second electronic devices 421 and 422) corresponding to the user input may be acquired, and the multi-vision group and a position in the corresponding multi-vision group may be determined based on the information on the user input.

According to various embodiments of the present disclosure, the electronic device operating in the single-vision mode or belonging to another multi-vision group among the electronic devices corresponding to the user input may be added to the multi-vision group to which the electronic device having lastly recognized (e.g., detected) the drag belongs, by comparing the time points when the electronic devices corresponding to the user input have recognized (e.g., detected) the drag. For example, at operation 431, the first electronic device 421 having operated in the single-vision mode may be added to the multi-vision group to which the second electronic device 422 having lastly recognized (e.g., detected) the drag belongs.

According to various embodiments of the present disclosure, the position information of the electronic device added to the multi-vision group may be determined based on the drag direction recognized (e.g., detected) by the electronic device having lastly recognized (e.g., detected) the drag. For example, at operation 431, the second electronic device 422 may recognize (e.g., detect) the drag direction as the rightward direction to configure the position information of the first electronic device 421 added to the multi-vision group to "1" such that the first electronic device 421 corresponds to the left side of the second electronic device 422. The position information of the remaining electronic devices (the second and third electronic devices 422 and 423) located at the right side of the added first electronic device 421 may be increased by 1 which is the number of added electronic devices. The position information of the second and third electronic devices 422 and 423 may be changed to "2" and "3", respectively.

At operation 432, when a user input (e.g., a drag from a part of an input panel of the fourth electronic device 424 to a part of the input panel of the second electronic device 422) for a change to the multi-vision mode is recognized (e.g., detected) for the electronic device (e.g., the fourth electronic device 424) having operated in the single-vision mode, the operating mode of the electronic device (e.g., the fourth electronic device 424) having operated in the single-vision mode among the electronic devices corresponding to the user input may be changed from the single-vision mode to the multi-vision mode.

For example, at operation 432, the fourth electronic device 424 having operated in the single-vision mode may be added to the multi-vision group to which the second electronic device 422 having lastly recognized (e.g., detected) the drag belongs. The second electronic device 422 having lastly recognized (e.g., detected) the drag may recognize (e.g., detect) the drag direction as the leftward direction to configure the position information of the fourth electronic device 424 added to the multi-vision group to "3" such that the fourth electronic device 424 corresponds to the right side of the second electronic device 422. The position information of the remaining electronic device (the third electronic device 423) located at the right side of the added fourth electronic device 424 may be increased by 1 which is the number of added electronic devices and thus, may be changed to "4".

Figure 5:
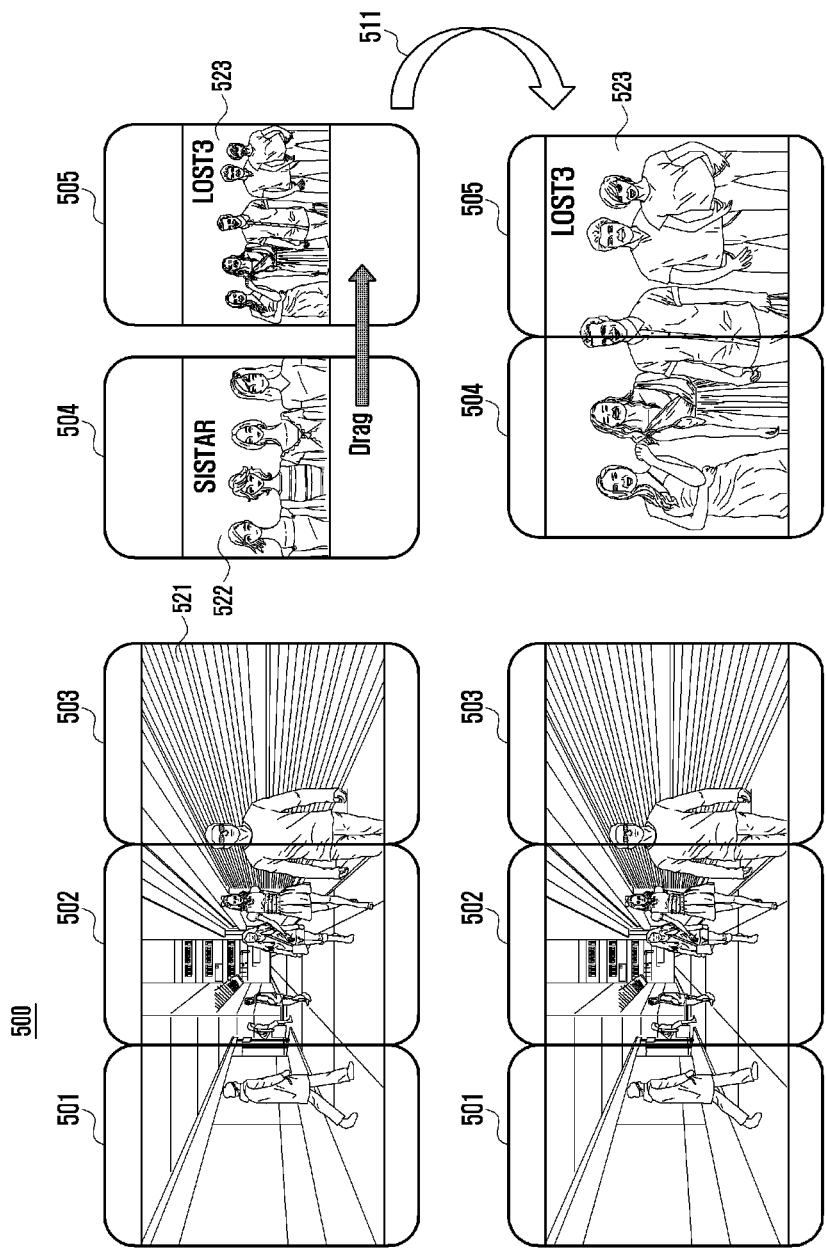
FIG. 5 illustrates an example in which a plurality of pieces of content is displayed in a content presenting system according to various embodiments of the present disclosure.

FIG. 5 illustrates an example in which a plurality of pieces of content is displayed in a content presenting system according to various embodiments of the present disclosure.

Referring to FIG. 5, the content presenting system 500 according to various embodiment of the present disclosure may be the content presenting system 100 illustrated in FIG. 1 or the content presenting system 200 illustrated in FIG. 2.

Referring to FIG. 5, the content presenting system 500 may include a first electronic device 501, a second electronic device 502, a third electronic device 503, a fourth electronic device 504, and a fifth electronic device 505. As illustrated in FIG. 5, among the electronic devices 501 to 505 of the content presenting system 500, the first to third electronic devices 501 to 503 may operate in the multi-vision mode, and the fourth and fifth electronic devices 504 and 505 may operate in the single-vision mode. For example, pairs of multi-vision group information and position information of the first to fifth electronic devices 501 to 505 may be configured to (1, 1), (1, 2), (1, 3), (−1, −1), and (−1, −1), respectively.

According to various embodiments of the present disclosure, as illustrated in FIG. 5, a first multi-vision group including the first to third electronic devices 501 to 503, the fourth electronic device 504, and the fifth electronic device 505 may display first content 521, second content 522, and third content 523, respectively, which are different from each other. According to another embodiment of the present disclosure, the first multi-vision group may reproduce data corresponding to a first reproduction point (e.g., a point at which the first one-minute content has been reproduced) of content (e.g., multimedia content of five minutes in length) in the multi-vision mode. At the same time, the fourth electronic device 504 may reproduce data corresponding to a second reproduction point (e.g., a point at which the first two-minute content has been reproduced) of the content (e.g., multimedia content) in the single-vision mode, and the fifth electronic device 505 may reproduce data corresponding to a third reproduction point (e.g., a point at which the first three-minute content has been reproduced) of the content (e.g., multimedia content) in the single-vision mode.

At operation 511, when a user input (e.g., a drag from a part of the fourth electronic device 504 to a part of the fifth electronic device 505) for a change to the multi-vision mode is recognized (e.g., detected) for the electronic devices (e.g., the fourth and fifth electronic devices 504 and 505) having operated in the single-vision mode, the electronic devices having operated in the single-vision mode may operate in the multi-vision mode, in which case the electronic devices (e.g., the fourth and fifth electronic devices 504 and 505) having been changed from the single-vision mode to the multi-vision mode and the electronic devices (e.g., the first to third electronic devices 501 to 503) having operated in the multi-vision mode may independently display content as different multi-vision groups. The touch input may be used to determine a respective relative positioning of the fourth electronic device 504 and the fifth electronic device 505. For example, a direction of the touch input and/or a location of the touch input may be used to determine a positioning of the fourth electronic device 504 relative to the fifth electronic device 505 (e.g., whether the fourth electronic device 504 is positioned to the left of the fifth electronic device 505, whether the fourth electronic device 504 is positioned to the right of the fifth electronic device 505, and/or the like).

According to various embodiments of the present disclosure, as illustrated in FIG. 5, in a case according to which the electronic devices (e.g., the fourth and fifth electronic devices 504 and 505) corresponding to the user input are reproducing different pieces of content (e.g., the second content 522 and the third content 523) or data corresponding to different reproduction points of the same content (e.g., the point at which the first two-minute content has been reproduced and the point at which the first three-minute content has been reproduced) when the user input (e.g., drag) is entered, one of the plurality of pieces of content being reproduced (e.g., the second content 522 or the third content 523) may be selected, and the selected content may be displayed in the multi-vision mode. For example, the content (e.g., the third content 523) which the electronic device (e.g., the fifth electronic device 505) having lastly recognized (e.g., detected) the drag is reproducing may be selected as one piece of content to be displayed in the multi-vision mode. According to various embodiments of the present disclosure, the content which the electronic device having firstly recognized the drag is reproducing may be selected as one piece of content to be presented (e.g., displayed or otherwise provided) in the multi-vision mode.

Figure 6:
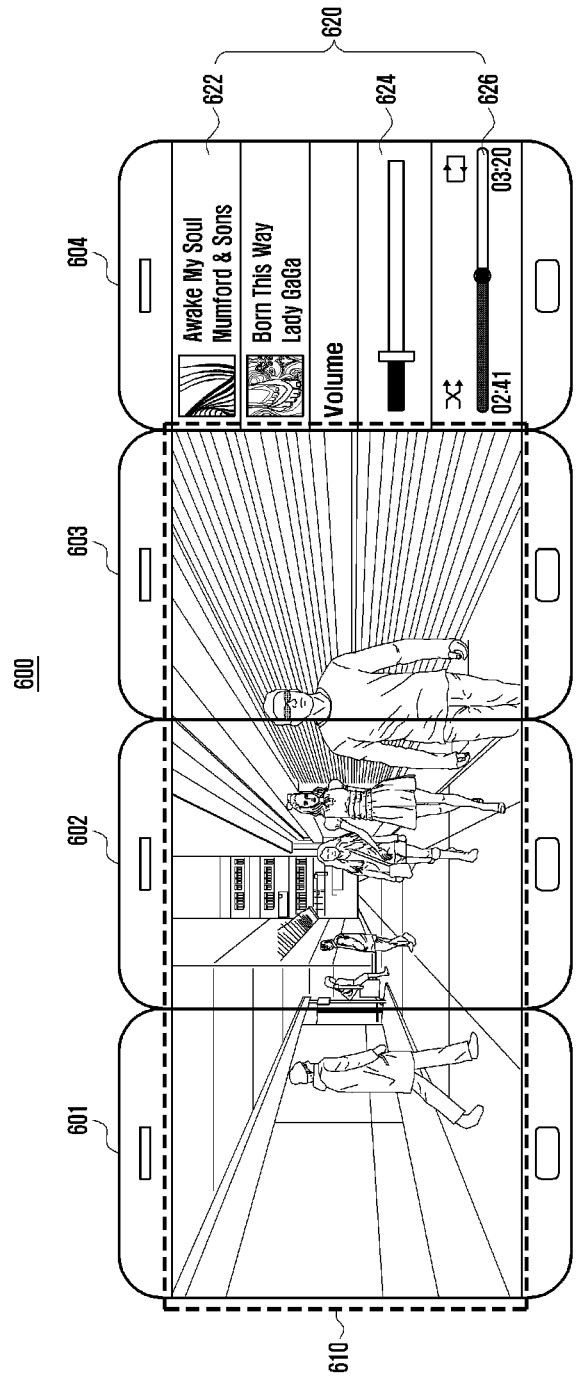
FIG. 6 illustrates an example in which at least some electronic devices of a content presenting system display a control interface for content according to various embodiments of the present disclosure.

FIG. 6 illustrates an example in which at least some electronic devices of a content presenting system display a control interface for content according to various embodiments of the present disclosure.

Referring to FIG. 6, the content presenting system 600 according to various embodiments of the present disclosure may be the content presenting system 100 illustrated in FIG. 1 or the content presenting system 200 illustrated in FIG. 2.

Referring to FIG. 6, the content presenting system 600 may include a first electronic device 601, a second electronic device 602, a third electronic device 603, and a fourth electronic device 604. All the electronic devices 601 to 604 of the content presenting system 600 may operate in the multi-vision mode. Position information of the first to fourth electronic devices 601 to 604 may be configured to "1", "2", "3", and "4", respectively.

According to various embodiments of the present disclosure, as illustrated in FIG. 6, some electronic devices of the content presenting system 600 may present (e.g., display) content 610 in the multi-vision mode, and another subset of electronic devices of the content presenting system 600 (e.g., the remaining electronic devices) may present (e.g., display or otherwise provide) a control interface 620 capable of receiving a display control command of a user (e.g., play, seek, pause, stop, and/or the like) for the corresponding content.

According to various embodiments of the present disclosure, an electronic device designated by a user input may be selected as an electronic device to display the control interface 620. For example, the master electronic device may present the control interface 620. According to various embodiments of the present disclosure, the electronic device to display the control interface 620 may be selected based on position information of the electronic devices operating in the multi-vision mode. For example, as illustrated in FIG. 6, the electronic device (e.g., the fourth electronic device 604) having the largest number configured as the position information may be selected as the electronic device to display the control interface 620. For example, the rightmost electronic device (e.g., among the electronic devices of the content presenting system 600) may be selected as the electronic device to display the control interface 620. As another example, the leftmost electronic device (e.g., among the electronic devices of the content presenting system 600) may be selected as the electronic device to display the control interface 620.

According to various embodiments of the present disclosure, the control interface 620 may include at least one of a reproducible content list 622, a volume control bar 624, a progressive bar 626, and buttons (not illustrated) corresponding to the display control commands (e.g., play, seek, pause, stop, and/or the like).

According to various embodiments of the present disclosure, the reasonable number of multi-vision mode electronic devices corresponding to a resolution of content may be calculated. Based on the calculated number of multi-vision mode electronic devices, a determination may be made as to whether the control interface 620 is to be displayed through one of the electronic devices 601 to 604 of the content presenting system 600. For example, the multi-vision mode electronic device to display the control interface 620 may be selected based on at least one of a position and an actual display size of the multi-vision mode electronic devices. According to various embodiments of the present disclosure, one of the electronic devices functioning as a slave in the content presenting system 600 (e.g., the slaves 120, 130, and 140 of FIG. 1), or the electronic device functioning as a master (e.g., the master 110 of FIG. 1) may be selected as the electronic device to display the control interface 620.

Figure 7:
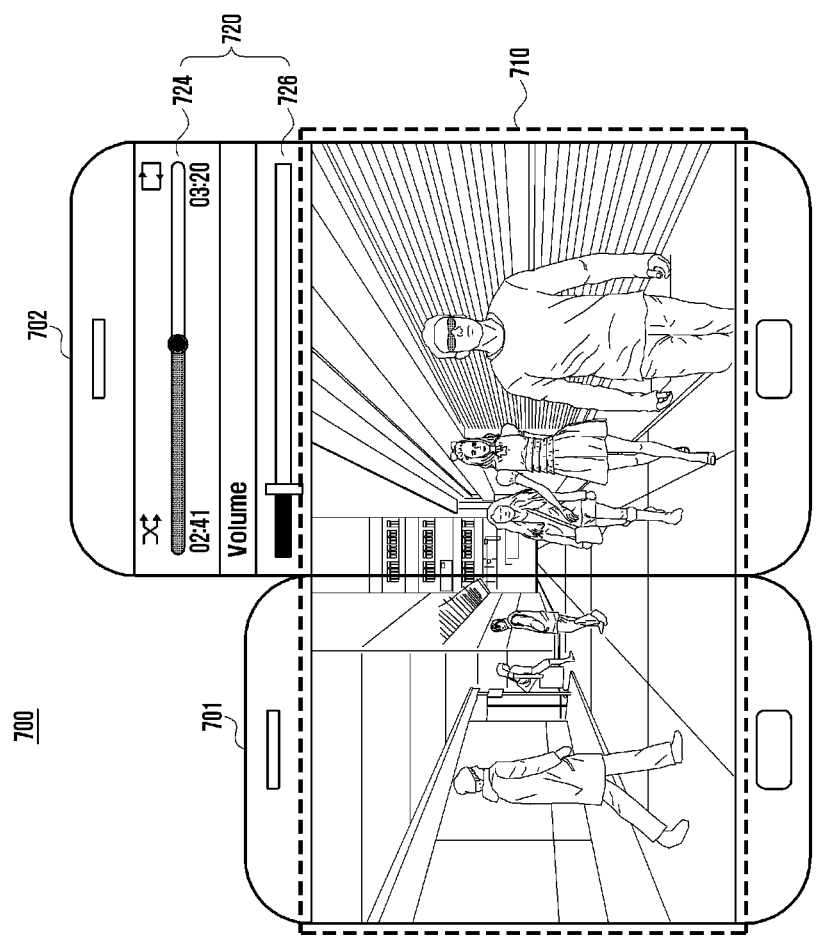
FIG. 7 illustrates an example in which at least some electronic devices of a content presenting system display a control interface for content according to various embodiments of the present disclosure.

FIG. 7 illustrates an example in which at least some electronic devices of a content presenting system display a control interface for content according to various embodiments of the present disclosure.

Referring to FIG. 7, the content presenting system 700 according to various embodiments of the present disclosure may be the content presenting system 100 illustrated in FIG. 1 or the content presenting system 200 illustrated in FIG. 2.

Referring to FIG. 7, the content presenting system 700 may include a first electronic device 701 and a second electronic device 702. All the electronic devices 701 and 702 of the content presenting system 700 may operate in the multi-vision mode. The electronic devices 701 and 702 of the content presenting system 700 may be provided with a display panel having a different-sized display screen.

In a case according to which the electronic devices 701 and 702 provided with the display panel having the different-sized display screen present (e.g., display or otherwise provide) content 710 as one multi-vision group, the electronic device (e.g., the second electronic device 702) having the relatively large-sized display panel has an extra area on the screen. A control interface 720 may be displayed in the extra area depending on the difference between the sizes of the display screens. The control interface 720 may be displayed in the extra area of the electronic device having the relatively large-sized display panel in an area of the display panel that is not aligned with the electronic device having the relatively small-sized display panel. According to various embodiments of the present disclosure, the content presenting system 700 (e.g., the master electronic device thereof) may configure the format and/or characteristics of the content 710 (or otherwise instruct one or more of the slave electronic devices among the content presenting system 700) to present (e.g., display or otherwise provide) the respective content on the corresponding electronic device. For example, the format and/or characteristics of the content 710 may be configured to be presented (e.g., displayed or otherwise provided) by electronic devices having varying capabilities (e.g., electronic devices having varying sizes and shapes of display capabilities).

According to various embodiments of the present disclosure, the control interface 720 may include at least one of a volume control bar 724, a progressive bar 726, a reproducible content list (not illustrated), and buttons (not illustrated) corresponding to display control commands (e.g., play, seek, pause, stop, and/or the like).

Figure 8:
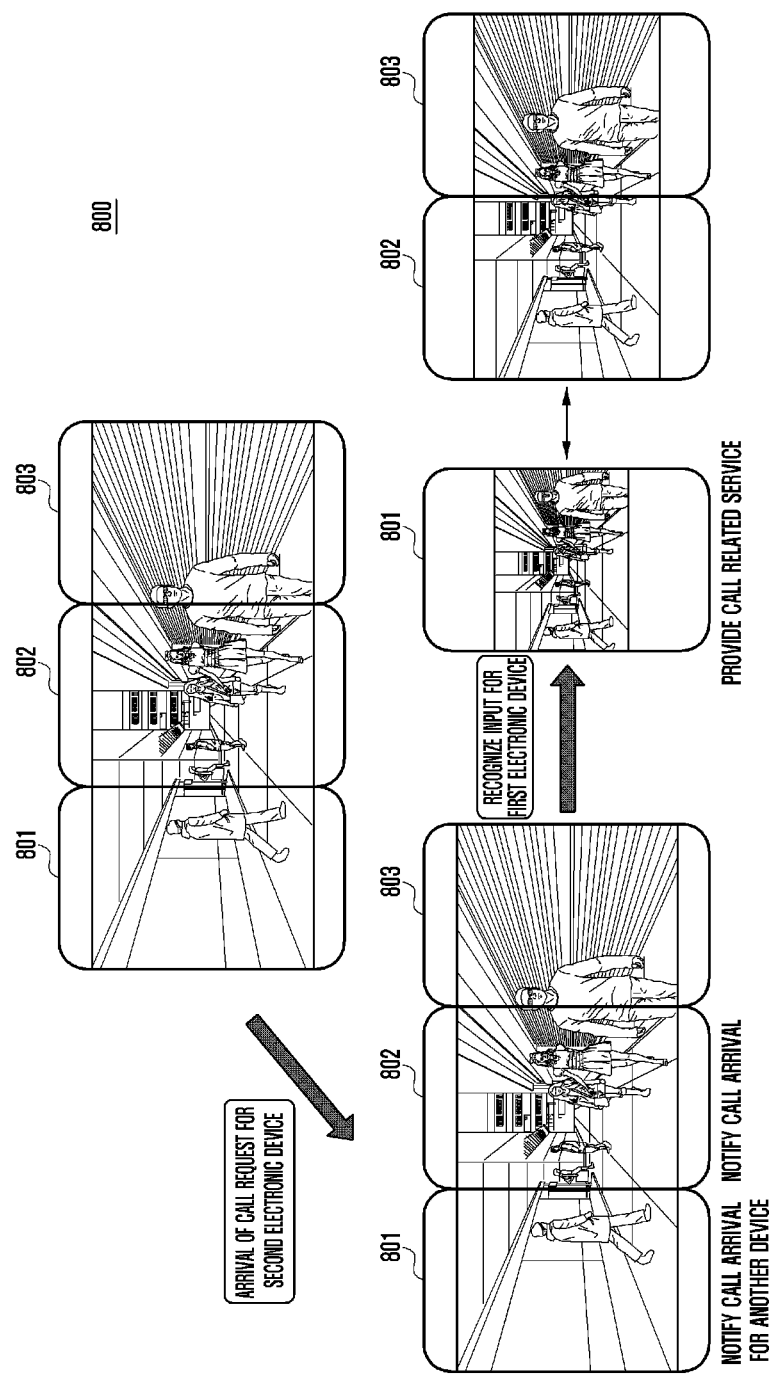
FIG. 8 illustrates an example in which, when a notification event is generated in one of electronic devices of a content presenting system, a service corresponding to the notification event is provided through another electronic device according to various embodiments of the present disclosure.

FIG. 8 illustrates an example in which, when a notification event is generated in one of electronic devices of a content presenting system, a service corresponding to the notification event is provided through another electronic device according to various embodiments of the present disclosure.

Referring to FIG. 8, a content presenting system 800 according to various embodiments of the present disclosure may be the content presenting system 100 illustrated in FIG. 1 or the content presenting system 200 illustrated in FIG. 2.

Referring to FIG. 8, the content presenting system 800 may include a first electronic device 801, a second electronic device 802, and a third electronic device 803. All the electronic devices 801 to 803 of the content presenting system 800 may operate in the multi-vision mode.

According to various embodiments of the present disclosure, when a notification event (e.g., telephone call incoming) is generated for one electronic device (e.g., the second electronic device 802) of the content presenting system 800 (e.g., in response to generation of a notification event for one electronic device of the content presenting system 800), the notification event may be forwarded to another electronic device set in advance (e.g., the first electronic device 801), and the preset electronic device (e.g., the first electronic device 801) may display the notification event.

Based on a user input for the other electronic device (e.g., the first electronic device 801) displaying the notification event, an application corresponding to the notification event is executed through another electronic device (e.g., the first electronic device 801), thereby providing a service corresponding to the notification event.

Figure 9:
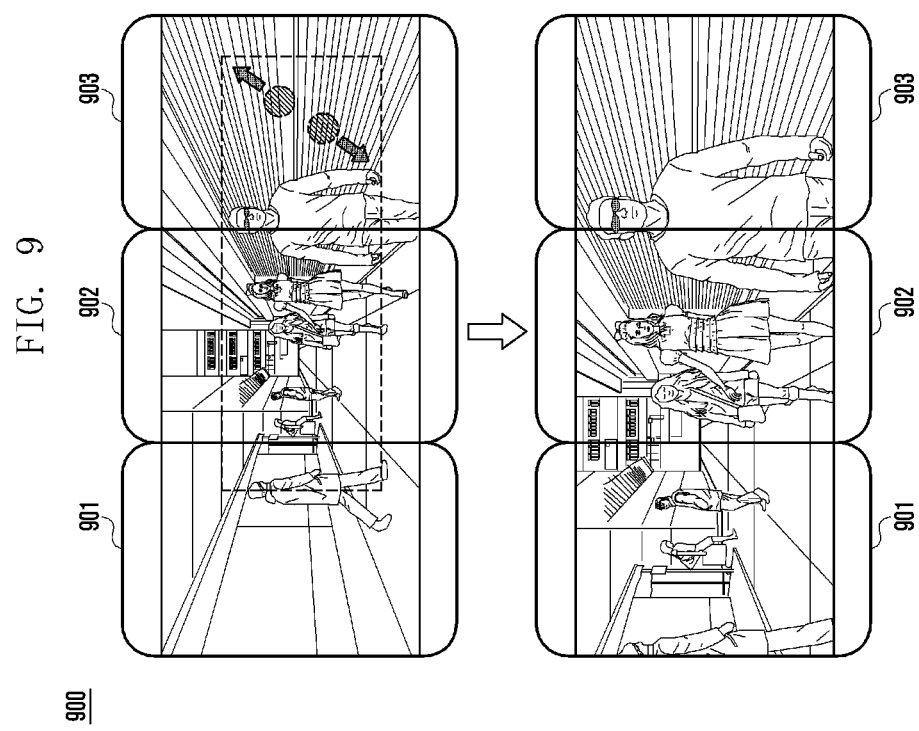
FIG. 9 illustrates an example of adjusting content corresponding to electronic devices based on a user input for at least some electronic devices of a content presenting system according to various embodiments of the present disclosure.

FIG. 9 illustrates an example of adjusting content corresponding to electronic devices based on a user input for at least some electronic devices of a content presenting system according to various embodiments of the present disclosure.

Referring to FIG. 9, a content presenting system 900 according to various embodiments of the present disclosure may be the content presenting system 100 illustrated in FIG. 1 or the content presenting system 200 illustrated in FIG. 2.

Referring to FIG. 9, the content presenting system 900 may include a first electronic device 901, a second electronic device 902, and a third electronic device 903. All the electronic devices 901 to 903 of the content presenting system 900 may operate in the multi-vision mode.

According to various embodiments of the present disclosure, one electronic device (e.g., the third electronic device 903) of the content presenting system may receive (e.g., detect) a user input (e.g., a pinch-zoom input) for zooming in or out of the entire content with respect to the content presented through the corresponding electronic device (e.g., the third electronic device 903). The content presenting system 900 may recognize (e.g., determine) reference coordinates of the user input and a change in the reference coordinates. The content presenting system 900 (e.g., a master electronic device of the content presenting system 900, a slave electronic device of the content presenting system 900, and/or the like) may determine a magnification level for zooming in or out the content presented (e.g., displayed or otherwise provided) by the corresponding electronic device (e.g., the third electronic device 903) based on the change in the reference coordinates. The content presenting system 900 (e.g., a master electronic device of the content presenting system 900, a slave electronic device of the content presenting system 900, and/or the like) may determine a new content portion corresponding to the corresponding electronic device (e.g., the third electronic device 903) based on the reference coordinates and the magnification level. The content presenting system 900 (e.g., a master electronic device of the content presenting system 900, a slave electronic device of the content presenting system 900, and/or the like) may determine new content portions corresponding to the remaining electronic devices based on the new content portion corresponding to the corresponding electronic device (e.g., the third electronic device 903) having received the user input.

Figure 10:
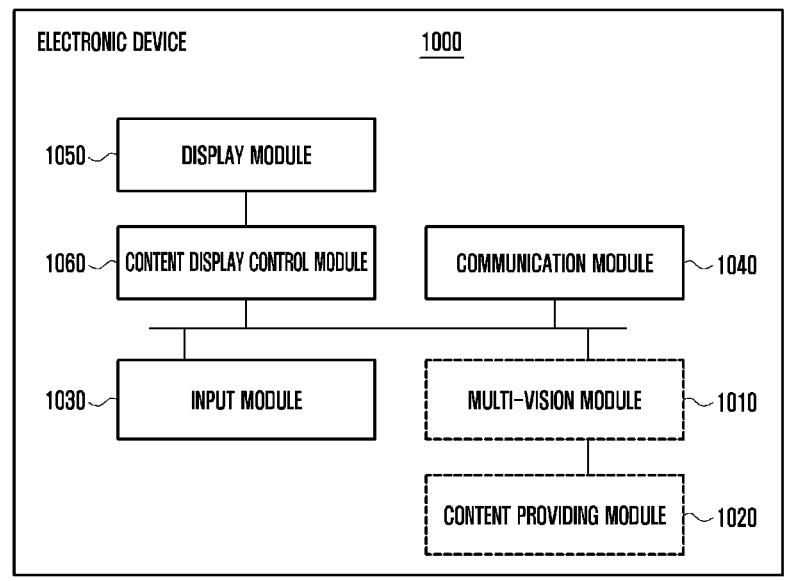
FIG. 10 is a block diagram schematically illustrating an electronic device for presenting content according to various embodiments of the present disclosure.

FIG. 10 is a block diagram schematically illustrating an electronic device for presenting content according to various embodiments of the present disclosure.

Referring to FIG. 10, as an example, the electronic device 1000 according to various embodiments of the present disclosure may be one of the master 110 and the first to third slaves 120 to 140 illustrated in FIG. 1 and the plurality of electronic devices 210 to 240 illustrated in FIG. 2.

Referring to FIG. 10, the electronic device 1000 may include an input module 1030, a communication module 1040, a display module 1050, and a content display control module 1060. In a case according to which the electronic device 1000 is an electronic device (e.g., the master 110 of FIG. 1) configured to perform a function of a master in a content presenting system, the electronic device 1000 may further include a multi-vision module 1010 and a content providing module 1020.

The multi-vision module 1010 may store, change, or manage an electronic device list of the content presenting system including the electronic device 1000. Based on an input for at least one of electronic devices belonging to the content presenting system including the electronic device 1000, the multi-vision module 1010 may determine and/or change an operating mode (e.g., multi-vision mode or single vision mode) of the corresponding electronic devices. The multi-vision module 1010 may configure or adjust a position of the electronic devices according to the operating mode of the electronic devices belonging to the content presenting system including the electronic device 1000. In a case according to which the content presenting system includes two or more multi-vision, the multi-vision module 1010 may configure or adjust multi-vision group information.

The multi-vision module 1010 may generate control information corresponding to the respective electronic devices of the content presenting system including the electronic device 1000. According to various embodiments of the present disclosure, based on a position of the electronic devices operating in the multi-vision mode among the electronic devices of the content presenting system, the multi-vision module 1010 may configure audio channel information of the electronic devices operating in the multi-vision mode, and may determine content portions (e.g., a screen division size) corresponding to the electronic devices operating in the multi-vision mode.

According to various embodiments of the present disclosure, the multi-vision module 1010 may create presentation configuration information (e.g., brightness, a play speed (access time), volume, and/or the like) which will be applied to the electronic devices of the content presenting system. For example, the multi-vision module 1010 may create the presentation configuration information such that the presentation configuration information applied to the electronic device 1000 is applied to the remaining electronic devices of the content presenting system. Based on the presentation configuration information, the remaining electronic devices may present (e.g., display or otherwise provide) the corresponding content using the same configuration as the electronic device 1000. This is only an embodiment of the present disclosure, and the multi-vision module 1010 may create presentation configuration information corresponding to the respective electronic devices such that the electronic devices differently apply at least some portions of the presentation configuration information according to the type of content, or a relative position, a display screen size, a battery status, currently executed applications or processes (e.g., having a higher priority than display of content), and/or the like of the electronic devices.

According to various embodiment of the present disclosure, the multi-vision module 1010 may create synchronization information which will be applied to the electronic devices of the content presenting system. For example, the multi-vision module 1010 may correct the synchronization information of the electronic device 1000 (e.g., video reproduction time, player engine time, audio time, system time, and/or the like) to correspond to the remaining electronic devices, and may transmit the corrected synchronization information to the remaining electronic devices.

The content providing module 1020 provides content stored in the electronic device 1000 or a storage device functionally connected with the electronic device 1000 to the remaining electronic devices. According to various embodiments of the present disclosure, the content providing module 1020 may be implemented as an HTTP server module which the remaining electronic devices may access. At this time, the content providing module 1020 may open a TCP/IP connection with the remaining electronic devices to more reliably provide the content.

The input module 1030 may transfer (or otherwise communicate) a user input (e.g., a shake, a drag, and/or the like) which was input through an input sensor (e.g., a touch sensor, a gesture sensor, a hovering sensor, a voice sensor, and/or the like) that is functionally connected to the electronic device 1000 to the multi-vision module 1010 located in the electronic device 1000 or the remaining electronic devices. For example, in the case according to which the electronic device 1000 is an electronic device (e.g., the master 110 of FIG. 1) configured to perform the function of the master in the content presenting system, the input module 1030 may transfer the user input to the multi-vision module 1010 located in the electronic device 1000. In the case according to which the electronic device 1000 is an electronic device (e.g., the slaves 120, 130, and 140 of FIG. 1) configured to perform the function of the slave in the content presenting system, the input module 1030 may transfer the user input to the multi-vision module 1010 located in at least one (e.g., the master 110 of FIG. 1) of the remaining electronic devices through the communication module 1040 which will be described below.

In addition, the input module 1030 may recognize (e.g., determine or otherwise detect) a distance or relative position between the electronic device 1000 and another electronic device using the user input. For example, the input module 1030 may use a separate sensor (e.g., a proximity sensor, a grip sensor, an NFC sensor, and/or the like) for recognition (e.g., determination) of the distance or relative position. Furthermore, the input module 1030 may also measure the distance or relative position between the electronic device 1000 and another electronic device in the communication process between the electronic device 1000 and the other electronic device.

The communication module 1040 may open a connection between the electronic device 1000 and at least some (e.g., at least a subset of) of the remaining electronic devices, and may transmit/receive at least some pieces of information (e.g., the electronic device list of the content presenting system, the operating modes corresponding to the electronic devices of the content presenting system, the audio channel information, the content portion information, the presentation configuration information, the synchronization information, and/or the like) generated by the multi-vision module 1010 located in the electronic device 1000 or at least one of the remaining electronic devices to/from at least one of the remaining electronic devices through the opened connection.

The display module 1050 may present (e.g., display or otherwise provide) content through a display screen that is functionally connected to the electronic device 1000. According to various embodiments of the present disclosure, in the case according to which the electronic device 1000 is the electronic device (e.g., the master 110 of FIG. 1) configured to perform the function of the master in the content presenting system, the display module 1050 may present (e.g., display or otherwise provide) the content stored in the electronic device 1000 or the storage device functionally connected with the electronic device 1000. According to various embodiments of the present disclosure, in the case according to which the electronic device 1000 is the electronic device (e.g., the slaves 120, 130, and 140 of FIG. 1) configured to perform the function of the slave in the content presenting system, the display module 1050 may receive content from the external content providing module 1020.

The content display control module 1060 may control the display module 1050 such that the electronic device 1000 operates in at least one of the multi-vision mode and the single-vision mode, at least based on the operating mode of the electronic device 1000. The content display control module 1060 may control displaying the content through the display module 1050, based on at least some pieces of information (e.g., the electronic device list of the content presenting system, the operating modes corresponding to the electronic devices of the content presenting system, the audio channel information, the content portion information, the presentation configuration information, the synchronization information, and/or the like) generated by the multi-vision module 1010 located in the electronic device 1000 or at least one of the remaining electronic devices.

According to various embodiments of the present disclosure, the content display control module 1060 may determine the electronic device 1000 as a master or slave of the content presenting system according to a user input. In the case according to which the electronic device 1000 is determined as the master, the content display control module 1060 may create the multi-vision module 1010 and the content providing module 1020 within the electronic device 1000 such that the electronic device 1000 may operate as the master.

According to various embodiments of the present disclosure, in the case according to which the electronic device 1000 is the electronic device (e.g., the slaves 120, 130, and 140 of FIG. 1) configured to perform the function of the slave in the content presenting system, the content display control module 1060 may receive an instruction from the electronic device (e.g., the master 110 of FIG. 1) configured to perform the function of the master in the content presenting system, and may create some modules (e.g., a synchronization information generating module 1260) of the multi-vision module 1010 within the electronic device 1000.

Figure 11:
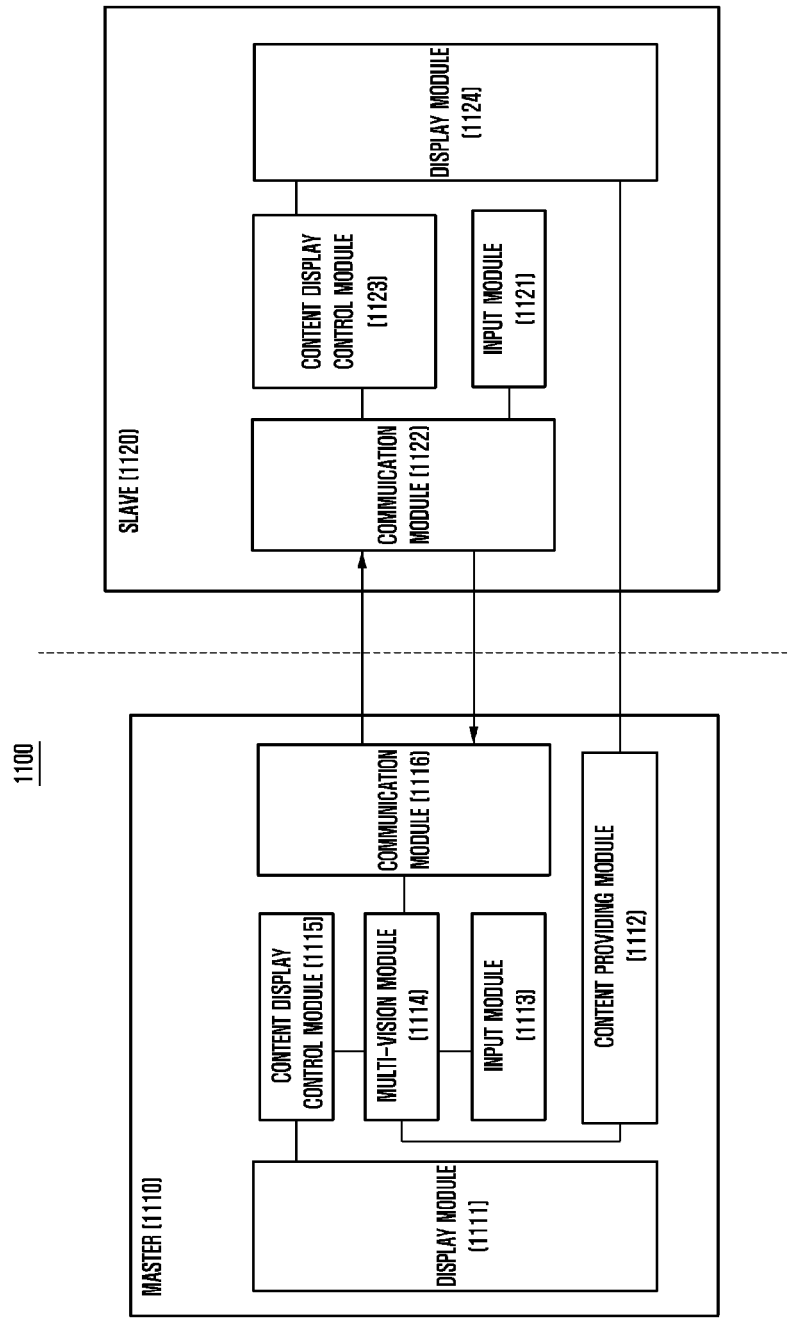
FIG. 11 is a block diagram schematically illustrating a master and a slave of a content presenting system according to various embodiments of the present disclosure.

FIG. 11 is a block diagram schematically illustrating a master and a slave of a content presenting system according to various embodiments of the present disclosure.

Referring to FIG. 11, a content presenting system 1100 according to various embodiments of the present disclosure may be, for example, the content presenting system 100 illustrated in FIG. 1 or the content presenting system 200 illustrated in FIG. 2.

Referring to FIG. 11, the content presenting system 1100 may include a master 1110 and a slave 1120.

The master 1110 includes a display module 1111, a content providing module 1112, an input module 1113, a multi-vision module 1114, a content display control module 1115, and a communication module 1116. For example, the master 1110 may be the master 100 illustrated in FIG. 1 or the electronic device 1000 illustrated in FIG. 10.

The display module 1111 may display (e.g., reproduce) content stored in a storage device (not illustrated) that is functionally connected to the master 1110.

The content providing module 1112 may provide specific content to be displayed through the display module 1111 to another external device (e.g., the slave 1120). According to various embodiments of the present disclosure, the content providing module 1112 may create link information through which the other electronic device (e.g., the slave 1120) may access the specific content. For example, the content providing module 1112 may be implemented in the form of an HTTP server.

The input module 1113 may receive a first user input (e.g., a drag or a shake) for a change in the operating mode of the master 1110 through a sensor (not illustrated) or input device (not illustrated) functionally connected to the master 1110.

The multi-vision module 1114 may determine or change an operating mode (e.g., multi-vision mode or single-vision mode) and position information of the master 1110 or the other electronic device (e.g., the slave 1120) based on at least one of the first user input received through the input module 1113 and a second user input for the change in the operating mode of the another electronic device (e.g., the slave 1120).

The multi-vision module 1114 may configure content portion information and audio channel configuration information corresponding to the master 1110 or another electronic device (e.g., the slave 1120) based on the operating mode and the position information of the master 1110 or the other electronic device (e.g., the slave 1120). The multi-vision module 1114 may determine presentation configuration information of the remaining electronic devices based on presentation configuration information of at least one of the master 1110 and another electronic device (e.g., the slave 1120). The multi-vision module 1114 may create synchronization information of the other electronic device (e.g., the slave 1120) based on synchronization information of the master 1110.

The content display control module 1115 may control the display module 1111 to display content in the operating mode (e.g., multi-vision mode or single-vision mode) corresponding to the first user input, based on the operating mode, the position information, the content portion information, the audio channel configuration information, the presentation configuration information, and/or the like of the master 1110.

According to various embodiments of the present disclosure, the communication module 1116 may receive the content to be presented (e.g., displayed or otherwise provided) by the content presenting system 1100 (e.g., by the master 1110). For example, the communication module 1116 may receive the corresponding content from a server (e.g., the master 1110 may stream the content from a content server).

The communication module 1116 may transmit, to another electronic device (e.g., the slave 1120), the operating mode, the position information, the content portion information, the audio channel configuration information, the presentation configuration information, the synchronization information, the link information of the content, and/or the like of the other electronic device (e.g., the slave 1120). According to various embodiment of the present disclosure, the link information of the content may be implemented to be acquired by the multi-vision module 1114 from the content providing module 1112 and to be transferred to the communication module 1116. According to various embodiments of the present disclosure, the link information of the content may be implemented to be transferred from the content providing module 1112 to the communication module 1116.

The communication module 1116 may receive the second user input for the change in the operating mode from the other electronic device (e.g., the slave 1120), and may transfer the received second user input to the multi-vision module 1114. According to various embodiments of the present disclosure, the communication module 1116 may additionally receive the presentation configuration information (e.g., brightness, a reproduction speed (access time), volume, and/or the like) of the content displayed in another electronic device (e.g., the slave 1120), and may transfer the received presentation configuration information to the multi-vision module 1114.

The slave 1120 includes an input module 1121, a communication module 1122, a content display control module 1123, and a display module 1124. For example, the slave 1120 may be the master 100 illustrated in FIG. 1 or the electronic device 900 illustrated in FIG. 9.

The input module 1121 may receive the second user input (e.g., drag or shake) for the change in the operating mode of the slave 1120.

According to various embodiments of the present disclosure, the communication module 1122 may receive the content to be presented (e.g., displayed or otherwise provided) by the content presenting system 1100 (e.g., by the slave 1120). For example, the communication module 1122 may receive the corresponding content from a server (e.g., the slave 1120 may stream the content from a content server). As another example, the communication module 1122 may receive the corresponding content from the slave 1110.

The communication module 1122 may transmit the second user input for the change in the operating mode of the slave 1120 to the master 1110. The communication module 1122 may receive, from the master 1110, the operating mode, the position information, the content portion information, the audio channel configuration information, the presentation configuration information, the synchronization information, the link information of the content, and/or the like corresponding to the slave 1120. According to various embodiments of the present disclosure, the communication module 1122 may additionally transmit, to the master 1110, the presentation configuration information (e.g., brightness, a reproduction speed (access time), volume, and/or the like) of the content being displayed through the display module 1124.

The content display control module 1123 may provide the link information of the content received through the communication module 1122 to the display module 1124, and may control the display module 1124 based on the operating mode, the position information, the content portion information, the audio channel configuration information, the presentation configuration information, and/or the like which have been received through the communication module 1122.

The display module 1124 receives content based on the link information of the content. The display module 1124 may display the received content in the operating mode (e.g., multi-vision mode or single-vision mode) corresponding to the second user input based on the control of the content display control module 1123.

Figure 12:
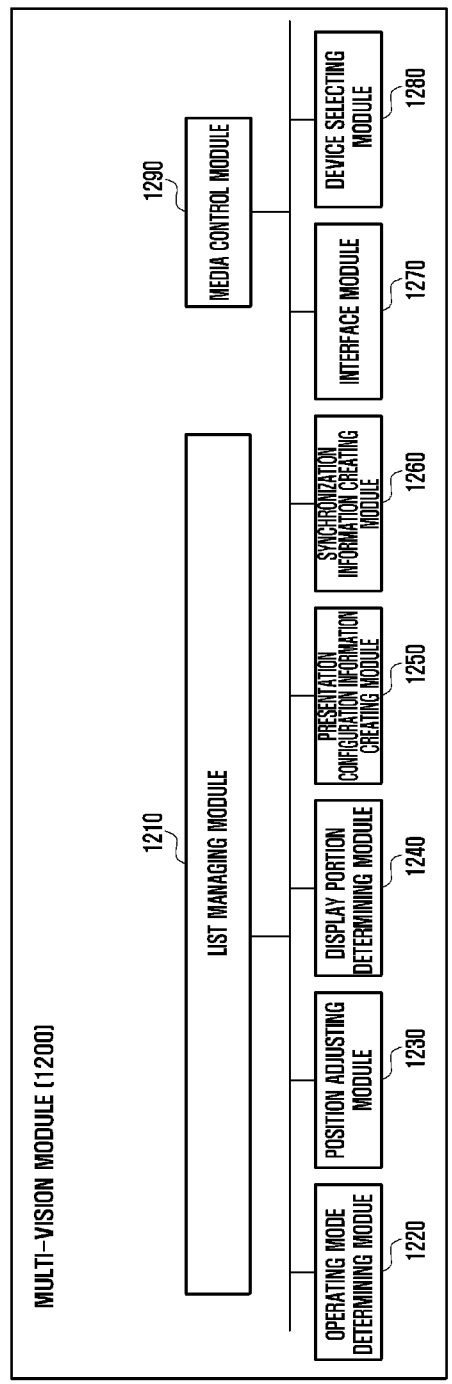
FIG. 12 is a block diagram schematically illustrating a multi-vision module of an electronic device according to various embodiments of the present disclosure.

FIG. 12 is a block diagram schematically illustrating a multi-vision module of an electronic device according to various embodiments of the present disclosure.

Referring to FIG. 12, the multi-vision module 1200 according to various embodiment of the present disclosure may be, for example, the multi-vision module 1010 illustrated in FIG. 10 or the multi-vision module 1114 illustrated in FIG. 11.

Referring to FIG. 12, the multi-vision module 1200 may include a list managing module 1210, an operating mode determining module 1220, a position adjusting module 1230, a display portion determining module 1240, a presentation configuration information creating module 1250, a synchronization information creating module 1260, and an interface module 1270. The multi-vision module 1200 may also include a device selecting module 1280, a media control module 1290, and/or the like.

The list managing module 1210 may store and manage an electronic device list of a content presenting system. While the content presenting system presents content through a plurality of electronic devices, the list managing module 1210 may manage information of the electronic devices presenting the content using the electronic device list. In a case according to which there is an electronic device added to or separated from the content presenting system by a user input (e.g., in response to the user input), the list managing module 1210 may add/remove information of the corresponding electronic device to/from the electronic device list.

The operating mode determining module 1220 may determine the operating mode of at least one of the plurality of electronic devices of the content presenting system based on an input for at least one of the electronic devices. According to various embodiments of the present disclosure, when a shake input is recognized (e.g., in response to detection of the shake input) for one of the plurality of electronic devices, the operating mode determining module 1220 may determine the operating mode of the electronic device corresponding to the recognized (e.g., detected) shake input as the single-vision mode. For example, even though the operating mode of the electronic device corresponding to the shake input has already been configured as the multi-vision mode, the operating mode determining module 1220 may change the corresponding operating mode from the multi-vision mode to the single-vision mode. According to various embodiments of the present disclosure, when a drag input is recognized (e.g., in response to detection of the drag input) for two or more of the plurality of electronic devices, the operating mode determining module 1220 may determine the operating mode of the electronic device corresponding to the recognized (e.g., detected) drag input as the multi-vision mode. For example, in a case according to which three electronic devices correspond to a drag input, the direction of the drag input is recognized (e.g., detected) as a direction from the leftmost electronic device to the rightmost electronic device, the operating mode of the rightmost electronic device is the multi-vision mode, and the operation mode of the remaining two electronic devices is the single-vision mode, the operating mode determining module 1220 may change the operating mode of the remaining two electronic devices from the single-vision mode to the multi-vision mode.

The position adjusting module 1230 may adjust a position of the plurality of electronic devices of the content presenting system based on the operating mode determined by the operating mode determining module 1220. According to various embodiments of the present disclosure, in a case according to which an operating mode of an electronic device is changed from the multi-vision mode to the single-vision mode by the operating mode determining module 1220, the position adjusting module 1230 may change a position value corresponding to position information of the corresponding electronic device to "−1", and may adjust the position information of the remaining electronic devices other than the corresponding electronic device.

According to various embodiments of the present disclosure, in a case according to which an operating mode of an electronic device is changed from the single-vision mode to the multi-vision mode by the operating mode determining module 1220, the position adjusting module 1230 may analyze the user input (e.g., the drag for two or more electronic devices) corresponding to the change of the operating mode, and may determine a position value of the electronic device of which the operating mode has been changed from the single-vision mode to the multi-vision mode. For example, based on the user input (e.g., the direction of the drag), the position adjusting module 1230 may determine a value obtained by increasing or decreasing the position value of the electronic device operating in the multi-vision mode among the electronic devices corresponding to the user input as the position value of the electronic device of which the operating mode has been changed from the single-vision mode to the multi-vision mode.

The display portion determining module 1240 may configure audio channel information of multi-vision electronic devices, and may divide content into content portions corresponding to the multi-vision electronic devices, based on the position of the multi-vision electronic devices of which the operating mode has been configured as the multi-vision mode among the plurality of electronic devices of the content presenting system.

According to various embodiments of the present disclosure, the display portion determining module 1240 may configure audio channel information corresponding to the electronic devices located at opposite ends (e.g., the electronic device having the position value of 1 and the electronic device having the largest position value) among the multi-vision electronic devices so as to reproduce audio included in the content through two channels.

According to various embodiments of the present disclosure, in order to divide and reproduce a video included in the content in correspondence to the multi-vision electronic devices, the display portion determining module 1240 may designate content portions corresponding to the multi-vision electronic devices based on a ratio of the display size of each multi-vision electronic device to the sum of the display size of all the multi-vision electronic devices, and the position information of the multi-vision electronic devices. For example, in a case according to which all the multi-vision electronic devices have the display of the same size, the display portion determining module 1240 may equally divide the video included in the content into video reproduction areas of the same number as that of the multi-vision electronic devices, and may allocate the equally divided video reproduction areas as the content portions corresponding to the multi-vision electronic devices according to the position information of the multi-vision electronic devices. The video reproduction areas may be partial areas of the entire video reproduction screen, and may be specified by at least one piece of information of at least one position coordinate for designating the partial areas and the size of the partial areas (a horizontal or vertical size).

The presentation configuration information creating module 1250 may determine presentation configuration information (e.g., brightness, a reproduction speed (access time), volume, and/or the like) of the plurality of electronic devices of the content presenting system. According to various embodiments of the present disclosure, the presentation configuration information of the multi-vision electronic devices of which the operating mode has been configured as the multi-vision mode may be identically configured. For example, the presentation configuration information of the remaining electronic devices may be configured to be the same as that of the electronic device (e.g., the master 1110 of FIG. 11) in which the multi-vision module is located.

The synchronization information creating module 1260 may create synchronization information serving as a synchronization reference of the plurality of electronic devices such that the plurality of electronic devices of the content presenting system may be synchronized with each other to present (e.g., display or otherwise provide) the content. According to various embodiments of the present disclosure, the synchronization information creating module 1260 may create current time information (e.g., a video reproduction clock (time stamp) of the content being reproduced by the display module, an audio reproduction clock (time stamp), a base clock (time stamp) of the display module, a system clock (time stamp) of the electronic device including the display module, and/or the like) related to presenting (e.g., displaying or otherwise providing) the content by the electronic device (e.g., the master 1110 of FIG. 11) in which the multi-vision module is located among the plurality of electronic devices. The electronic devices may compensate for a delay occurring in the process of transferring the synchronization information, and may present (e.g., display or otherwise provide) the content based on the compensated synchronization information.

The interface module 1270 may transfer the information created by other elements of the multi-vision module 1200, for example, the operating mode determining module 1220, the position adjusting module 1230, the display portion determining module 1240, the synchronization information creating module 1260, and/or the like to the outside of the multi-vision module 1200.

According to various embodiments of the present disclosure, the interface module 1270 may transfer the audio channel information, the content portion information, and the presentation configuration information which have been configured to correspond to the electronic device (e.g., the master 1110 of FIG. 11) in which the multi-vision module is located among the plurality of electronic devices, to the content display control module which is functionally connected with the multi-vision module or included in the electronic device in which the multi-vision module is located. The interface module 1270 may transfer, to the remaining electronic devices, the operating mode information, the position information, the audio channel information, the content portion information, and the presentation configuration information corresponding to the remaining electronic devices through the communication module which is functionally connected with the multi-vision module or included in the electronic device in which the multi-vision module is located. Additionally, the interface module 1270 may transfer, to the remaining electronic devices, the link information (e.g., a URL) of the content to be presented (e.g., displayed or otherwise provided) by the remaining electronic devices.

The device selecting module 1280 may select at least one electronic device belonging to the multi-vision group (or a group including the at least one electronic device) based on at least one of information of the at least one electronic device belonging to the multi-vision group and a user input for the at least one electronic device belonging to the multi-vision group. According to an embodiment of the present disclosure, at least one electronic device selected by the device selecting module 1280 may perform different functions related to presenting (e.g., displaying or otherwise providing) the content. For example, at least one electronic device selected by the device selecting module 1280 may operate as at least one of a control interface, an audio output device, or a notification service providing device.

The media control module 1290 may receive a user's display control command (e.g., play, seek, pause, stop, and/or the like) for the corresponding content through the control interface functionally connected to at least one of the plurality of electronic devices of the content presenting system, and may generate a display control signal corresponding to the received control command. The media control module 1290 may transfer the display control signal to another module (e.g., the display module 1050) of the electronic device (e.g., the master 1110 of FIG. 11) in which the multi-vision module is located, through the interface module 1270.

Figure 13:
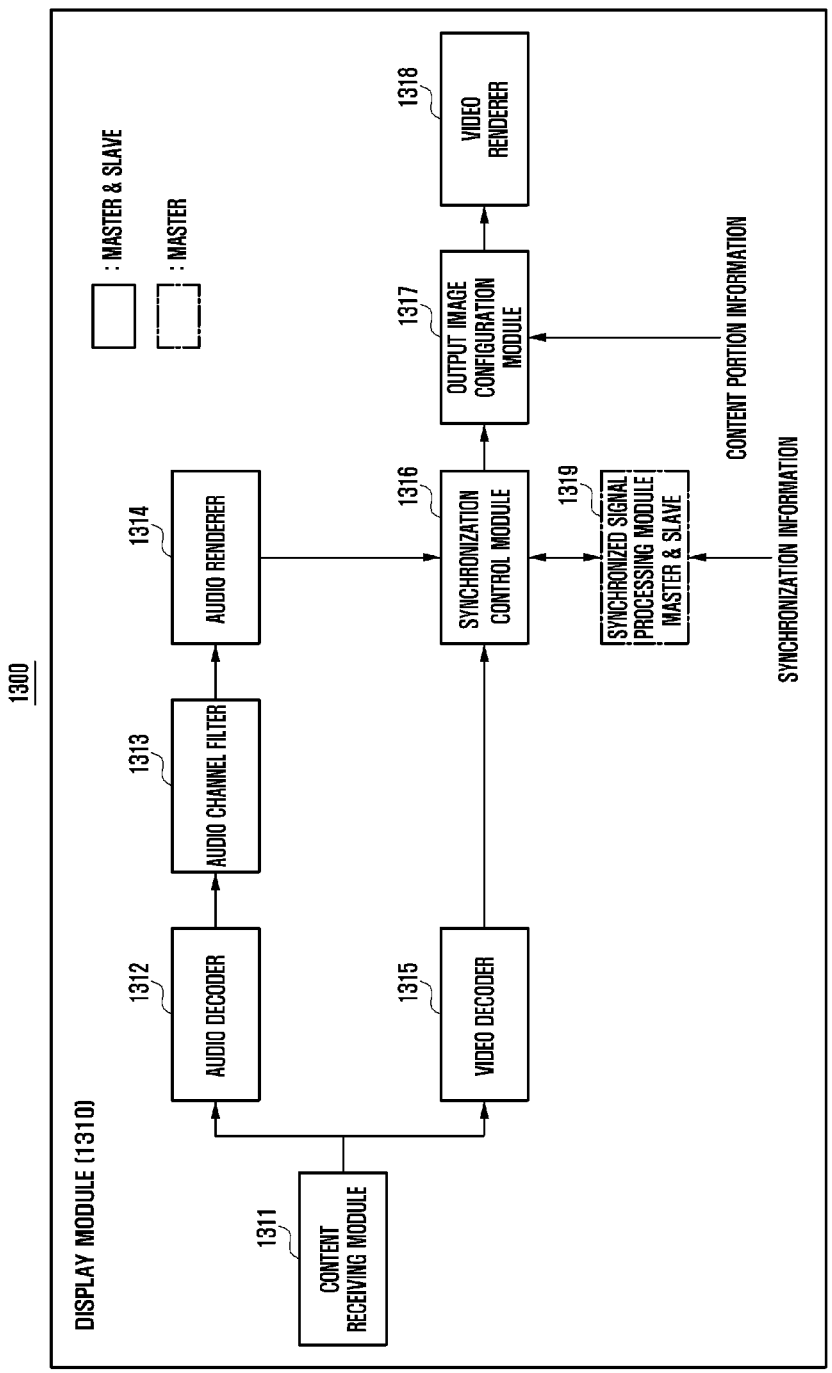
FIG. 13 is a block diagram schematically illustrating a display module of an electronic device according to various embodiments of the present disclosure.

FIG. 13 is a block diagram schematically illustrating a display module of an electronic device according to various embodiments of the present disclosure.

Referring to FIG. 13, the electronic device 1300 according to various embodiments of the present disclosure may be one of, for example, the electronic device 1000 illustrated in FIG. 10, and the master 1110 and the slave 1120 which are illustrated in FIG. 11.

Referring to FIG. 13, the electronic device 1300 may include the display module 1310 (e.g., the display module 1050 of FIG. 10 and the display modules 1111 and 1124 of FIG. 11). The display module 1310 may include a content receiving module 1311, an audio decoder 1312, an audio channel filter 1313, an audio renderer 1314, a video decoder 1315, a synchronization control module 1316, an output image configuration module 1317, and a video renderer 1318.

The content receiving module 1311 may receive a content signal which is stored in a storage device functionally connected with the content receiving module 1311, or is encoded for content transmission from an external content providing server (e.g., the content providing module 1020 of FIG. 10).

The audio decoder 1312 may extract an audio signal from the content signal received by the content receiving module 1311. The audio decoder 1312 may acquire audio channel configuration information of the content (e.g., PCM data) by decoding the extracted audio signal. According to various embodiments of the present disclosure, the audio channel configuration information may include, for example, audio output information corresponding to all electronic devices belonging to a content presenting system (e.g., the content presenting system 100 of FIG. 1), and/or the like.

The audio channel filter 1313 may obtain audio output information corresponding to the electronic device 1300 from the audio channel configuration information of the content (e.g., PCM data).

The audio renderer 1314 may reproduce the audio through an audio output device (e.g., a speaker, earphones, and/or the like) functionally connected with the display module 1310 based on the audio output information of the electronic device 1300 obtained by the audio channel filter 1313.

The video decoder 1315 may extract a video signal from the content signal received by the content receiving module 1311. The video decoder 1315 may obtain video source data (e.g., RGB data) by decoding the extracted video signal.

For synchronization between the audio and the video, the synchronization control module 1316 may obtain an audio clock of the audio output information from the audio renderer 1314, and may adjust a video clock of the video source data to be suitable for the obtained audio clock.

The output image configuration module 1317 may obtain partial video source data corresponding to the electronic device 1300 among the video source data based on content portion information corresponding to the electronic device 1300.

The video renderer 1318 may reproduce the video through a video display device (e.g., a display panel or the like) that is functionally connected with the display module 1310 based on the partial video source data.

The display module 1310 may additionally include a synchronized signal processing module 1319 when the electronic device 1300 is a slave (e.g., the slave 1120 of FIG. 11). The synchronized signal processing module 1319 may compensate for the synchronization information of the master (e.g., the master 1110 of FIG. 11) received from the master (e.g., the master 1110 of FIG. 11), for synchronization between the electronic device 1300 which is the slave (e.g., the slave 1120 of FIG. 11) and the master (e.g., the master 1110 of FIG. 11). The synchronization information of the master may include at least one of, for example, a video reproduction clock of the master, an audio reproduction clock, a base clock of the display module, and/or the like.

According to various embodiments of the present disclosure, the synchronized signal processing module 1319 may compensate for the synchronization information of the master in view of the delay until the synchronization information reaches the synchronized signal processing module 1319 of the electronic device 1300. The synchronized signal processing module 1319 may compensate for the synchronization information of the master based on, for example, the system clock of the master and the system clock of the electronic device 1300.

According to various embodiments of the present disclosure, the synchronized signal processing module 1319 transfers the compensated synchronization information of the master to the synchronization control module 1316. The audio clock or the video clock of the synchronization control module 1316 may be adjusted to conform to the synchronization information of the master.

According to various embodiments of the present disclosure, an electronic device includes a memory for storing information on a plurality of electronic devices comprising at least a first electronic device and a second electronic device, and one or more processors for executing a multi-vision module, and the multi-vision module may be configured to identify (e.g., detect) an input for at least one of the plurality of electronic devices while content is being presented (e.g., displayed or otherwise provided) through the plurality of electronic devices such that a first portion of the content is displayed through the first electronic device and a second portion of the content is displayed through the second electronic device; set the plurality of electronic devices as a first group comprising the first electronic device and a second group comprising the second electronic device based on at least the input; and control one or more of the plurality of electronic devices such that the content is to be independently presented (e.g., displayed or otherwise provided) through the first group and the second group, based on the setting.

According to various embodiments of the present disclosure, the multi-vision module may be configured to control the one or more electronic devices such that the content is to be displayed through the first group, and at the same time, the content is to be displayed through the second group.

According to various embodiments of the present disclosure, the electronic device may include the first electronic device, the second electronic device, or at least one electronic device.

According to various embodiments of the present disclosure, the multi-vision module may be configured to control the one or more electronic devices such that the content is to be displayed through the first group, and at the same time, the content is to be displayed through the second group.

According to various embodiments of the present disclosure, the first group and the second group may include a plurality of electronic devices.

According to various embodiments of the present disclosure, the multi-vision module may be configured to receive at least one of a gesture, a touch, and a voice of a user, and a distance between at least two or more of the plurality of electronic devices as the input.

According to various embodiments of the present disclosure, the multi-vision module may be configured to control one or more electronic devices such that a third group comprising an electronic device belonging to the first group or an electronic device belonging to the second group is additionally set based on an input for at least one of the plurality of electronic devices, and the content is independently provided through the third group or the remaining groups.

According to various embodiments of the present disclosure, the multi-vision module may be configured to control the one or more electronic devices such that the content is displayed while being divided into portions corresponding to the plurality of electronic devices set as at least one of the first group and the second group.

According to various embodiments of the present disclosure, the multi-vision module may be configured to control one or more electronic devices such that the content is displayed by the plurality of electronic devices included in at least one of the first group and the second group.

According to various embodiments of the present disclosure, the content may include a plurality of pieces of content including first content and second content, and the multi-vision module may be configured to control the one or more electronic devices such that the first content is displayed through the first group, and the second content is displayed through the second group.

According to various embodiments of the present disclosure, the content may include multimedia content, and the multi-vision module may be configured to control the one or more electronic devices such that data corresponding to a first display point of the multimedia content is displayed through the first group, and at the same time, data corresponding to a second display point of the multimedia content is displayed through the second group.

According to various embodiments of the present disclosure, an electronic device may include a memory for storing information on a plurality of electronic devices comprising at least a first electronic device and a second electronic device. The electronic device may also include one or more processors for executing a multi-vision module. The multi-vision module may be configured to set at least one of the plurality of electronic devices based on at least one of information on the plurality of electronic devices and a user input for at least one of the plurality of electronic devices. The multi-vision module may also be configured present content through the plurality of electronic devices such that a first portion of the content is displayed through the first electronic device and a second portion of the content is displayed through the second electronic device. The multi-vision module may also be configured to control one or more of the plurality of electronic devices such that another function related to the presenting of the content is performed through at least one electronic device based on the setting.

According to various embodiments of the present disclosure, the multi-vision module may be configured to control one or more electronic devices such that another function is performed at the same time as the displaying of the first portion and the second portion.

According to various embodiments of the present disclosure, the multi-vision module may be configured to control one or more electronic devices such that an interface capable of recognizing a user's control input corresponding to reproduction of the content is presented (e.g., displayed or otherwise provided) through at least a part of the display area of the set electronic device.

According to various embodiments of the present disclosure, the multi-vision module may be configured to control one or more electronic devices such that audio of the content is output through the set electronic device.

According to various embodiments of the present disclosure, the multi-vision module may be configured to control one or more electronic devices such that text of the content is displayed through at least a part of the display area of the set electronic device.

According to various embodiments of the present disclosure, the multi-vision module may be configured such that an application corresponding to a notification event having occurred in at least one other device is executed through the set electronic device.

According to various embodiments of the present disclosure, an electronic device may include a memory for storing information on a plurality of electronic devices comprising at least a first electronic device and a second electronic device. The electronic device may also include one or more processors for executing a multi-vision module. The multi-vision module is configured to identify (e.g., detect) an input for at least one of the plurality of electronic devices while content is being presented (e.g., displayed or otherwise provided) through the plurality of electronic devices such that a first portion of the content is displayed through the first electronic device and a second portion of the content is displayed through the second electronic device. The multi-vision module may also be configured to adjust at least one of the first portion and the second portion based on at least the input. The multi-vision module may also be configured to control one or more of the plurality of electronic devices based on the adjusting such that the first portion is displayed through the first electronic device and the second portion is displayed through the second electronic device.

Figure 14:
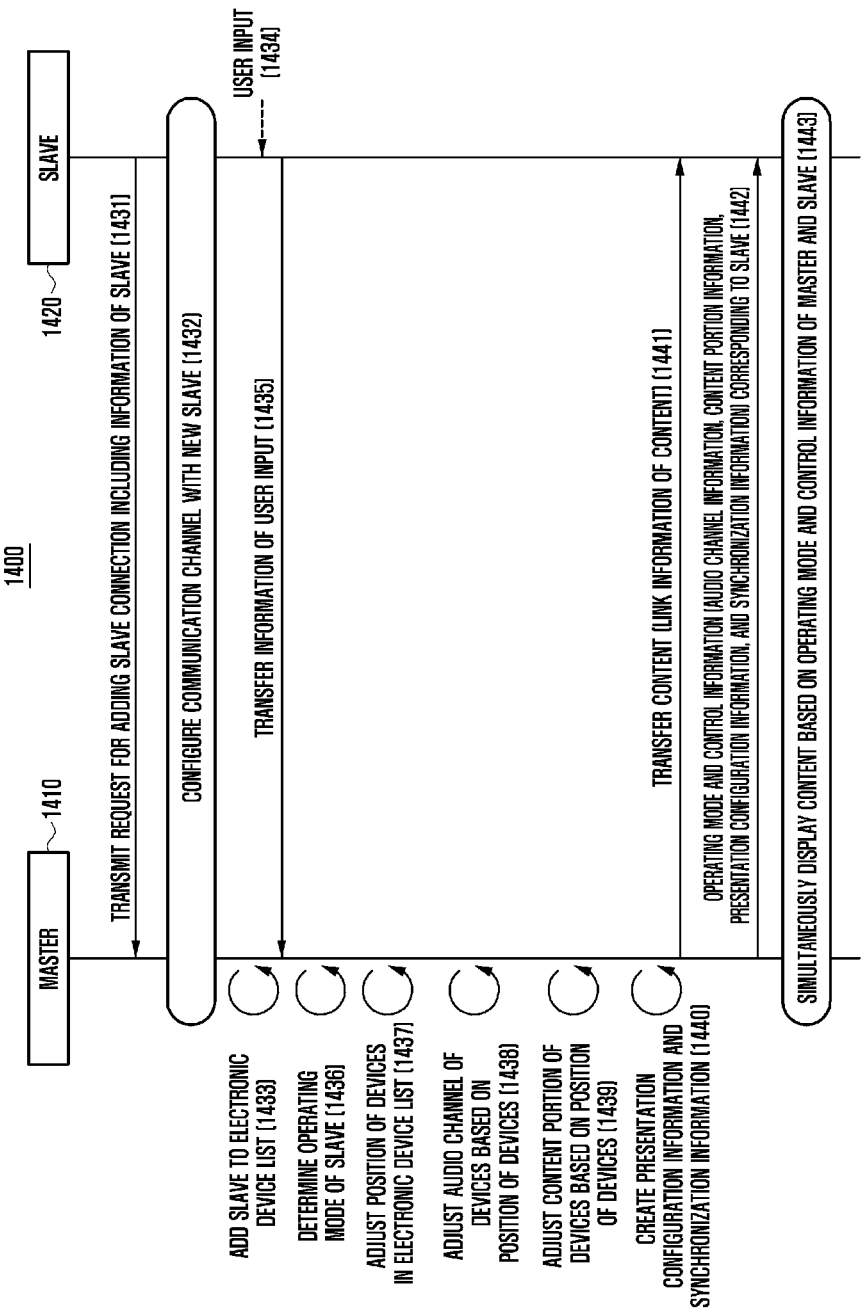
FIG. 14 illustrates a process of adding a connection with a slave in a content presenting system according to various embodiments of the present disclosure.

FIG. 14 illustrates a process of adding a connection with a slave in a content presenting system according to various embodiments of the present disclosure.

Referring to FIG. 14, the content presenting system 1400 according to the present embodiment may include, for example, a master 1410, and one or more slaves (not illustrated). The content presenting system 1400 according to various embodiment of the present disclosure may correspond to the content presenting system 1100 illustrated in FIG. 11. For example, the master 1410 of the content presenting system 1400 according to various embodiments of the present disclosure may be at least one of the master 1110 illustrated in FIG. 11 and the master 1200 illustrated in FIG. 12, and the slave 1420 may be the slave 1120 illustrated in FIG. 11.

Referring to FIG. 14, at operation 1431, a communication module (e.g., the reference numeral 1122 of FIG. 11) of the slave 1420 may transmit, to the master 1410, a request for adding a slave connection including information of the slave (e.g., a resolution, Display Pixel Inch (DPI), information for establishing a communication channel, and/or the like).

At operation 1432, a communication module (e.g., the reference numeral 1116 of FIG. 11) of the master 1410 and the communication module (e.g., the reference numeral 1122 of FIG. 11) of the slave 1420 may establish a communication channel for an exchange of control information between the master 1410 and the slave 1420 to simultaneously present content. The communication channel between the master 1410 and the slave 1420 may conform to various protocols such as Wi-Fi Direct, BlueTooth, NFC, DTD, 3G/4G/LTE networks, and/or the like, and is not limited to a specific communication protocol. According to an embodiment of the present disclosure, when the master 1410 and the slave 1420 are connected with each other through Wi-Fi Direct, the master 1410 may attempt a socket connection with the slave 1420. When the socket connection with the slave 1420 is established, the master 1410 may transmit various pieces of control information to the slave 1420 through the corresponding socket. According to various embodiments of the present disclosure, at operation 1432, a communication channel may be configured between the master 1410 and the slave 1420.

At operation 1433, a list managing module (e.g., the reference numeral 1210 of FIG. 12) of the master 1410 may add the information of the slave 1420 to an electronic device list of the content presenting system 1400.

At operation 1434, an input module (e.g., the reference numeral 1121 of FIG. 11) of the slave 1420 may recognize (e.g., detect) a user input (e.g., a drag) for a change to the multi-vision mode.

At operation 1435, the communication module (e.g., the reference numeral 1122 of FIG. 11) of the slave 1420 may transfer the information (e.g., the recognition time point, the direction, and/or the like) on the user input to the master 1410.

At operation 1436, an operating mode determining module (e.g., the reference numeral 1220 of FIG. 12) of the master 1410 may determine the operating mode of the slave 1420 based on the information on the user input recognized (e.g., detected) by the slave 1420.

At operation 1437, when the operating mode of the slave 1420 is determined as the multi-vision mode (e.g., in response to the operating mode determining module determining that the operating mode of the slave 1420 is the multi-vision mode), a position adjusting module (e.g., the reference numeral 1230 of FIG. 12) of the master 1410 may configure position information of the slave 1420, and may adjust a position of at least some of the remaining multi-vision mode electronic devices based on the information on the user input.

At operation 1438, when the operating mode of the slave 1420 is determined as the multi-vision mode (e.g., in response to the operating mode determining module determining that the operating mode of the slave 1420 is the multi-vision mode), a display portion determining module (e.g., the reference numeral 1240 of FIG. 12) of the master 1410 may configure audio channel information of the slave 1420, and may adjust audio channel information corresponding to the remaining multi-vision mode electronic devices based on the position information of the slave.

At operation 1439, when the operating mode of the slave 1420 is determined as the multi-vision mode (e.g., in response to the operating mode determining module determining that the operating mode of the slave 1420 is the multi-vision mode), the display portion determining module (e.g., the reference numeral 1240 of FIG. 12) of the master 1410 may configure a content portion of the slave 1420, and may adjust content portions corresponding to the remaining multi-vision mode electronic devices based on the position information of the slave.

At operation 1440, a presentation configuration information creating module (e.g., the reference numeral 1250 of FIG. 12) and synchronization information creating module (e.g., the reference numeral 1260 of FIG. 12) of the master 1410 may create presentation configuration information (e.g., brightness, a reproduction speed (access time), volume, and/or the like) and synchronization information, respectively, which will be applied for presenting (e.g., displaying or otherwise providing) the content by the slave 1420.

At operation 1441, the communication module (e.g., the reference numeral 1116 of FIG. 11) or a content providing module (e.g., the reference numeral 1112 of FIG. 11) of the master 1410 may transmit the content (or link information of the content) to the slave 1420.

At operation 1442, the communication module (e.g., the reference numeral 1116 of FIG. 11) of the master 1410 may transmit, to the slave 1420, the operating mode and the control information (e.g., the audio channel information, the content portion information, the presentation configuration information, the synchronization information, and/or the like) corresponding to the slave 1420. The content (or the link information of the content) at operation 1441 and the operating mode and the control information at operation 1442 may be transmitted through an identical communication channel or independently through separate communication channels. According to various embodiments of the present disclosure, when the master 1410 and the slave 1420 are connected with each other through Wi-Fi Direct, the master 1410 and the slave 1420 may communicate with each other by separately opening a first socket session for transmission of the content (or the link information of the content) and a second socket session for the operating mode and the control information.

At operation 1443, the master 1410 and the slave 1420 may simultaneously display content. For example, the master 1410 and the slave 1420 may simultaneously display content based on operating mode and control information of one or more of the master 1410 and the slave 1420.

In addition, in a case according to which the operating mode of a newly added slave 1420 is determined as the single-vision mode, at least some operations (e.g., operations 1437, 1438, and 1439) illustrated in FIG. 14 may be omitted.

Figure 15:
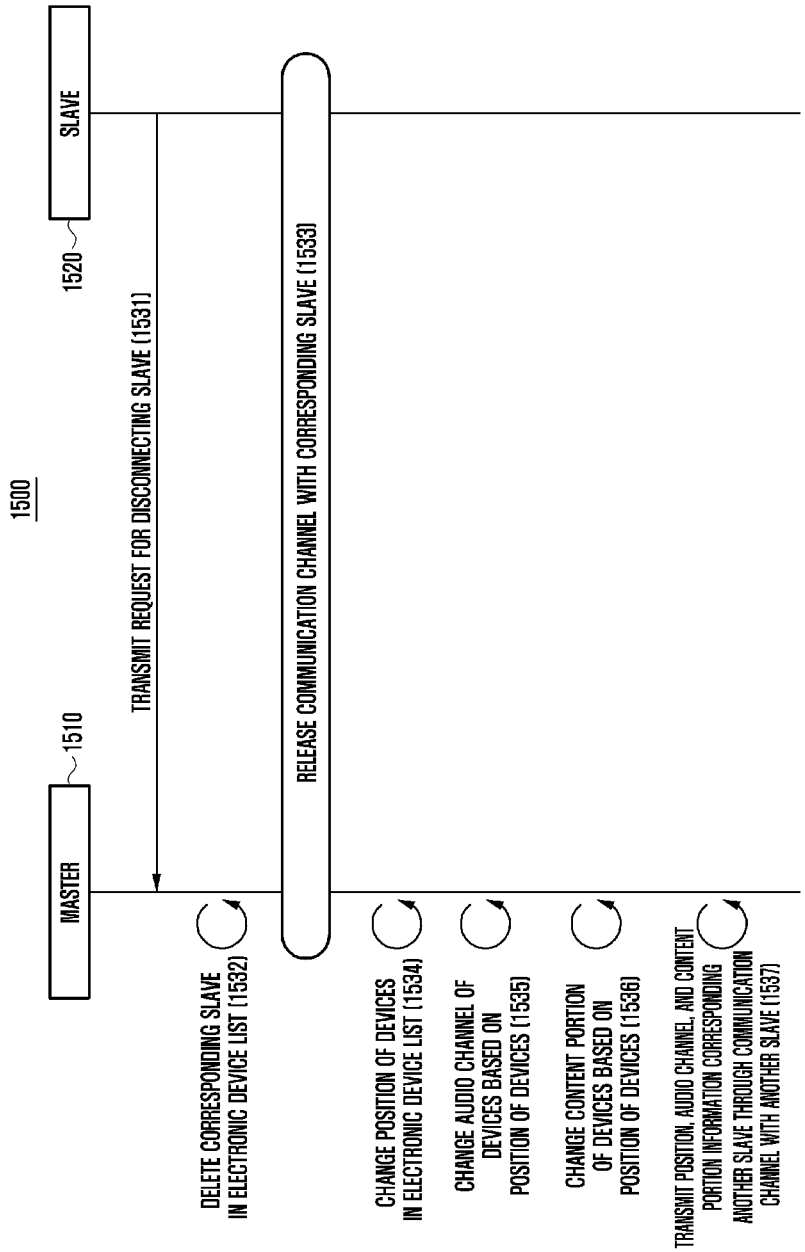
FIG. 15 illustrates a process of disconnecting a slave in a content presenting system according to various embodiments of the present disclosure.

FIG. 15 illustrates a process of disconnecting a slave in a content presenting system according to various embodiments of the present disclosure.

Referring to FIG. 15, the content presenting system 1500 according to various embodiments of the present disclosure may include, for example, a master 1510, and one or more other slaves (not illustrated) in addition to a slave 1520. The content presenting system 1500 according to various embodiments of the present disclosure may be, for example, the content presenting system 1100 illustrated in FIG. 11. For example, the master 1510 according to various embodiments of the present disclosure may be at least one of the master 1110 illustrated in FIG. 11 and the master 1200 illustrated in FIG. 12, and the slave 1520 may be the slave 1120 illustrated in FIG. 11.

Referring to FIG. 15, at operation 1531, a communication module (e.g., the reference numeral 1112 of FIG. 11) of the slave 1520 may transmit a request for disconnecting the slave to the master 1510.

At operation 1532, a list managing module (e.g., the reference numeral 1210 of FIG. 12) of the master 1510 may delete information of the slave 1520 from an electronic device list of the content presenting system 1500.

At operation 1533, the master 1510 may disconnect a communication channel with the slave 1520 (e.g., a socket session for transmission of content (or link information of the content), and a socket session for transmission of an operating mode and control information). For example, the master 1510 may release a communication channel with a corresponding slave (e.g., the slave 1520).

At operation 1534, when the operating mode of the slave 1520 is the multi-vision mode, a position adjusting module (e.g., the reference numeral 1230 of FIG. 12) of the master 1510 may adjust a position of at least some of the remaining multi-vision mode electronic devices other than the slave 1520 based on information of a user input.

At operation 1535, when the operating mode of the slave 1520 is the multi-vision mode, a display portion determining module (e.g., the reference numeral 1240 of FIG. 12) of the master 1510 may adjust audio channel information corresponding to the remaining multi-vision mode electronic devices other than the slave 1520 based on the position information of the slave 1520 prior to the deletion.

At operation 1536, when the operating mode of the slave 1520 is the multi-vision mode, the master 1510 may change a content portion for respective electronic devices based on the respective position of the electronic devices. For example, the display portion determining module (e.g., the reference numeral 1240 of FIG. 12) of the master 1510 may configure a content portion of the slave 1520, and may adjust content portions corresponding to the remaining multi-vision mode electronic devices based on the position information of the slave.

At operation 1537, a communication module (e.g., the reference numeral 1116 of FIG. 11) of the master 1510 may transmit a position, an audio channel, and content portion information corresponding to another slave through a communication channel with the another slave.

In addition, in a case according to which the operating mode of the newly added slave 1520 is determined as the single-vision mode, at least some operations (e.g., operations 1534, 1535, 1536, and 1537) illustrated in FIG. 15 may be omitted.

Figure 16:
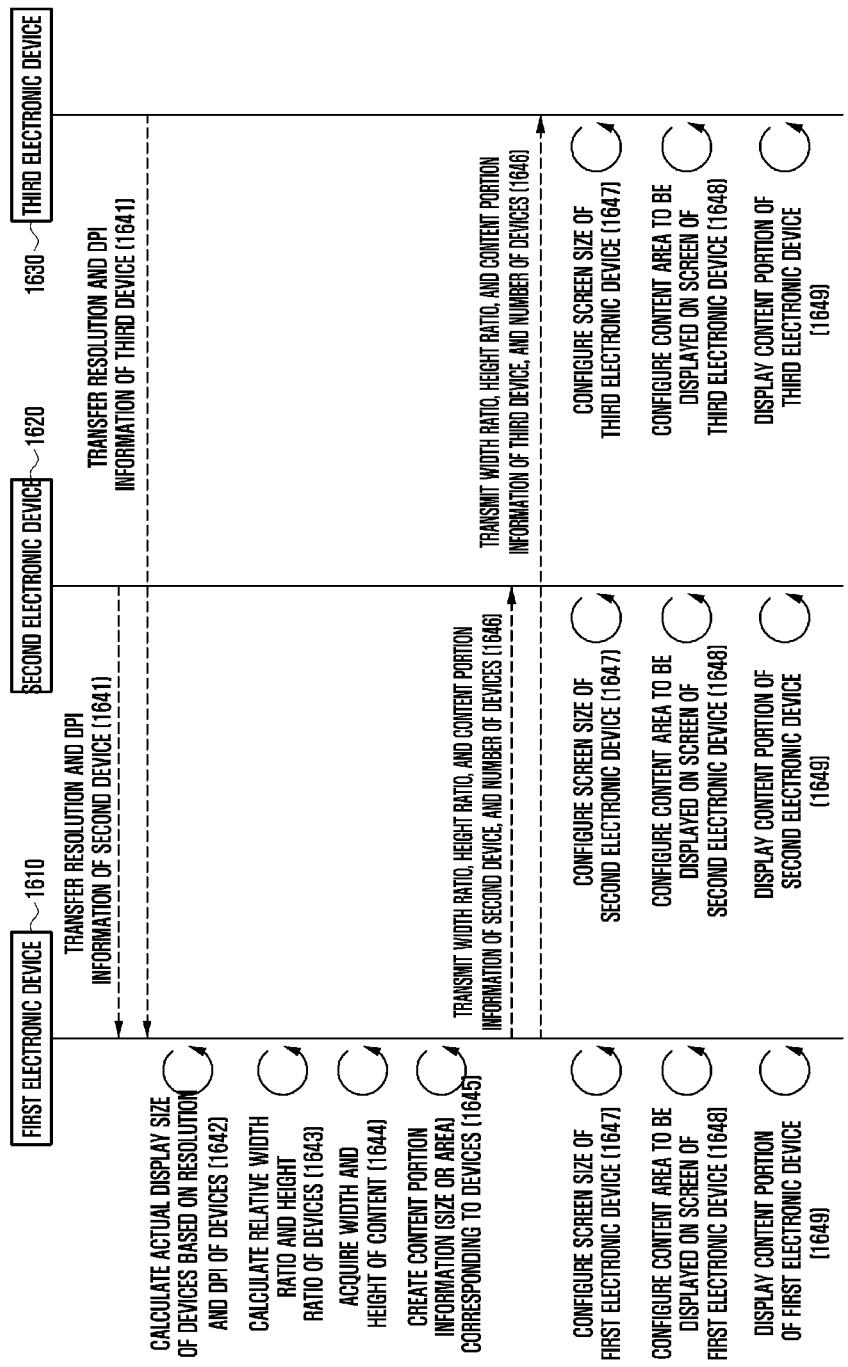
FIG. 16 illustrates a method of dividing a content portion area according to various embodiments of the present disclosure.

FIG. 16 illustrates a method of dividing a content portion area according to various embodiments of the present disclosure.

Referring to FIG. 16, a content presenting system 1600 performing the method of dividing the content portion area according to various embodiments of the present disclosure may include a first electronic device 1610, a second electronic device 1620, and a third electronic device 1630. The first electronic device 1610 may be, for example, the electronic device illustrated in FIG. 10 or the master 1110 illustrated in FIG. 11. The second electronic device 1620 and the third electronic device 1630 may be, for example, the electronic device illustrated in FIG. 10 or the master 1120 illustrated in FIG. 11. According to various embodiments of the present disclosure, the first to third electronic devices 1610 to 1630 may be assumed to have been configured to simultaneously present (e.g., display or otherwise provide) identical content in the multi-vision mode while being grouped into one multi-vision group.

At operation 1641, a communication module (e.g., the reference numeral 1116 of FIG. 11) of the first electronic device 1610 may collect (e.g., receive or otherwise query) information, for example, a resolution (e.g., 1080P (1920*1080)) and Dots Per Inch (DPI) of the second and third electronic devices 1620 and 1630 which are other electronic devices within the multi-vision group, and/or the like. For example, the resolution may include a horizontal pixel value (e.g., 1920) and a vertical pixel value (e.g., 1080). For example, the DPI may include a horizontal DPI value and a vertical DPI value, and the horizontal and vertical DIP values may be identical to or different from each other. As another example, the first electronic device 1610 may collect (e.g., receive or otherwise query) information relating to sound capabilities (or preferences) of the second and third devices 1620 and 1630.

According to various embodiments of the present disclosure, a width and a height may imply the width and the height of a display of an electronic device, respectively.

At operation 1642, a display portion determining module (e.g., the reference numeral 1240 of FIG. 12) of the first electronic device 1610 may calculate an actual display size of the electronic devices based on the information, for example, the resolution and the DPI of the electronic devices (e.g., the first to third electronic devices 1610 to 1630) belonging to the multi-vision group. The actual width of the electronic devices may be obtained by dividing the horizontal pixel value (e.g., 1920) of the resolution by the horizontal DPI value. The actual width of the display of the electronic devices may be obtained by dividing the vertical pixel value (e.g., 1080) of the resolution by the vertical DPI value.

At operation 1643, the display portion determining module (e.g., the reference numeral 1240 of FIG. 12) of the first electronic device 1610 may calculate a relative width ratio and a relative height ratio of the electronic devices belonging to the multi-vision group. According to various embodiments of the present disclosure, a width ratio of an electronic device having the smallest width among a plurality of electronic devices may be configured to a predetermined value, for example, 1000, and a width ratio of the remaining electronic devices may be calculated by (minimum value of width)*1000/(width of each of the remaining electronic devices). According to various embodiments of the present disclosure, a height ratio of an electronic device having the smallest height among a plurality of electronic devices may be configured to a predetermined value, for example, 1000, and a height ratio of the remaining electronic devices may be calculated by (minimum value of height)*1000/(height of each of the remaining electronic devices).

At operation 1644, the display portion determining module (e.g., the reference numeral 1240 of FIG. 12) of the first electronic device 1610 may acquire a width and a height of content to be presented (e.g., displayed or otherwise provided) through the multi-vision mode.

At operation 1645, the display portion determining module (e.g., the reference number 1240 of FIG. 12) of the first electronic device 1610 may create content portion information (e.g., a division size, and partial area specification information, and/or the like) corresponding to the electronic devices belonging to the multi-vision group.

According to various embodiments of the present disclosure, the display portion determining module (e.g., the reference numeral 1240 of FIG. 12) of the first electronic device 1610 may calculate the division size of the electronic devices belonging to the multi-vision group. The horizontal division size of the electronic devices may be calculated by (width of content)*(width ratio of each electronic device)/(sum of width ratios of all electronic devices). The vertical division size of the electronic devices may be calculated by (height of content)*(height ratio of each electronic device)/(sum of height ratios of all electronic devices).

According to various embodiments of the present disclosure, information for specifying the content portion area may be created based on the division size of the electronic devices. For example, the content portion area information may be coordinate information in the form of (left, top, right, bottom). According to various embodiments of the present disclosure, "left" may be horizontal coordinate information of a left boundary of the content portion area, "top" may be vertical coordinate information of an upper boundary of the content portion area, "right" may be horizontal coordinate information of a right boundary of the content portion area, and "bottom" may be vertical coordinate information of a lower boundary of the content portion area.

At operation 1646, the width ratio, the height ratio, and the division size of the content portion corresponding to each of the electronic devices, and the number of electronic devices belonging to the multi-vision group are transmitted. For example, the first electronic device 1610 may transmit the respective content portion area information to each of the electronic devices.

At operation 1647, the electronic devices may configure a size of a screen on which the content will be presented (e.g., displayed or otherwise provided), based on the width ratio and the height ratio. According to various embodiments of the present disclosure, the horizontal screen size may be configured to correspond to the horizontal resolution of the electronic device. The vertical screen size may be calculated by (vertical resolution of electronic device)*(content height/content width)*(number of electronic devices belonging to multi-vision group)*(height ratio)/1000. Each of the electronic devices may respectively configure the size of the screen on which the content will be presented (e.g., displayed or otherwise provided).

At operation 1648, the electronic devices may configure content areas to be displayed on the screen having the configured size, based on the division size (or the partial area information) of the content portions corresponding to the electronic devices. Each of the electronic devices may respectively configure the content areas to be displayed on the screen having the configured size.

At operation 1649, the electronic devices may display the content portions corresponding to the respective electronic devices in the content areas. Each of the electronic devices may display the respective content portions corresponding thereto.

Figure 17:
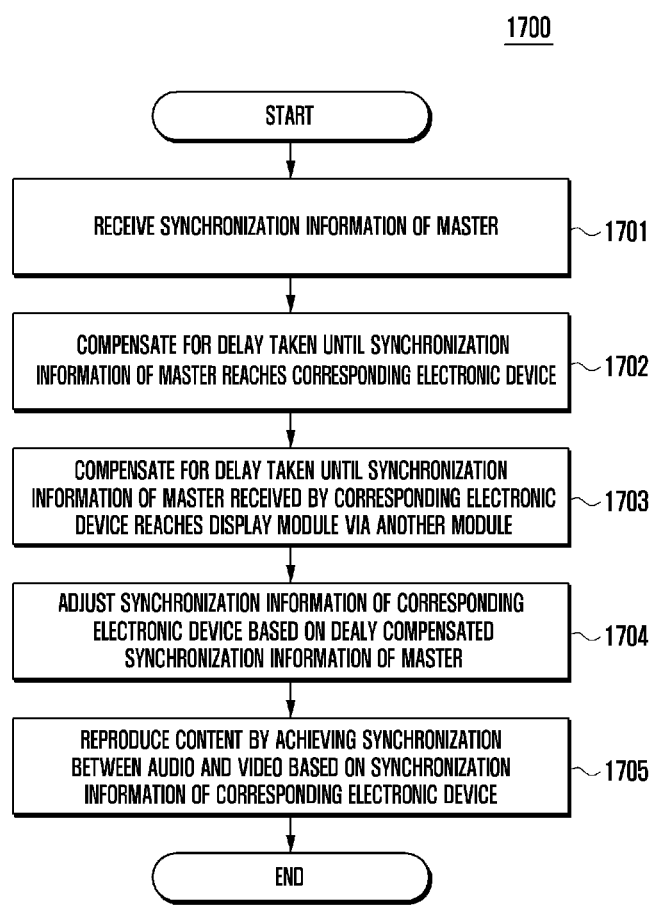
FIG. 17 is a flowchart illustrating a method of synchronizing a plurality of electronic devices of a content presenting system according to various embodiments of the present disclosure.

FIG. 17 is a flowchart illustrating a method of synchronizing a plurality of electronic devices of a content presenting system according to various embodiments of the present disclosure.

Referring to FIG. 17, an electronic device performing the method 1700 according to various embodiment of the present disclosure may be, for example, the electronic device 1300 illustrated in FIG. 13.

At operation 1701, a synchronized signal processing module (e.g., the reference numeral 1319 of FIG. 13) of the corresponding electronic device may receive synchronization information of a master (e.g., the reference numeral 1110 of FIG. 11) from the master. The synchronization information of the master (e.g., the reference numeral 1110 of FIG. 11) may include, for example, a video clock (or time stamp) and an audio clock (or time stamp) of the master (e.g., the reference numeral 1110 of FIG. 11), a display module clock (or time stamp) of the master (e.g., the reference numeral 1110 of FIG. 11), a system clock (or time stamp) of the master, and/or the like.

At operation 1702, the synchronized signal processing module (e.g., the reference numeral 1319 of FIG. 13) of the corresponding electronic device may compensate for a delay taken until the synchronization information of the master (the reference numeral 1110 of FIG. 11) reaches (e.g., is received by) the corresponding electronic device from the master, based on a difference between the system clock of the master (e.g., the reference numeral 1110 of FIG. 11) and the system clock of the corresponding electronic device.

At operation 1703, the synchronized signal processing module (e.g., the reference numeral 1319 of FIG. 13) of the corresponding electronic device may compensate for a delay taken until the synchronization information of the master (the reference numeral 1110 of FIG. 11) reaches the display module via another module of the corresponding electronic device after being received by the corresponding electronic device, based on a difference between the system clock and the display module clock of the corresponding electronic device.

At operation 1704, the synchronized signal processing module (e.g., the reference numeral 1319 of FIG. 13) of the corresponding electronic device may adjust synchronization information (e.g., an audio clock, a display module clock, and a video clock) of the slave based on the delay compensated synchronization information of the master. For example, the audio clock or the display module clock of the slave may be configured to the same value as the delay compensated display module clock of the master. At this time, in a case according to which a difference between the delay compensated display module clock of the master and the display module clock (or the audio clock) of the slave is larger than a reference value, reproduction (audio rendering) for the audio of the content may be performed by skipping audio data in a predetermined duration or making the audio data of the content silent so as to set the display module clock of the slave to the display module clock of the master.

At operation 1705, a synchronization control module (e.g., the reference numeral 1316 of FIG. 13) of the corresponding electronic device may reproduce the content by achieving synchronization between audio and video when the display module of the slave reproduces the content, based on the adjusted synchronization information of the slave. For example, the synchronization control module (e.g., the reference numeral 1316 of FIG. 13) of the corresponding electronic device may set the video clock of the slave to the display module clock (or audio clock) of the slave, and reproduction (video rendering) for the video of the content may be performed by a video renderer (e.g., the reference numeral 1318 of FIG. 13) of the corresponding electronic device.

Figure 18:
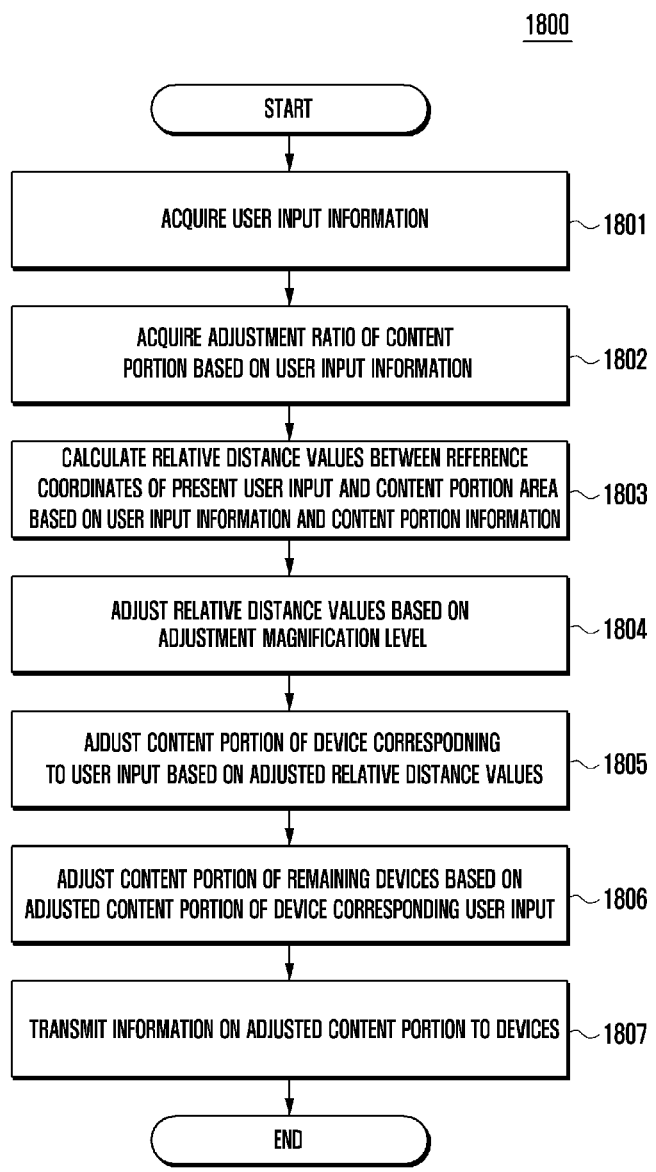
FIG. 18 is a flowchart illustrating a method of adjusting a content portion area of a multi-vision mode according to various embodiments of the present disclosure.

FIG. 18 is a flowchart illustrating a method of adjusting a content portion area of the multi-vision mode based on a user input according to various embodiments of the present disclosure.

Referring to FIG. 18, an electronic device performing the method 1800 according to various embodiment of the present disclosure may be, for example, the electronic device including the multi-vision module 1200 illustrated in FIG. 12 (e.g., the master 1100 of FIG. 11).

At operation 1801, the electronic device may obtain user input information (e.g., (zoom) reference coordinates, a (pinch drag) coordinate change, a zoom in/out magnification level, and/or the like) created by a user input (e.g., a pinch-zoom input, and/or the like) for one of electronic devices belonging to a multi-vision group. According to various embodiments of the present disclosure, in a case according to which a user input is generated in another electronic device (e.g., the slave 1120 of FIG. 11), user input information corresponding to the user input may be received from the other corresponding device (e.g., the slave 1120 of FIG. 11) through a communication module (e.g., the communication module 1116 of FIG. 11). In a case according to which a user input is generated in the electronic device (e.g., the master 1100 of FIG. 11) performing the method of adjusting the content portion, the electronic device may receive user input information corresponding to the user input from another module (e.g., the input module 1113 of FIG. 11) of the electronic device (e.g., the master 1100 of FIG. 11).

At operation 1802, an adjustment ratio (e.g., a zoom in or out magnification level) of the content portion may be acquired based on the user input information (a coordinate change). According to various embodiments of the present disclosure, in a case according to which the adjustment ratio (e.g., the zoom in or out magnification level) of the content portion is received as the user input information from the electronic device in which the user input (e.g., a pinch-zoom input) has been generated at operation 1801, operation 1802 may be omitted.

At operation 1803, relative distance values between the reference coordinates of the present user input and the content portion area may be calculated based on the user input information (e.g., reference coordinates) and content portion information of one electronic device corresponding to the user input. According to various embodiments of the present disclosure, relative distance values dl, dt, dr, and db between reference coordinates (X, Y) of a user input and a content portion area may be calculated as content portion information by Equation 1 below, based on coordinate information in the form of (left, top, right, bottom) indicating a content portion area.

$$dl = x - \text{left};$$

$$dt = y - \text{top};$$

$$dr = \text{right} - x;$$

$$db = \text{bottom} - y. \qquad \text{Equation 1}$$

At operation 1804, the relative distance values between the reference coordinates of the user input and the content portion area may be adjusted based on the adjustment ratio (e.g., the zoom in or out magnification level) of the content portion. For example, the relative distance values between the reference coordinates of the user input and the content portion area may be adjusted from dl, dt, dr, and db to dl', dt', dr', and db'.

$$dl' = dl/l;$$

$$dt' = dt/t;$$

$$dr' = dr/r;$$

$$db' = db/b. \qquad \text{Equation 2}$$

At operation 1805, the content portion area of the electronic device corresponding to the user input may be adjusted based on the adjusted relative distance values (e.g., dl', dt', dr', and db') between the reference coordinates of the user input and the content portion area. For example, coordinates (L, T, R, B) and a size (width and height) of the content portion area of the electronic device corresponding to the user input may be determined by Equation 3 below according to the adjustment.

$$L = x - dl';$$

$$T = y - dt';$$

$$R = x + dr';$$

$$B = y + db';$$

$$\text{width} = R - L;$$

$$\text{height} = T - B. \qquad \text{Equation 3}$$

At operation 1806, a content portion area of the remaining electronic devices other than the electronic device corresponding to the user input among the electronic devices operating in the multi-vision mode may be adjusted based on the adjusted content portion area of the electronic device corresponding to the user input. For example, coordinates $(L_i, T_i, R_i, B_i)$ and a size ($\text{width}_i$ and $\text{height}_i$) of the content portion area of the ith left electronic device from the electronic device corresponding to the user input among the remaining electronic devices may be determined by Equation 4 below.

$$L_i = L - \text{width} * i;$$

$$T_i = T;$$

$$R_i = L_{i-1};$$

$$B_i = B;$$

$$\text{width}_i = R_i - L_i;$$

$$\text{height}_i = T_i - B_i. \quad \text{Equation 4}$$

Additionally, coordinates ($L_j$, $T_j$, $R_j$, $B_j$) and a size (width$_j$ and height$_j$) of the content portion area of the jth right electronic device from the electronic device corresponding to the user input among the remaining devices may be determined by Equation 5 below.

$$L_j = R_{j-1};$$

$$T_j = T;$$

$$R_j = R + \text{width} * j;$$

$$B_j = B;$$

$$\text{width}_j = R_j - L_j;$$

$$\text{height}_j = T_j - B_j. \quad \text{Equation 5}$$

At operation 1807, information on the adjusted content portion corresponding to the corresponding electronic device may be transmitted to the electronic devices operating in the multi-vision mode through the communication module (e.g., the communication module 1040 of FIG. 10).

Figure 19:
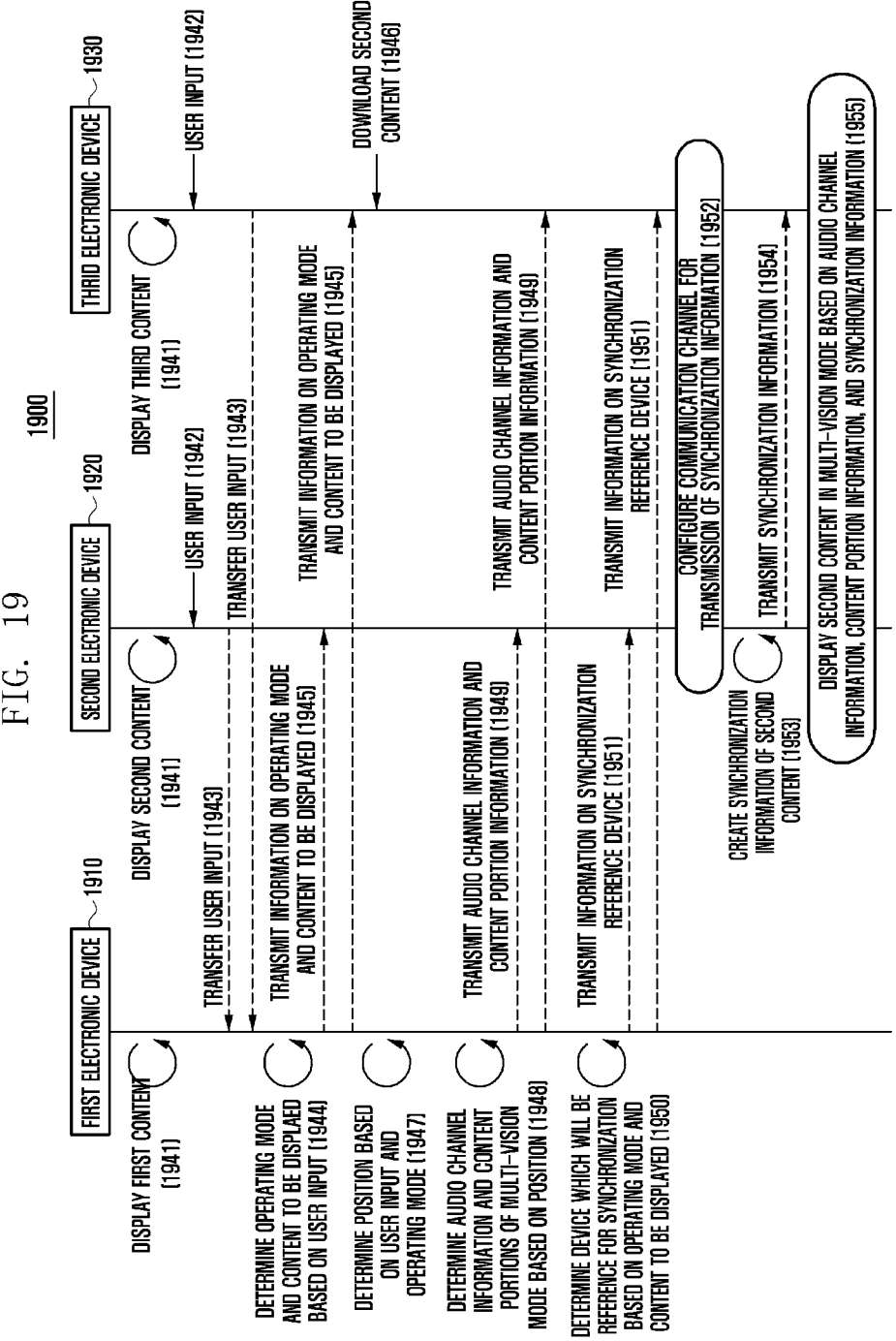
FIG. 19 illustrates a method in which a plurality of pieces of content is displayed by a plurality of multi-vision groups according to various embodiments of the present disclosure.

FIG. 19 is a signal flow diagram illustrating a method in which a plurality of pieces of content is displayed by a plurality of multi-vision groups according to various embodiments of the present disclosure.

Referring to FIG. 19, a first electronic device 1910 of a content presenting system 1900 according to various embodiments of the present disclosure may be, for example, the device including the multi-vision module 1200 illustrated in FIG. 12 (e.g., the master 1100 of FIG. 11).

Referring to FIG. 19, at operation 1941, the first electronic device 1910, a second electronic device 1920, and a third electronic device 1930 may respectively display (e.g., reproduce) first content, second content, and third content.

At operation 1942, the second and third electronic devices 1920 and 1930 may recognize (e.g., detect) a user input (e.g., a drag input from at least a part of a panel of the third electronic device 1930 to at least a part of a panel of the second electronic device 1920, and/or the like).

At operation 1943, the second and third electronic devices 1920 and 1930 may transfer the recognized (e.g., detected) user input information to the first electronic device 1910.

At operation 1944, an operating mode determining module (e.g., the reference numeral 1220 of FIG. 12) of the first electronic device 1910 may determine the operation modes of the second and third electronic devices 1920 and 1930 based on the user input recognized (e.g., detected) by the second and third electronic devices 1920 and 1930. In a case according to which the operating modes of the second and third electronic devices 1920 and 1930 are determined as the multi-vision mode, the second content being displayed by the second electronic device 1920 or the third content being displayed by the third electronic device 1930 may be determined as content to be displayed in the multi-vision mode.

At operation 1945, a communication module (e.g., the reference numeral 1116 of FIG. 11) of the first electronic device 1910 may transmit the determined operating mode of the second and third electronic devices 1920 and 1930, and in a case according to which the operating mode is determined as the multi-vision mode, the communication module may transmit information on the content to be displayed in the multi-vision mode (e.g., link information through which the content may be downloaded).

At operation 1946, in a case according to which the second content is determined as the content to be displayed in the multi-vision mode, the third electronic device 1930 may download the second content based on the content information received through operation 1950.

At operation 1947, a position adjusting module (e.g., the reference numeral 1230 of FIG. 12) of the first electronic device 1910 may determine a position of the devices operating in the multi-vision mode based on the user input information and the operating mode.

At operation 1948, a display portion determining module (e.g., the reference numeral 1240 of FIG. 12) of the first electronic device 1910 may determine audio channel information and content portions corresponding to the second and third electronic devices 1920 and 1930 which are electronic devices operating in the multi-vision mode, based on the position of the electronic devices operating in the multi-vision mode.

At operation 1949, the communication module (e.g., the reference numeral 1116 of FIG. 11) of the first electronic device 1910 may transmit the audio channel information and the content portion information to the second and third electronic devices 1920 and 1930 which are electronic devices operating in the multi-vision mode.

At operation 1950, a synchronization information creating module (e.g., the reference numeral 1260 of FIG. 12) of the first electronic device 1910 may determine one of the second and third electronic devices 1920 and 1930 which will display the second content in the multi-vision mode as a device which will be a reference for synchronization, based on the operating mode and the content to be displayed.

At operation 1951, the communication module (e.g., the reference numeral 1116 of FIG. 11) of the first electronic device 1910 may transmit information on the electronic device determined as the reference for synchronization to the second and third electronic devices 1920 and 1930 which will display the second content in the multi-vision mode.

At operation 1952, a communication channel may be configured for transmission of the synchronization information between the second and third electronic devices 1920 and 1930.

At operation 1953, the second electronic device 1920 designated as the device which will be the reference for synchronization may create synchronization information of the second content through the reproduction operation of the second content at operation 1954. At this time, the second electronic device 1920 may perform the slave function, and may further include some modules (e.g., the synchronization information creating module 1260 of FIG. 12) of the multi-vision module (e.g., the reference numeral 1200 of FIG. 12) for creation of the synchronization information.

At operation 1954, the second electronic device 1920 may transmit the synchronization information to the third electronic device 1930.

At operation 1955, the second and third electronic devices 1920 and 1930 may display the second content in the multi-vision mode, based on the audio channel information, the content portion information, and the synchronization information.

Figure 20:
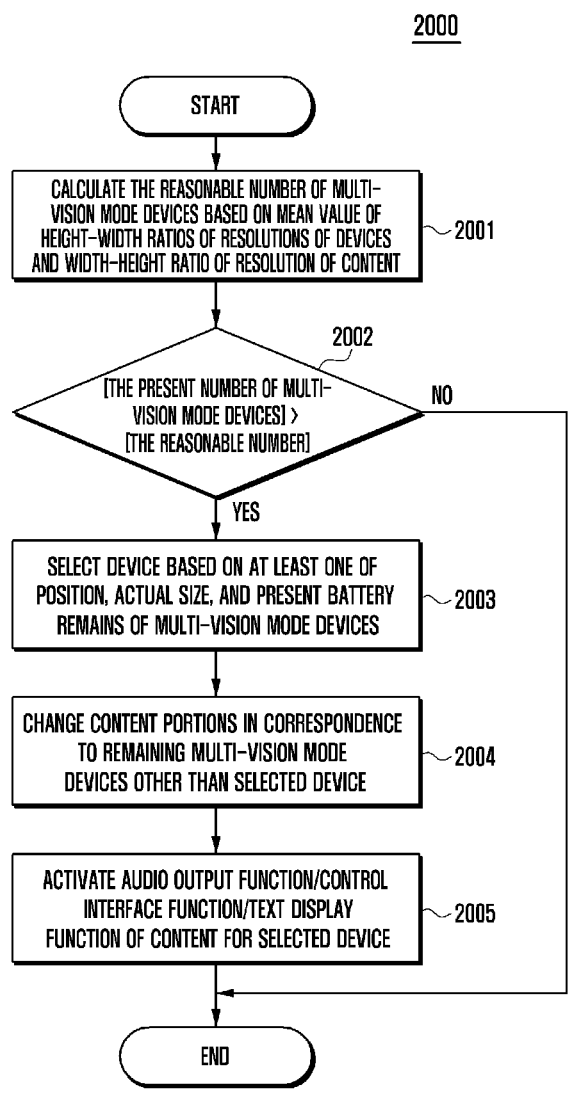
FIG. 20 is a flowchart illustrating a method of controlling a display of an interface for providing additional functions through at least one electronic device of a multi-vision group according to various embodiments of the present disclosure.

FIG. 20 is a flowchart illustrating a method of controlling a display of an interface for providing additional functions through at least one electronic device of a multi-vision group according to various embodiments of the present disclosure.

Referring to FIG. 20, an electronic device performing the control method 2000 according to various embodiments of the present disclosure may be, for example, the device including the multi-vision module 1200 illustrated in FIG. 12 (e.g., the master 1100 of FIG. 11).

According to various embodiments of the present disclosure, an interface for different inputs/outputs may be at least one of, for example, an audio output interface for outputting audio through a functionally connected audio output device (a speaker or earphones) without displaying a video, a control interface capable of receiving a display control command of a user (e.g., play, seek, pause, stop, and/or the like) for the corresponding content, and a text display interface for displaying text information (e.g., a caption) related to the corresponding content.

At operation 2001, based on a mean value of height-width ratios of resolutions of electronic devices belonging to the multi-vision group and a width-height ratio of a resolution of content, a device selecting module (e.g., the reference numeral 1280 of FIG. 12) may calculate the reasonable number of electronic devices which will operate in the multi-vision mode corresponding to the resolution of the corresponding content.

At operation 2002, the device selecting module (e.g., the reference numeral 1280 of FIG. 12) may compare the present number of electronic devices belonging to the multi-vision group with the reasonable number of electronic devices which will operate in the multi-vision mode.

At operation 2003, in a case according to which the present number of electronic devices belonging to the multi-vision group is larger than the reasonable number of electronic devices which will operate in the multi-vision mode, the electronic device selecting module (e.g., the reference numeral 1280 of FIG. 12) may select at least one of the electronic devices belonging to the multi-vision group based on at least one of a position, an actual display size, and present battery remains of the electronic devices belonging to the multi-vision group.

According to various embodiments of the present disclosure, the electronic device selecting module (e.g., the reference numeral 1280 of FIG. 12) may select an electronic device having the least amount of battery remains or a device having battery remains less than a reference value among the devices belonging to the multi-vision group. According to various embodiments of the present disclosure, the device selecting module (e.g., the reference numeral 1280 of FIG. 12) may select an electronic device having the smallest display among the electronic devices belonging to the multi-vision group. According to various embodiments of the present disclosure, the device selecting module (e.g., the reference numeral 1280 of FIG. 12) may select a leftmost or rightmost electronic device among the electronic devices belonging to the multi-vision group.

According to various embodiments of the present disclosure, operations 2001 and 2002 may be omitted. In this case, an electronic device may be selected without considering the reasonable number of electronic devices which will operate in the multi-vision mode.

At operation 2004, a display portion determining module (e.g., the reference numeral 1240 of FIG. 12) may adjust content portions corresponding to the remaining electronic devices other than the selected electronic device among the devices belonging to the multi-vision group.

At operation 2005, through an interface module (e.g., the reference numeral 1270 of FIG. 12), at least one of an audio output function, a control interface function, and a text display interface function of the content may be activated for the selected electronic device. In a case according to which the selected electronic device corresponds to the electronic device in which the interface module is located, transmission may be made to another module (e.g., the content display control module 1115 of FIG. 11) in the same electronic device. In a case according to which the selected electronic device corresponds to another electronic device, transmission may be made to the corresponding other electronic device through the communication module (e.g., the reference numeral 1116 of FIG. 11).

Figure 21:
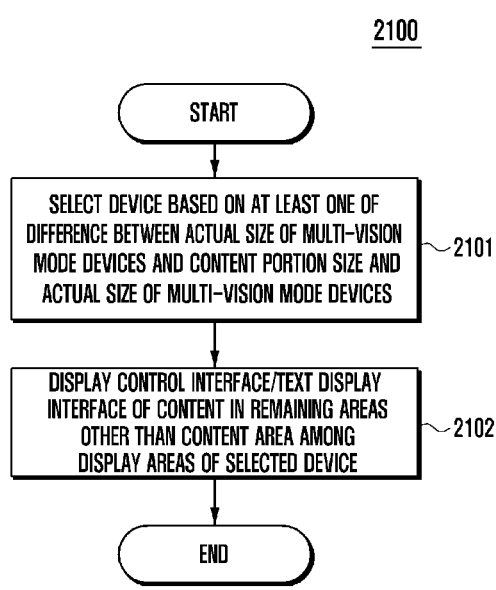
FIG. 21 is a flowchart illustrating a method of controlling a display of an interface for providing different functions to some display areas of at least one electronic device of a multi-vision group according to various embodiments of the present disclosure.

FIG. 21 is a flowchart illustrating a method of controlling a display of an interface for providing different functions to some display areas of at least one electronic device of a multi-vision group according to various embodiments of the present disclosure.

Referring to FIG. 21, an electronic device performing the control method 2100 according to various embodiments of the present disclosure may be, for example, the electronic device including the multi-vision module 1200 illustrated in FIG. 12 (e.g., the master 1100 of FIG. 11).

For example, the control method according to various embodiments of the present disclosure may be performed in a case according to which the present number of electronic devices belonging to a multi-vision group is the same as the reasonable number of electronic devices which will operate in the multi-vision mode, and a display size of at least some electronic devices belonging to the multi-vision group is different from that of the remaining electronic devices.

At operation 2101, a device selecting module (e.g., the reference numeral 1280 of FIG. 12) may select at least one of the multi-vision mode electronic devices based on a difference between an actual size of the electronic devices belonging to the multi-vision group and a size of content portions or the actual size of the electronic devices belonging to the multi-vision group.

According to various embodiments of the present disclosure, the device selecting module (e.g., the reference numeral 1280 of FIG. 12) may select an electronic device for which a difference between the actual display size and the content portion size is larger than or equal to a reference value among the electronic devices belonging to the multi-vision group. According to various embodiments of the present disclosure, the electronic device selecting module (e.g., the reference numeral 1280 of FIG. 12) may select an electronic device having the largest display among the electronic devices belonging to the multi-vision group.

At operation 2102, through an interface module (e.g., the reference numeral 1270 of FIG. 12), at least one of a control interface capable of receiving a display control command of a user (e.g., play, seek, pause, stop, and/or the like) for the corresponding content and a text display interface for displaying text information (e.g., a caption) related to the corresponding content may be displayed in the remaining areas other than the content area among the display areas of the selected electronic device. In a case according to which the selected electronic device corresponds to the electronic device in which the interface module is located, transmission may be made to another module (e.g., the content display control module 1115 of FIG. 11) in the same electronic device. In a case according to which the selected electronic device corresponds to another electronic device, transmission may be made to the corresponding other electronic device through the communication module (e.g., the reference numeral 1116 of FIG. 11).

Figure 22:
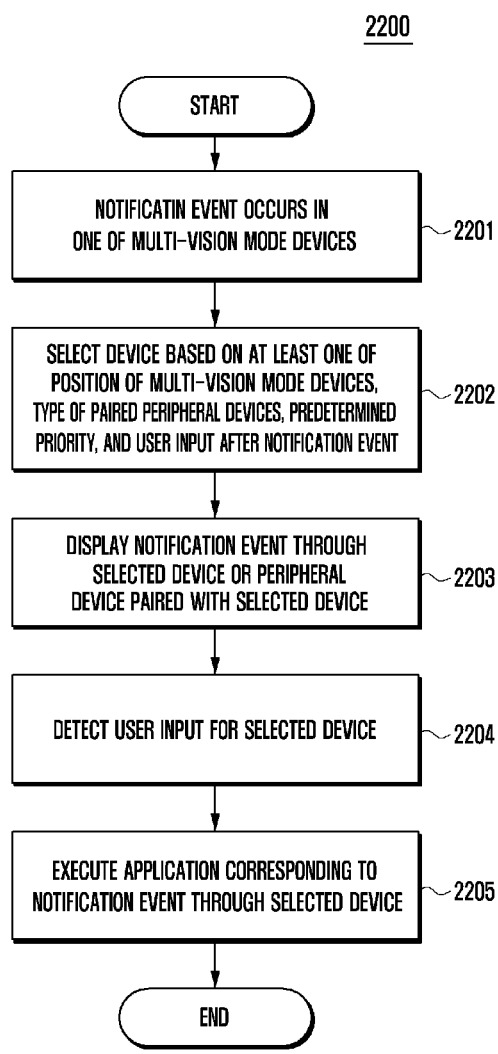
FIG. 22 is a flowchart illustrating a method of controlling a specific electronic device to display a notification event having occurred in one electronic device of a multi-vision group according to various embodiments of the present disclosure.

FIG. 22 is a flowchart illustrating a method of controlling a specific electronic device to display a notification event having occurred in one electronic device of a multi-vision group according to various embodiments of the present disclosure.

Referring to FIG. 22, an electronic device performing the control method 2200 according to various embodiment of the present disclosure may be, for example, the electronic device including the multi-vision module 1200 illustrated in FIG. 12 (e.g., the master 1100 of FIG. 11).

At operation 2201, a device selecting module (e.g., the reference numeral 1280 of FIG. 12) may recognize (e.g., detect) a notification event having occurred in one of the electronic devices belonging to the multi-vision group.

At operation 2202, the electronic device selecting module (e.g., the reference numeral 1280 of FIG. 12) may select an electronic device based on at least one of position information of the electronic devices belonging to the multi-vision group, the type of paired peripheral devices, a predetermined priority, the type of notification event, and a user input after the notification event.

According to various embodiments of the present disclosure, the device selecting module (e.g., the reference numeral 1280 of FIG. 12) may select a leftmost or rightmost electronic device among the electronic devices belonging to the multi-vision group. According to various embodiments of the present disclosure, the device selecting module (e.g., the reference numeral 1280 of FIG. 12) may select an electronic device paired with a peripheral device corresponding to the notification event among the electronic devices belonging to the multi-vision group. For example, in a case according to which the notification event corresponds to telephone call incoming, the device selecting module may select an electronic device paired with a Bluetooth headset. According to various embodiments of the present disclosure, a priority may be set for the electronic devices belonging to the multi-vision group according to a user input before a notification event is received. The device selecting module (e.g., the reference numeral 1280 of FIG. 12) may select an electronic device having the highest priority. According to various embodiments of the present disclosure, the device selecting module (e.g., the reference numeral 1280 of FIG. 12) may select an electronic device for which a user input (e.g., a tap) is recognized (e.g., detected) after a notification event is received.

At operation 2203, through an interface module (e.g., the reference numeral 1270 of FIG. 12), a control may be made such that the notification event is displayed through the selected electronic device or the peripheral electronic device paired with the selected electronic device.

At operation 2204, through the interface module (e.g., the reference numeral 1270 of FIG. 12), a user input (e.g., a tap) may be recognized (e.g., detected) for the selected electronic device.

At operation 2205, through the interface module (e.g., the reference numeral 1270 of FIG. 12), a service corresponding to the notification event may be provided by executing an application corresponding to the notification event through the selected electronic device. For example, in a case according to which the notification event corresponds to an incoming telephone call, an application for providing a telephone call service may be executed. In a case according to which the notification event corresponds to text message reception, an application capable of identifying (e.g., detecting) the received text message and creating a new text message may be executed.

Figure 23:
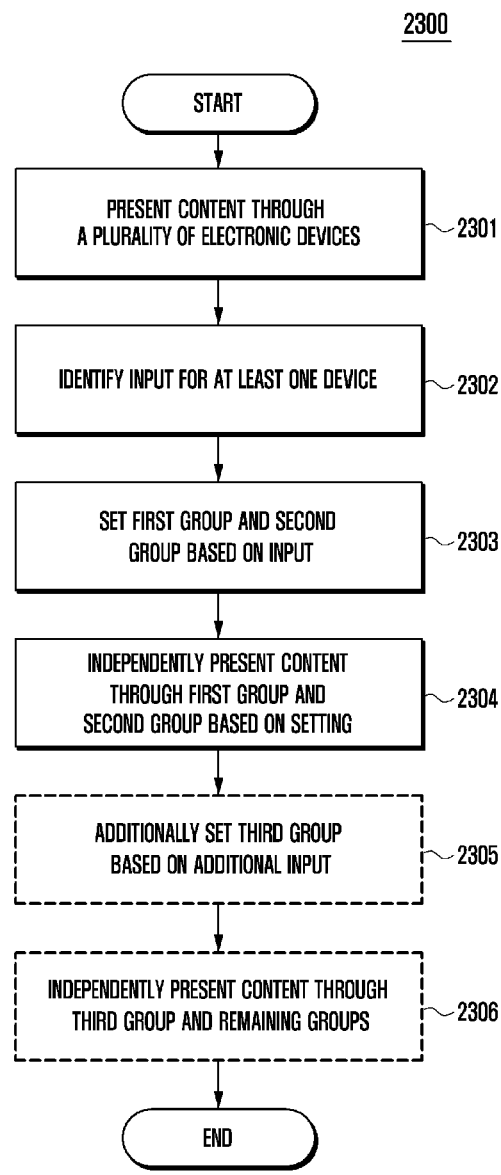
FIG. 23 is a flowchart illustrating a method of presenting content according to various embodiments of the present disclosure.

FIG. 23 is a flowchart illustrating a method of presenting content according to various embodiments of the present disclosure.

Referring to FIG. 23, at operation 2301, a content presenting system may present (e.g., display or otherwise provide) content through a plurality of electronic devices including at least a first electronic device and a second electronic device. For example, the content presenting system may display a first portion of the content through the first electronic device and a second portion of the content through the second electronic device.

At operation 2302, a multi-vision module (e.g., the reference numeral 1114 of FIG. 11) may identify (e.g., detect) an input for at least one of the plurality of electronic devices while the content is being displayed. The multi-vision module may receive, as the input, at least one of a gesture, a touch, a voice of a user, a distance between at least two or more of the plurality of electronic devices, and/or the like.

At operation 2303, the multi-vision module (e.g., the reference numeral 1114 of FIG. 11) may set the plurality of electronic devices as a first group including the first electronic device and a second group including the second electronic device, based on the input for at least one electronic device. For example, the first group may be a plurality of electronic devices including the first electronic device and at least one other electronic device, or may include only the first electronic device. For example, the second group may be a plurality of electronic devices including the second electronic device and at least one other electronic device, or may include only the second electronic device.

At operation 2304, the content presenting system may independently present (e.g., display or otherwise provide) the content through the first group and the second group, based on the designation for the first group and the second group. The content may be simultaneously displayed through the first group and the second group. According to various embodiments of the present disclosure, the content may be displayed while being divided into portions corresponding to the plurality of electronic devices set as one of the first and second groups. According to various embodiments of the present disclosure, the plurality of electronic devices included in at least one of the first and second groups may display the content.

According to various embodiments of the present disclosure, the content presenting method may further include operations 2305 and 2306.

At operation 2305, the multi-vision module (e.g., the reference numeral 1114 of FIG. 11) may additionally set a third group including the electronic devices belonging to the first group or the electronic devices belonging to the second group, based on an additional input for at least one of the plurality of electronic devices. At least one of a gesture, a touch, or the voice of a user, and a distance between at least two or more of the plurality of electronic devices may be received as the additional input.

At operation 2306, the content presenting system may independently present the content through the third group and the remaining groups, based on the additional setting of the group.

Figure 24:
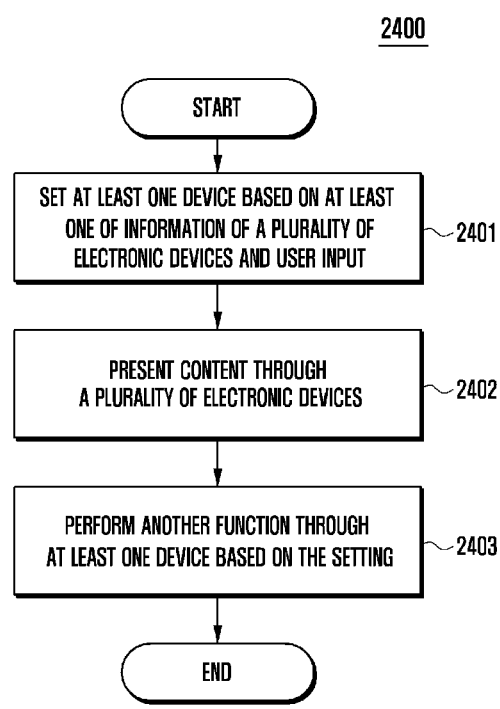
FIG. 24 is a flowchart illustrating a method of presenting content according to various embodiments of the present disclosure.

FIG. 24 is a flowchart illustrating a method of presenting content according to various embodiments of the present disclosure.

Referring to FIG. 24, at operation 2401, a multi-vision module (e.g., the reference numeral 1114 of FIG. 11) may set at least one of a plurality of electronic devices based on at least one of information of the plurality of electronic devices including at least a first electronic device and a second electronic device and a user input for at least one of the plurality of electronic devices. The information the plurality of electronic devices may include at least one or more of, for example, a display size, battery remains, a relative position, the type of paired peripheral electronic devices, and a predetermined priority of the plurality of electronic devices.

At operation 2402, the content presenting system may present (e.g., display or otherwise provide) the content through the plurality of electronic devices. For example, the content presenting system may display a first portion of the content through the first electronic device and a second portion of the content through the second electronic device.

At operation 2403, the content presenting system may perform another function related to presenting (e.g., displaying or otherwise providing) the content through at least one electronic device, based on the setting at operation 2401. At operation 2403, the other function may be performed at the same time as operation 2402.

According to various embodiments of the present disclosure, the another function may be a function directly or indirectly related to the presenting of the content among various functions other than displaying of the content through a display functionally connected to the electronic device.

According to various embodiments of the present disclosure, an interface capable of recognizing a user's control input corresponding to the displaying of the content may be presented (e.g., displayed or otherwise provided) through at least a part of the display area of the set electronic device. For example, at least some pieces of the content may be displayed through the part of the display area of the set electronic device, and the interface capable of recognizing the user's control input corresponding to the displaying of the content may be provided through the remaining part of the display area of the set electronic device at the same time as the displaying of at least some pieces of content. Furthermore, the interface capable of recognizing the user's control input corresponding to the displaying of the content may also be provided while the set electronic device does not display the content.

According to various embodiments of the present disclosure, the set electronic device may output audio of the content, and the remaining electronic devices may not output the audio of the content. For example, the set electronic device may display at least some pieces of content, and may output the audio of the content at the same time. Furthermore, the set electronic device may not display the content, and may output the audio of the content.

According to various embodiments of the present disclosure, text of the content may be presented (e.g., displayed or otherwise provided) through at least a part of the display area of the set electronic device. For example, in a case according to which content includes a video which is continuously displayed as time passes and caption text which is continuously displayed while synchronizing with the video, the caption text may be displayed.

According to various embodiments of the present disclosure, an application corresponding to a notification event having occurred in at least one other electronic device may be executed through the set electronic device. The notification event may be, for example, reception of a text message, reception of a telephone call, and/or the like.

Figure 25:
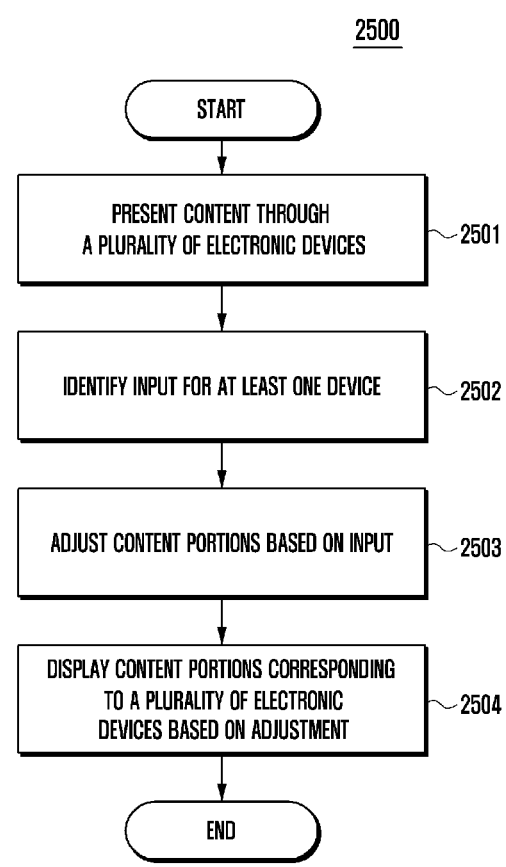
FIG. 25 is a flowchart illustrating a method of presenting content according to various embodiments of the present disclosure.

FIG. 25 is a flowchart illustrating a method of presenting content according to various embodiments of the present disclosure.

Referring to FIG. 25, at operation 2501, a content presenting system may present (e.g., display or otherwise provide) content through a plurality of electronic devices including at least a first electronic device and a second electronic device. For example, the content presenting system may display a first portion of the content through the first electronic device and a second portion of the content through the second electronic device.

At operation 2502, a multi-vision module (e.g., the reference numeral 1114 of FIG. 11) may identify (e.g., detect) an input for at least one of the plurality of electronic devices while the content is being displayed. For example, at least one of a gesture, a touch, a hovering of a user, and/or the like may be received as an input. At this time, reference coordinates corresponding to the user input or a change in the reference coordinates may be acquired.

At operation 2503, the multi-vision module (e.g., the reference numeral 1114 of FIG. 11) may adjust content portions, for example, at least one of a first portion and a second portion, based on the input for at least one electronic device. According to various embodiments of the present disclosure, in a case according to which the first and second portions include a plurality of coordinates corresponding thereto, the multi-vision module may adjust the plurality of coordinates corresponding to at least one of the first portion and the second portion.

At operation 2504, the content presenting system may display the content portions corresponding to the plurality of electronic devices, respectively, based on the adjustment at operation 2503. For example, the content presenting system may display a first portion of the content through the first electronic device and a second portion of the content through the second electronic device. At this time, due to the adjustment at operation 2503, at least one of the first portion and the second portion may be different from the first portion and the second portion which have been displayed at operation 2501.

The operations described in the processes or methods illustrated in FIGS. 14 to 25 may be executed sequentially, in parallel, repeatedly, or in a heuristic method. Furthermore, the operations may be executed in a different order, some of the operations may be omitted, or other operations may be added.

According to various embodiments of the present disclosure, a method of presenting (e.g., displaying or otherwise providing) content through a plurality of electronic devices may include presenting (e.g., displaying or otherwise providing) content through a plurality of electronic devices comprising at least a first electronic device and a second electronic device, the first electronic device displaying a first portion of the content and the second electronic device displaying a second portion of the content, identifying (e.g., detecting) an input for at least one of the plurality of electronic devices while the content is being displayed; setting the plurality of electronic devices as a first group comprising the first electronic device and a second group comprising the second electronic device, based on at least the input, and independently presenting (e.g., displaying or otherwise providing) the content through the first group and the second group, based on the setting.

According to various embodiments of the present disclosure, the independently presenting of the content may include displaying the content through the first group, and at the same time, displaying the content through the second group.

According to various embodiments of the present disclosure, the first group and the second group may include a plurality of electronic devices.

According to various embodiments of the present disclosure, the identifying of the input may include receiving, as the input, at least one of a gesture, a touch, a voice of a user, a distance between at least two or more of the plurality of electronic devices, and/or the like.

According to various embodiments of the present disclosure, the method may further include additionally setting a third group comprising an electronic device belonging to the first group or an electronic device belonging to the second group, based on an additional input for at least one of the plurality of electronic devices, and independently providing the content through the third group or the remaining groups.

According to various embodiments of the present disclosure, the additionally setting of the third group may be based on at least one of a gesture, a touch, a voice of a user, a distance between at least two or more of the plurality of electronic devices as the additional input, and/or the like.

According to various embodiments of the present disclosure, the independently presenting of the content may include dividing the content into portions corresponding to the plurality of electronic devices set as at least one of the first group and the second group, and displaying the divided content.

According to various embodiments of the present disclosure, the dividing and displaying of the content may include dividing the content based on at least one of a size of displays functionally connected to the electronic devices set as the at least one group, the number of electronic devices set as the at least one group, and a resolution of the content.

According to various embodiments of the present disclosure, the independently presenting of the content may include displaying the content by a plurality of electronic devices included in at least one of the first group and the second group.

According to various embodiments of the present disclosure, the independently presenting of the content may include simultaneously presenting at least some pieces of the content by the remaining electronic devices other than the first electronic device among the first group and the second group, based on synchronization information created by the first electronic device.

According to various embodiments of the present disclosure, the synchronization information may include at least one of time stamp information of the first electronic device related to a present display point of the content and present time information of the first electronic device.

According to various embodiments of the present disclosure, the synchronization information may include at least one of time stamp information of the first electronic device related to a present display point of the content and present time information of the first electronic device, and the independently presenting of the content may include adjusting the time stamp information by the remaining electronic devices other than the first electronic device among the first group and the second group, at least based on present time information of the first electronic device and present time information of the remaining electronic devices.

According to various embodiments of the present disclosure, the content may include a plurality pieces of content including first content and second content.

According to various embodiments of the present disclosure, the independently presenting of the content may include displaying the first content through the first group, and displaying the second content through the second group.

According to various embodiments of the present disclosure, the independently presenting of the content further may include presenting at least some pieces of the first content by the remaining electronic devices other than the first electronic device among the first group based on synchronization information created by the first electronic device, and presenting at least some pieces of the second content by the remaining electronic devices other than the second electronic device among the second group based on synchronization information created by the second electronic device.

According to various embodiments of the present disclosure, the content may include multimedia content, and the independently presenting of the content may include displaying data corresponding to a first display point of the multimedia content through the first group, and at the same time, displaying data corresponding to a second display point of the multimedia content through the second group.

According to various embodiments of the present disclosure, a method of presenting content through a plurality of electronic devices may include setting at least one of a plurality of electronic devices based on at least one of information of the plurality of electronic devices including at least a first electronic device and a second electronic device and a user input for at least one of the plurality of electronic devices, presenting content through the plurality of electronic devices, wherein the presenting of the content includes displaying a first portion of the content through the first electronic device and displaying a second portion of the content through the second electronic device, and performing another function related to presenting the content through at least one electronic device, based on the setting.

According to various embodiments of the present disclosure, the setting of at least one electronic device may be based on at least one or more of a display size, battery remains, a relative position, the type of paired peripheral electronic devices, and a predetermined priority of the plurality of electronic devices, as at least some pieces of the information.

According to various embodiments of the present disclosure, the performing of the other function may be made at the same time as the displaying of the first portion and the second portion.

According to various embodiments of the present disclosure, the performing of the another function may include presenting an interface capable of recognizing a user's control input corresponding to the displaying of the content through at least a part of the display area of the set electronic device.

According to various embodiments of the present disclosure, the presenting of the content may include displaying at least some pieces of the content through a part of the display area of the set electronic device, and the performing of the another function may include providing an interface capable of recognizing a user's control input corresponding to the displaying of the content through the rest part of the display area of the set electronic device at the same time as the displaying of the at least some pieces of the content.

According to various embodiments of the present disclosure, the performing of the other function may include outputting audio of the content through the set electronic device.

According to various embodiments of the present disclosure, the performing of the other function may include displaying text of the content through at least a part of the display area of the set electronic device.

According to various embodiments of the present disclosure, the content may include a video which is continuously displayed as time passes and caption text which is continuously displayed while synchronizing with the video, and the displaying of the text of the content may include displaying the caption text as the text.

According to various embodiments of the present disclosure, the performing of the other function may include executing an application corresponding to a notification event having occurred in at least one other electronic device through the set electronic device.

According to various embodiments of the present disclosure, the notification event may include at least one of reception of a text message and reception of a telephone call.

According to various embodiments of the present disclosure, a method of presenting content through a plurality of electronic devices may include presenting content through a plurality of electronic devices comprising at least a first electronic device and a second electronic device, wherein the presenting of the content comprises displaying a first portion of the content through the first electronic device and displaying a second portion of the content through the second electronic device, adjusting at least one of the first portion and the second portion based on a user input for at least one of the plurality of electronic devices, and displaying the first portion of the content through the first electronic device and displaying the second portion of the content through the second electronic device based on the adjusting.

According to various embodiments of the present disclosure, the adjusting of at least one of the first portion and the second portion may be based on at least one of reference coordinates corresponding to the user input and a change in the reference coordinates.

According to various embodiments of the present disclosure, the first portion and the second portion may include a plurality of coordinates corresponding thereto, and the adjusting of at least one of the first portion and the second portion may include adjusting the plurality of coordinates corresponding to the at least one of the first portion and the second portion.

Figure 26:
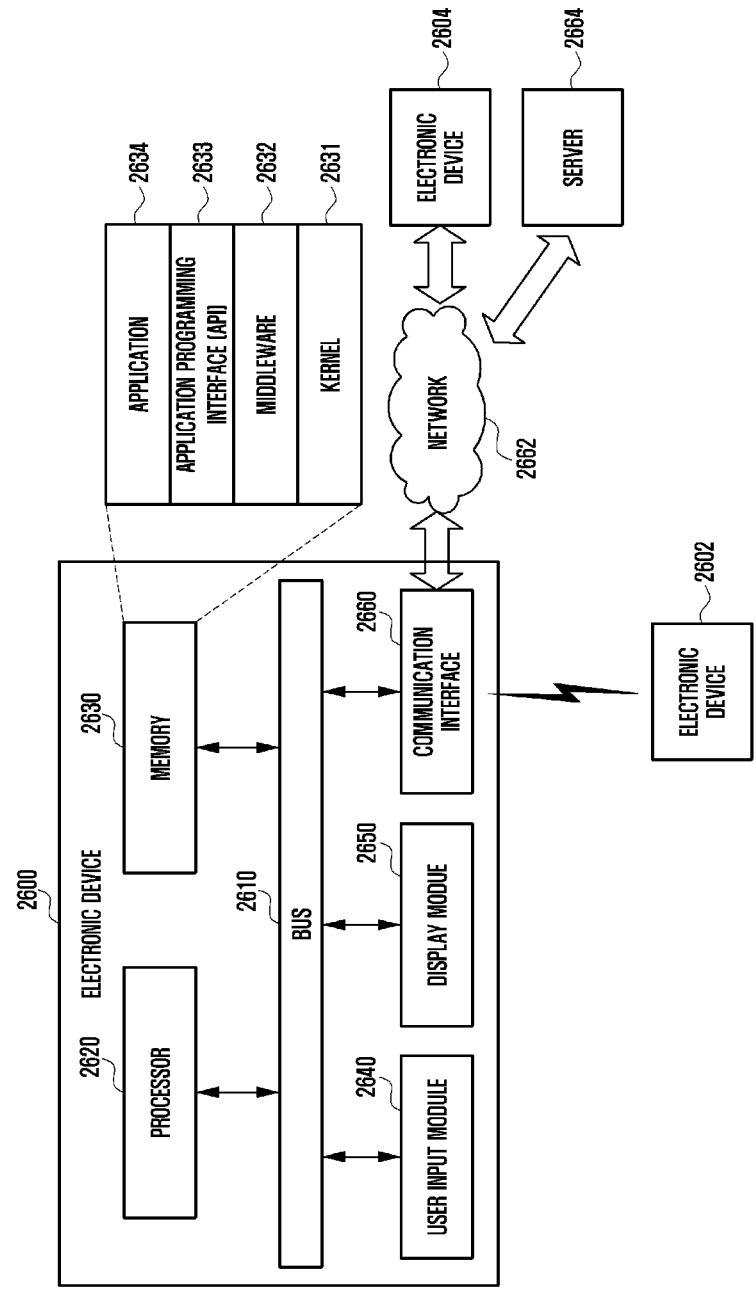
FIG. 26 is a block diagram of an electronic device according to various embodiments of the present disclosure.

FIG. 26 is a block diagram of an electronic device according to various embodiments of the present disclosure.

Referring to FIG. 26, an electronic device 2600 may include a bus 2610, a processor 2620, a memory 2630, a user input module 2640, a display module 2650, or a communication module 2660.

The bus 2610 may be a circuit connecting the above described components and transmitting communication (e.g., a control message) between the above described components.

The processor 2620 may receive commands from other components (e.g., the memory 2630, the user input module 2640, the display module 2650, and the communication module 2660) through the bus 2610, analyze the received commands, and execute calculation or data processing according to the analyzed commands.

The processor 2620 may execute, for example, a multi-vision module (e.g., the multi-vision module 1010 or the multi-vision module 1114). Accordingly, the processor 2620 may control one or more of a plurality of electronic devices such that content is presented (e.g., displayed or otherwise provided) through the plurality of electronic devices.

The memory 2630 may store commands or data received from the processor 2620 or other components (e.g., the user input module 2640, the display module 2650, and the communication module 2660) or generated by the processor 2620 or other components. The memory 2630 may include programming modules, for example, a kernel 2631, middleware 2632, an Application Programming Interface (API) 2633, or an application 2634. Each of the programming modules described above may be configured by software, firmware, hardware, or combinations of two or more thereof.

The memory 2630 may store, for example, information on the plurality of electronic devices for presenting (e.g., displaying or otherwise providing) the content.

The kernel 2631 may control or manage system resources (e.g., the bus 2610, the processor 2620, or the memory 2630) used for executing an operation or function implemented by the remaining other programming modules, for example, the middleware 2632, the API 2633, or the application 2634. Furthermore, the kernel 2631 may provide an interface for accessing individual components of the electronic device 2600 from the middleware 2632, the API 2633, or the application 2634 to control or manage the components.

The middleware 2632 may perform a relay function of allowing the API 2633 or the application 2634 to communicate with the kernel 2631 to exchange data. Furthermore, in operation requests received from the (plurality of) applications 2634, the middleware 2632 performs load balancing of the operation requests by using a method of assigning a priority, by which system resources (e.g., the bus 2610, the processor 2620, the memory 2630 and the like) of the electronic device 2600 can be used, to at least one of the applications 2634.

The API 2633 is an interface by which the application 2634 can control a function provided by the kernel 2631 or the middleware 2632 and may include, for example, at least one interface or function for a file control, a window control, image processing, or a character control.

For example, the user input module 2640 may receive a command or data from the user and transmit the command or the data to the processor 2620 or the memory 2630 through the bus 2610. The display module 2650 may display a video, an image, data, or the like for the user.

The communication module 2660 may connect communication between another electronic device 2602 and the electronic device 2600. The communication module 2660 may connect communication between a network 2662 and the electronic device 2600. For example, the communication module 2660 may connect communication between an electronic device 2604, a server 2664, and/or the like across a network 2662. The communication module 2660 may support a short-range communication protocol (e.g., Wireless Fidelity (Wi-Fi), BlueTooth (BT), or NFC), predetermined network communication (e.g., Internet, Local Area Network (LAN), Wide Area Network (WAN), telecommunication network, cellular network, or satellite network, or a Plain Old Telephone Service (POTS). Each of the electronic devices 2602 and 2604 may be an electronic device which is the same as the electronic device 2600 (e.g., an electronic device of the same type) or another electronic device (e.g., an electronic device of a different type).

Figure 27:
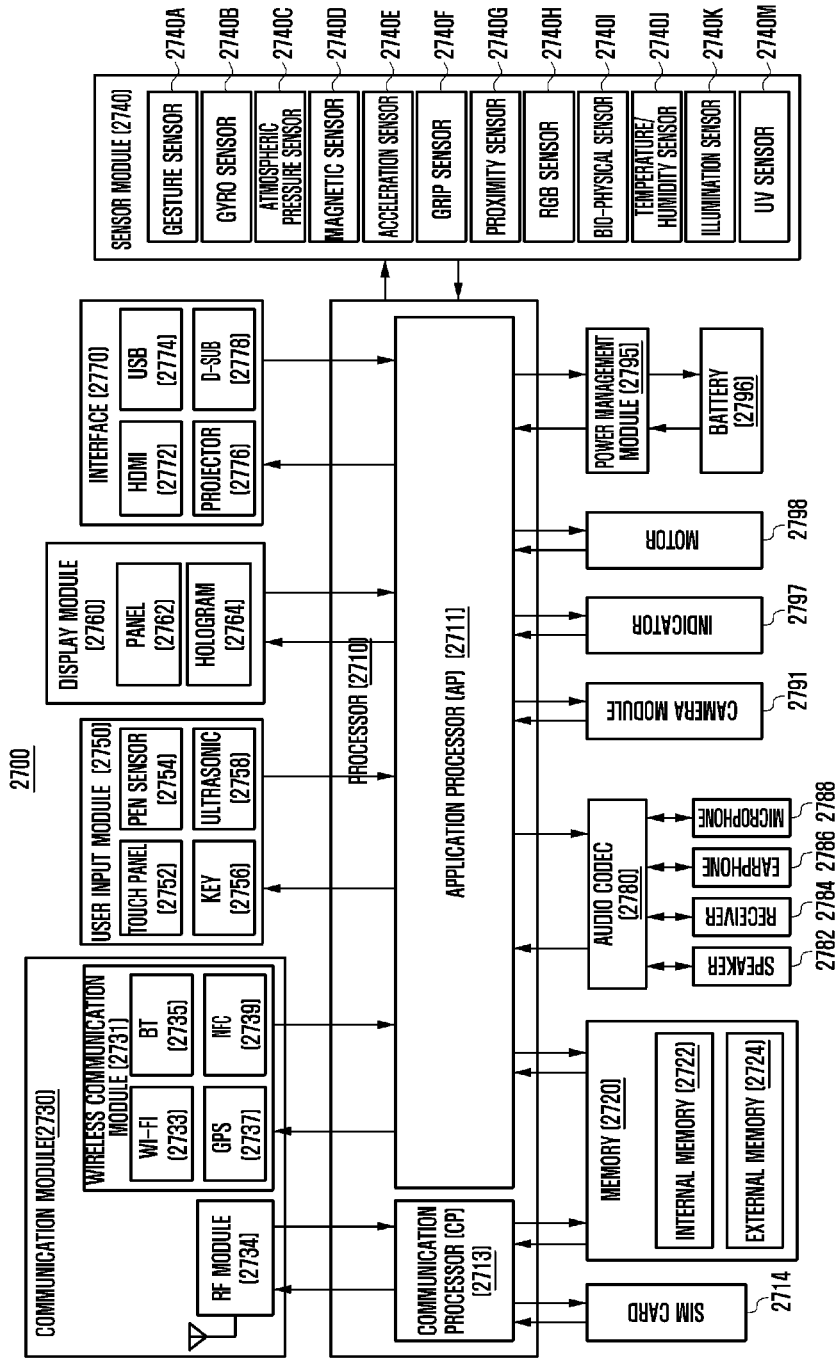
FIG. 27 is a block diagram of hardware according to various embodiments of the present disclosure.

FIG. 27 is a block diagram of hardware according to various embodiments of the present disclosure.

Referring to FIG. 26, the hardware 2700 may be, for example, the electronic device 2600 illustrated in FIG. 26.

Referring to FIG. 27, the hardware 2700 may include one or more processors 2710, a Subscriber Identification Module (SIM) card 2714, a memory 2720, a communication module 2730, a sensor module 2740, a user input module 2750, a display module 2760, an interface 2770, an audio codec 2780, a camera module 2791, a power managing module 2795, a battery 2796, an indicator 2797, a motor 2798, and/or the like.

The processor 2710 (e.g., the processor 2620) may include one or more Application Processors (APs) 2711 or one or more Communication Processors (CPs) 2713. The processor 2710 may be, for example, the processor 2620 illustrated in FIG. 26. Although FIG. 27 illustrates that the AP 2711 and the CP 2713 are included in the processor 2710, the AP 2711 and the CP 2713 may be included in different IC packages, respectively. According to various embodiments of the present disclosure, the AP 2711 and the CP 2713 may be included in one IC package.

The AP 2711 operates an operation system or an application program so as to control a plurality of hardware or software component elements connected to the AP 2711 and execute various data processing and calculations including multimedia data. The AP 2711 may be implemented by, for example, a System on Chip (SoC). According to various embodiments of the present disclosure, the processor 2710 may further include a Graphic Processing Unit (GPU).

The CP 2713 may manage a data line of communication between the electronic device (e.g., the electronic device 2600) including the hardware 2700 and different electronic devices connected through the network and perform a function of converting a communication protocol. The CP 2713 may be implemented by, for example, an SoC. According to various embodiments of the present disclosure, the CP 2713 may perform at least some of multimedia control functions. The CP 2713 may distinguish and authenticate a terminal within a communication network by using a subscriber identification module (e.g., the SIM card 2714). Furthermore, the CP 2713 may provide a user with services, such as a voice call, a video call, a text message, packet data, and/or the like.

In addition, the CP 2713 may control data transmission/reception of the communication module 2730. Although FIG. 2 illustrates that the components such as the CP 2713, the power managing module 2795, and the memory 2720 are separate components of the AP 2711, the AP 2711 may include at least some of the above described components (e.g., CP 2713) in various embodiments of the present disclosure.

According to various embodiments of the present disclosure, the AP 2711 or the CP 2713 may load a command or data received from at least one of a non-volatile memory and other component elements connected to each of the AP 211 and the CP 213 to a volatile memory and process the loaded command or data. Furthermore, the AP 2711 or the CP 2713 may store data received from at least one of other components or generated by at least one of other components in a non-volatile memory.

The SIM card 2714 may be a card embodying a subscriber identification module, and may be inserted into a slot formed in a particular portion of the electronic device. The SIM card 2714 may include unique identification information (e.g., Integrated Circuit Card IDentifier (ICCID)) or subscriber information (e.g., International Mobile Subscriber Identity (IMSI)).

The memory 2720 may include an internal memory 2722 or an external memory 2724. The memory 2720 may be, for example, the memory 2630 illustrated in FIG. 26. The internal memory 2722 may include, for example, at least one of a volatile memory (e.g., a Dynamic RAM (DRAM), a Static RAM (SRAM), a Synchronous Dynamic RAM (SDRAM), and the like), and a non-volatile Memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, an NOR flash memory, and the like). According to various embodiments of the present disclosure, the internal memory 2722 may be in a form of a Solid State Drive (SSD). The external memory 2724 may further include a flash drive, for example, a Compact Flash (CF), a Secure Digital (SD), a Micro Secure Digital (Micro-SD), a Mini Secure Digital (Mini-SD), an extreme Digital (xD), a memory stick, and/or the like.

The communication module 2730 may include a wireless communication module 2731 or a Radio Frequency (RF) module 2734. The communication module 2730 may be, for example, the communication module 2660 illustrated in FIG. 26. The wireless communication module 2731 may include, for example, a Wi-Fi module 2733, a BT module 2735, a GPS module 2737, or a NFC module 2739. For example, the wireless communication module 2731 may provide a wireless communication function by using a radio frequency. Additionally or alternatively, the wireless communication module 2731 may include a network interface (e.g., LAN card) or a modem for connecting the hardware 2700 with a network (e.g., Internet, LAN, WAN, telecommunication network, cellular network, satellite network or POTS).

The RF module 2734 may transmit and receive data, for example, an RF signal or a called electronic signal. Although not illustrated, the RF module 2734 may include, for example, a transceiver, a Power Amp Module (PAM), a frequency filter, a Low Noise Amplifier (LNA), and/or the like. The RF module 2734 may further include a component for transmitting/receiving electronic waves over a free air space in wireless communication, for example, a conductor, a conducting wire, and/or the like.

The sensor module 2740 may include, for example, at least one of a gesture sensor 2740A, a gyro sensor 2740B, an atmospheric pressure sensor 2740C, a magnetic sensor 2740D, an acceleration sensor 2740E, a grip sensor 2740F, a proximity sensor 2740G, a Red, Green, and Blue (RGB) sensor 2740H, a bio-sensor 2740I, a temperature/humidity sensor 2740J, an illumination sensor 2740K, and a Ultra Violet (UV) sensor 2740M. The sensor module 2740 may measure a physical quantity or detect an operation state of the electronic device, and convert the measured or detected information to an electronic signal. Additionally/alternatively, the sensor module 2740 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor, and/or the like. The sensor module 2740 may further include a control circuit for controlling one or more sensors included in the sensor module 240.

The user input module 2750 may include a touch panel 2752, a (digital) pen sensor 2754, a key 2756, and/or an ultrasonic input device 2758. The user input module 2750 may be, for example, the user input module 2640 illustrated in FIG. 26. For example, the touch panel 2752 may recognize (e.g., detect) a touch input in at least one type of a capacitive type, a resistive type, an infrared type, and an acoustic wave type. The touch panel 2752 may further include a controller (not illustrated). In the capacitive type, the touch panel 252 can recognize (e.g., detect) proximity as well as a direct touch. The touch panel 2752 may further include a tactile layer. In this case, the touch panel 2752 may provide a tactile reaction to the user.

The (digital) pen sensor 2754 may be implemented, for example, using a method identical or similar to a method of receiving a touch input of the user, or using a separate recognition sheet. As the key 2756, for example, a key pad or a touch key may be used. The ultrasonic input device 2758 is a device which can detect an acoustic wave by a microphone (e.g., microphone 2788) of the terminal through a pen generating an ultrasonic signal to identify data and can perform wireless recognition. According to various embodiments of the present disclosure, the hardware 2700 may receive a user input from an external device (e.g., network, computer, or server) connected to the hardware 200 by using the communication module 2730.

The display module 2760 may include a panel 2762 and/or a hologram 2764. The communication module 2760 may be, for example, the communication module 2650 illustrated in FIG. 26. The panel 2762 may be, for example, a Liquid Crystal Display (LCD) or an Active Matrix Organic Light Emitting Diode (AM-OLED). The panel 2762 may be implemented to be, for example, flexible, transparent, or wearable. The panel 2762 may be configured by the touch panel 2752 and one module. The hologram 2764 may show a stereoscopic image in the air by using interference of light. According to various embodiments of the present disclosure, the display module 2760 may further include a control circuit for controlling the panel 2762 and/or the hologram 2764.

The interface 2770 may include, for example, a High-Definition Multimedia Interface (HDMI) 2772, a Universal Serial Bus (USB) 2774, a projector 2776, or a D-subminiature (D-sub) 2778. Additionally or alternatively, the interface 290 may include, for example, a Secure Digital (SD)/Multi-Media Card (MMC) (not illustrated), or an Infrared Data Association (IrDA) (not illustrated).

The audio codec 2780 may bi-directionally convert a voice and an electronic signal. The audio codec 2780 may convert voice information input or output through, for example, a speaker 2782, a receiver 2784, an earphone 2786, the microphone 2788, and/or the like.

The camera module 2791 is a device which can photograph an image and a video. According to various embodiments of the present disclosure, the camera module 291 may include one or more image sensors (e.g., a front lens or a back lens), an Image Signal Processor (ISP) (not illustrated) or a flash LED (not illustrated).

The power managing module 2795 may manage power of the hardware 2700. Although not illustrated, the power managing module 2795 may include, for example, a Power Management Integrated Circuit (PMIC), a charger Integrated Circuit (IC), or a battery fuel gauge.

The PMIC may be mounted in, for example, an integrated circuit or an SoC semiconductor. Charging methods may be classified into a wired charging method and a wireless charging method. The charger IC may charge a battery and prevent over voltage or over current from being flowed from a charger. According to various embodiments of the present disclosure, the charger IC may include a charger IC for at least one of the wired charging method and the wireless charging method. A magnetic resonance scheme, a magnetic induction scheme, or an electromagnetic scheme can be exemplified as the wireless charging method, and an additional circuit for wireless charging, such as a coil loop circuit, a resonance circuit, a rectifier circuit, and/or the like may be added.

The battery fuel gauge may measure, for example, a remaining quantity of the battery 2796, a voltage, a current, and/or a temperature during the charging. The battery 2796 may generate electricity to supply power and may be, for example, a rechargeable battery.

The indicator 2797 may show particular statuses of the hardware 2700 or a part (e.g., AP 2711) of the hardware, for example, a booting status, a message status, a charging status, and the like. The motor 2798 may convert an electrical signal to a mechanical vibration. An MCU 2799 may control the sensor module 2740.

Although not illustrated, the hardware 2700 may include a processing unit (e.g., GPU) for supporting a module TV. The processing unit for supporting the mobile TV may process, for example, media data according to a standard of Digital Multimedia Broadcasting (DMB), Digital Video Broadcasting (DVB), media flow, and/or the like. Each of elements of the hardware according to the present disclosure may be configured by one or more components, which may have different names according to the type of the electronic apparatus. The hardware according to various embodiments of the present disclosure may include at least one of the above described components, a few of the components may be omitted, or an additional component may be further included. In addition, some of the components of the hardware according to various embodiments of the present disclosure may be combined to form a single entity, and thus may equivalently execute functions of the corresponding components before being combined.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

The programming module according to various embodiments of the present disclosure may include one or more of the aforementioned elements or may further include other additional elements, or some of the aforementioned elements may be omitted. The operations performed by a programming module or other elements according to various embodiments of the present disclosure may be processed through a sequential, parallel, repetitive, or heuristic method, and some of the operations may be omitted or other operations may be added.

Meanwhile, the various embodiments of the present disclosure may be implemented in the form of a program instruction that can be performed through various computers (e.g., the processor), and may be recorded in a non-transitory computer readable recording medium. The non-transitory computer readable recording medium may include a program command, a data file, and a data structure independently or in combination. The program instruction recorded in the recording medium is specially designed and constructed for the present disclosure, but may be well known to and may be used by those skilled in the art of computer software.

The non-transitory computer readable recording media may include a magnetic media such as a hard disc, a floppy disc, and a magnetic tape, an optical recording media such as a Compact Disc Read Only Memory (CD-ROM) and a (DVD), a magneto-optical media such as a floptical disk, and a hardware device, such as a Read Only Memory (ROM), a Random Access Memory (RAM), and a flash memory, specifically configured to store and execute program instructions. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

According to various embodiments of the present disclosure, in a storage medium storing commands, the commands are configured such that at least one processor performs at least one operation, when the commands are executed by at least one processor, and at least one operation includes presenting content through a plurality of electronic devices comprising at least a first electronic device and a second electronic device, the first electronic device displaying a first portion of the content and the second electronic device displaying a second portion of the content, identifying (e.g., detecting) an input for at least one of the plurality of electronic devices while the content is being displayed; setting the plurality of electronic devices as a first group comprising the first electronic device and a second group comprising the second electronic device, based on at least the input; and independently presenting (e.g., displaying or otherwise providing) the content through the first group and the second group, based on the setting.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of presenting content with an electronic device that is in communication with a second electronic device, the method comprising:
presenting, by the electronic device, a first portion of the content;
at least one of:
receiving, by the electronic device, information regarding an input while the first portion of the content is being presented, and
detecting, by the electronic device, the input while the first portion of the content is being presented; and
in response to at least one of receiving information regarding the input and detecting the input, configuring, by the electronic device, a first group including one or more electronic devices.

2. The method of claim 1, further comprising:
determining, by the electronic device, respective portions of the content to be presented by corresponding electronic devices of the one or more electronic devices belonging to the first group.

3. The method of claim 2, further comprising:
by the electronic device, transmitting to at least one of the one or more electronic devices belonging to the first group at least of:
information regarding at least one of an operating mode and
control information for content presentation respectively corresponding to the at least one of the one or more electronic devices belonging to the first group.

4. The method of claim 1, further comprising:
determining, by the electronic device, a relative positioning of the one or more electronic devices in the first group.

5. The method of claim 4, wherein the determining of the relative positioning of the one or more electronic devices in the first group comprises:
determining, by the electronic device, the relative positioning of at least one of the electronic devices in the first group according to the input.

6. The method of claim 1, further comprising:
determining, by the electronic device, synchronization information for synchronizing respective content to be presented by the one or more electronic devices belonging to the first group.

7. The method of claim 6, further comprising:
transmitting, by the electronic device, the respective synchronization information to at least one of the electronic devices belonging to the first group.

8. The method of claim 6, wherein the synchronization information includes information for synchronizing presentation of respective content at each of the one or more electronic devices belonging to the first group.

9. The method of claim 8, wherein the electronic device belongs to the first group, and
wherein the electronic device displays data that is different than synchronized content being presented by other electronic devices of the first group according to the synchronization information.

10. The method of claim 6, wherein the synchronization information includes at least one of time stamp information of the electronic device related to a present display point of the content and a present information of the electronic device.

11. The method of claim 1, further comprising:
in response to at least one of receiving information regarding the input and detecting the input, configuring, by the electronic device, a second group including one or more electronic devices,
wherein the electronic device is belonging to the first group, and
wherein the second electronic device belonging to the second group.

12. The method of claim 11, further comprising:
determining, by the electronic device, synchronization information for synchronizing presentation of content across the one or more electronic devices belonging to the first group and the one or more electronic devices belonging to the second group.

13. The method of claim 11, further comprising:
at least one of:
receiving, by the electronic device, information regarding an input for forming a third group, and
detecting, by the electronic device, the input for forming the third group; and
configuring, by the electronic device, the third group to include at least one of electronic device from at least one of the first group and the second group.

14. The method of claim 13, further comprising:
in response to at least one of receiving information regarding the input and detecting the input, transmitting, by the electronic device, control information to the at least one electronic device belonging to the third group to present the content independent from the presentation of content by at least one of the first group and the second group.

15. The method of claim 13, wherein the input for forming the third group includes a gesture, a touch, a voice of a user, a distance between at least two electronic devices satisfying a threshold distance.

16. The method of claim 11, further comprising:
dividing, by the electronic device, the content into portions corresponding to the one or more electronic devices belonging to at least of the first group and the second group;
generating, by the electronic device, respective control information corresponding to the electronic devices belonging to at least one of the first group and the second group; and
transmitting, by the electronic device, the respective control information to the corresponding electronic devices belonging to at least one of the first group and the second group.

17. The method of claim 16, wherein the dividing of the content into portions corresponding to the one or more electronic devices belonging to the first group and the second group comprises:
dividing, by the electronic device, the content based on at least one of a size of displays connected to the electronic devices belonging to at least one of the first group and the second group, a number of electronic devices belonging to at least one of the first group and the second group, and a resolution of the content.

18. An electronic device that is in communication with a second electronic device, the electronic device comprising:
a memory configured to store information on a plurality of electronic devices including the electronic device and the second electronic device; and
one or more processors configured to:
present a first portion of a content;
at least one of:
receive information regarding an input while the first portion of the content is being presented, and
detect the input while the first portion of the content is being presented; and
configure a first group including one or more electronic devices in response to at least one of receiving information regarding the input and detecting the input.

19. The electronic device of claim 18, wherein the one or more processors are further configured to determine respective portions of the content to be presented by corresponding electronic devices of the one or more electronic devices belonging to the first group.

20. The electronic device of claim 19, wherein the one or more processors are further configured to transmit to at least one of the one or more electronic devices belonging to the first group at least one of:
information regarding at least one of an operating mode and
control information for content presentation respectively corresponding to the at least one of the electronic devices belonging to the first group.

21. The electronic device of claim 18, wherein the one or more processors are further configured to determine a relative positioning of the one or more electronic devices in the first group.

22. The electronic device of claim 21, wherein the one or more processors are further configured to determine a relative positioning of at least one of the electronic devices in the first group according to the input.

23. The electronic device of claim 18, wherein the one or more processors are further configured to determine synchronization information for synchronizing respective content to be presented by the one or more electronic devices belonging to the first group.

24. The electronic device of claim 23, wherein the one or more processors are further configured to transmit the respective synchronization information to at least one of the electronic devices belonging to the first group.

25. The electronic device of claim 23, wherein the synchronization information includes information for synchronizing presentation of respective content at each of the one or more electronic devices belonging to the first group.

26. The electronic device of claim 25, wherein the electronic device belongs to the first group, and
wherein the one or more processors is further configured to display data that is different than synchronized content being presented by other electronic devices of the first group according to the synchronization information.

27. The electronic device of claim 23, wherein the synchronization information includes at least one of time stamp information of the electronic device related to a present display point of the content and a present information of the electronic device.

28. The electronic device of claim 18, wherein the one or more processors are further configured to configure a second group including one or more electronic devices in response to at least one of receiving information regarding the input and detecting the input,
wherein the electronic device is belonging to the first group, and
wherein the second electronic device is belonging to the second group.

29. The electronic device of claim 28, wherein the one or more processors are further configured to determine synchronization information for synchronizing presentation of content across the one or more electronic devices belonging to the first group and the one or more electronic devices belonging to the second group.

30. The electronic device of claim 28, wherein the one or more processors are further configured to:
at least one of:
receive information regarding an input for forming a third group, and
detect the input for forming the third group; and
configure the third group to include at least one of electronic device from at least one of the first group and the second group.

31. The electronic device of claim 30, wherein the one or more processors are configured to transmit control information to the at least one electronic device belonging to the third group to present the content independent from the presentation of content by at least one of the first group and the second group in response to at least one of receiving information regarding the input and detecting the input.

32. The electronic device of claim 30, wherein the input for forming the third group includes a gesture, a touch, a voice of a user, a distance between at least two electronic devices satisfying a threshold distance.

33. The electronic device of claim 28, wherein the one or more processors are configured to divide the content into portions corresponding to the one or more electronic devices belonging to at least one of the first group and the second group, generate respective control information corresponding to the electronic devices of belonging to at least one of the first group and the second group, and transmit the respective control information to the corresponding electronic devices belonging to at least one of the first group and the second group.

34. The electronic device of claim 33, wherein the one or more processors is configured to divide the content into portions corresponding to the one or more electronic devices belonging to the first group and the second group by dividing the content based on at least one of a size of displays connected to the electronic devices belonging to at least one of the first group and the second group, a number of electronic devices belonging to at least one of the first group and the second group, and a resolution of the content.

35. A method of presenting content with an electronic device, the method comprising:
    establishing, by the electronic device, a connection with a second electronic device;
    detecting, by the electronic device, an input for configuring a presentation of content across one or more of the electronic device and the second electronic device while a first portion of the content is being presented by at least one of the electronic device and the second electronic device;
    transmitting, by the electronic device, information regarding the input to the second electronic device; and
    receiving, by the electronic device, information regarding at least one of an operating mode for the electronic device and control information for content presentation by the electronic device, from the second electronic device.

36. The method of claim 35, further comprising:
    receiving, by the electronic device, at least one of content and a content link, from the second electronic device.

37. The method of claim 35, further comprising:
    presenting, by the electronic device, the content according to at least one of the information regarding at least one of an operating mode for the electronic device and the control information.

38. The method of claim 37, wherein the presenting of the content comprises:
    presenting, by the electronic device, the content simultaneous with at least one of the second electronic device and one or more electronic devices belonging to a first group.

39. The method of claim 35, further comprising:
    receiving, by the electronic device, synchronization information for presentation of the content from the second electronic device.

40. The method of claim 39, wherein the synchronization information includes information for synchronizing presentation of respective content at each of one or more electronic devices belonging to a first group.

41. The method of claim 39, wherein the synchronization information includes information includes at least one of time stamp information of the electronic device related to a present display point of the content and a present information of the electronic device.

42. The method of claim 35, wherein the electronic device belongs to a first group of one or more electronic devices, and
    wherein the electronic device displays data that is different than synchronized content being presented by other electronic devices of the first group according to the synchronization information.

43. The method of claim 35, further comprising:
    detecting, by the electronic device, an input for forming a third group; and
    transmitting, by the electronic device, information regarding the input for forming the third group to the second electronic device.

44. The method of claim 43, further comprising:
    receiving, by the electronic device, information regarding at least one of an operating mode for the electronic device and control information for content presentation by the electronic device generated in response to the input for forming the third group, from the second electronic device.

45. The method of claim 43, wherein the input for forming a third group comprises a gesture, a touch, a voice of a user, a distance between at least two electronic devices satisfying a threshold distance.

46. The method of claim 35, further comprising:
    establishing a connection with a third electronic device;
    generating, by the electronic device, synchronization information for synchronizing presentation of respective content across the electronic device and the third electronic device; and
    transmitting, by the electronic device, the synchronization information to the third electronic device.

47. The method of claim 46, further comprising:
    presenting, by the electronic device, content simultaneously with presentation of respective content by the third electronic device.

48. The method of claim 47, wherein the electronic device presents the content independent of a presentation of respective content presented by the second electronic device.

49. An electronic device, the electronic device comprising:
    a memory configured to store information on a plurality of electronic devices including the electronic device and the second electronic device; and
    one or more processors configured to:
        establish a connection with a second electronic device;
        detect an input for configuring a presentation of content across one or more of the electronic device and the second electronic device while a first portion of the content is being presented by at least one of the electronic device and the second electronic device;
        transmit information regarding the input to the second electronic device; and
        receive information regarding at least one of an operating mode for the electronic device and control information for content presentation by the electronic device, from the second electronic device.

50. The electronic device of claim 49, wherein the one or more processors are further configured to receive at least one of the content and a content link, from the second electronic device.

51. The electronic device of claim 49, wherein the one or more processors are further configured to present the content according to at least one of the information regarding at least one of an operating mode for the electronic device and the control information.

52. The electronic device of claim 51, wherein the one or more processors are configured to present the content according to at least one of the information regarding at least one of an operating mode for the electronic device and the control information by present the content simultaneous with at least one of the second electronic device and one or more electronic devices belonging to a first group.

53. The electronic device of claim 49, wherein the one or more processors are configured to receive synchronization information for presentation of the content from the second electronic device.

54. The electronic device of claim 53, wherein the synchronization information includes information for synchronizing presentation of respective content at each of one or more electronic devices belonging to a first group.

55. The electronic device of claim 53, wherein the synchronization information includes information includes at least one of time stamp information of the electronic device related to a present display point of the content and a present information of the electronic device.

56. The electronic device of claim 49, wherein the electronic device belongs to a first group of one or more electronic devices, and
wherein the one or more processors are configured to display data that is different than synchronized content being presented by other electronic devices of the first group according to the synchronization information.

57. The electronic device of claim 49, wherein the one or more processors are configured to detect an input for forming a third group, and transmit information regarding the input for forming the third group.

58. The electronic device of claim 57, wherein the one or more processors are configured to receive information regarding at least one of an operating mode for the electronic device and control information for content presentation by the electronic device generated in response to the input for forming the third group, from the second electronic device.

59. The electronic device of claim 57, wherein the input for forming a third group comprises a gesture, a touch, a voice of a user, a distance between at least two electronic devices satisfying a threshold distance.

60. The electronic device of claim 49, wherein the one or more processors are configured to establish a connection with a third electronic device, generate synchronization information for synchronizing presentation of respective content across the electronic device and the third electronic device, and transmit the synchronization information to the third electronic device.

61. The electronic device of claim 60, wherein the one or more processors are configured to present content simultaneously with presentation of respective content by the third electronic device.

62. The electronic device of claim 61, wherein the one or more processors are configured to present the content independent of a presentation of respective content presented by the second electronic device.

* * * * *